(12) United States Patent
Solomon

(10) Patent No.: US 8,041,654 B2
(45) Date of Patent: Oct. 18, 2011

(54) SYSTEM FOR HYBRIDIZED EFFICIENT GENETIC ALGORITHMS TO SOLVE BI-OBJECTIVE OPTIMIZATION PROBLEMS WITH APPLICATION TO NETWORK COMPUTING

(76) Inventor: Neal Solomon, Oakland, CA (US)

( * ) Notice: Subject to any disclaimer, the term of this patent is extended or adjusted under 35 U.S.C. 154(b) by 810 days.

(21) Appl. No.: 12/156,446

(22) Filed: May 30, 2008

(65) Prior Publication Data

US 2009/0070281 A1    Mar. 12, 2009

Related U.S. Application Data

(60) Provisional application No. 60/941,600, filed on Jun. 1, 2007.

(51) Int. Cl.
*G06F 15/18*    (2006.01)
*G06N 3/00*     (2006.01)
*G06N 3/12*     (2006.01)

(52) U.S. Cl. .................................................. 706/13
(58) Field of Classification Search .................. None
See application file for complete search history.

(56) References Cited

U.S. PATENT DOCUMENTS 6,148,274 A * 11/2000 Watanabe et al. .............. 703/6
2006/0080268 A1 * 4/2006 Afeyan et al. ................ 706/13

OTHER PUBLICATIONS

Zhang et al. "Evolutionary Algorithm with Guided Mutation for Maximum Clique Problem", IEEE Transaction on Evolutionary Computation, 2005, pp. 192-200.*
Yang et al. "Integrating adaptive mutations and family competition into genetic algorithms as function optimizer", Soft Computing 4, 2000, pp. 89-102.*

* cited by examiner

*Primary Examiner* — Jeffrey A Gaffin
*Assistant Examiner* — Li-Wu Chang

(57) ABSTRACT

A system and methods are presented for the generation of hybridized efficient genetic algorithms (EGAS) applied to bi-objective optimization problems. Applications are made to engineering systems involving collective behaviors, including network computing, robotics and evolvable hardware.

12 Claims, 48 Drawing Sheets

FIG. 32

Metaheuristic Typology

| Local Search | Swarm Intelligence |
|---|---|
| Tabu Search (TS)<br><br>Scatter Search (SS)<br><br>Adaptive Memory Programmiming (AMP)<br><br>3200 | Ant Colony Optimization (ACO)<br><br>Particle Swarm Optimization (PSO)<br><br>Stochastic Diffusion Search (SDS)<br><br>3210 |
| Global Search | Artificial Immune System (AIS) |
| Monte Carlo (MC)<br><br>Simulated Annealing (SA)<br>3220 | 3230 |
| Genetic Algorithms (GA) | |
| Parallel GA<br><br>Efficient GA<br><br>Hybrid GA<br>3240 | |

FIG. 70
(I)
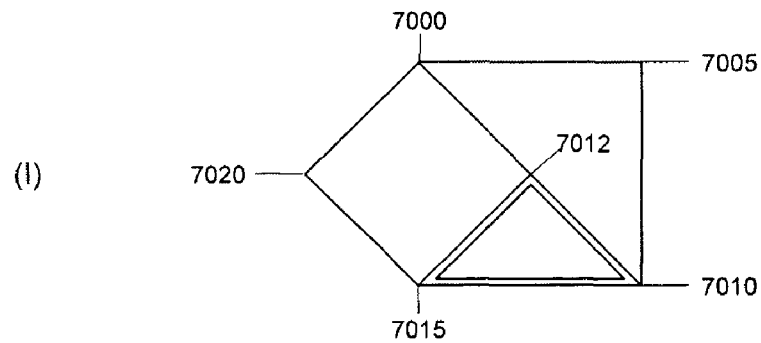
(II)
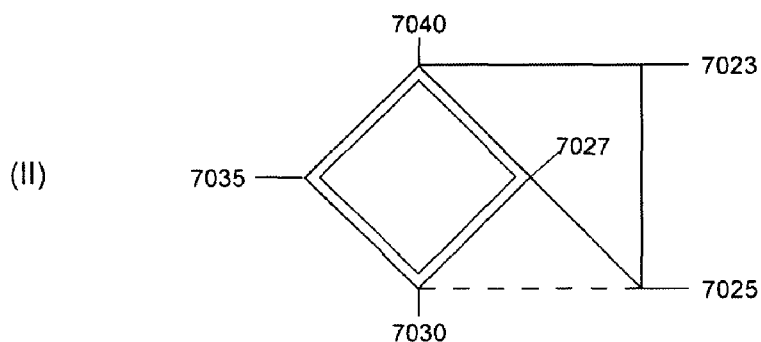
(III)
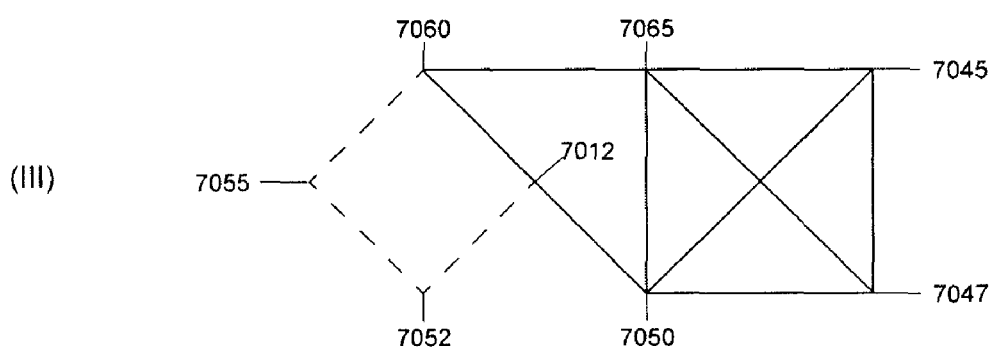

SYSTEM FOR HYBRIDIZED EFFICIENT GENETIC ALGORITHMS TO SOLVE BI-OBJECTIVE OPTIMIZATION PROBLEMS WITH APPLICATION TO NETWORK COMPUTING

CROSS-REFERENCES TO RELATED APPLICATIONS

The present application claims the benefit of priority under 35 U.S.C. §119 from U.S. Provisional Patent Application Ser. No. 60/941,600, filed on Jun. 1, 2007, the disclosures of which are hereby incorporated by reference in their entirety for all purposes.

FIELD OF THE INVENTION

The present invention applies to evolutionary computation, computational systems and metaheuristics. The system solves optimization problems involving resource constraints. The system deals with computational conservation, including network computational economics, by applying concepts from genetics, molecular biology and systems biology to computational analysis.

BACKGROUND

The invention deals with development of novel, efficient genetic algorithms in order to solve bi-objective optimization problems (BOOPs). Multi-objective optimization problems (MOOPs) are deconstructed into multiple BOOPs, which are further deconstructed into multiple single-objective optimization problems (SOOPs).

Genetic algorithms are in a class of computational metaheuristics that solve optimization problems. By decomposing MOOPs, which appear in various engineering and computational domains, into BOOPs, complex combinatorial optimization problems become solvable.

Several classes of metaheuristics have been used to solve optimization problems. These include local search metaheuristics (tabu search, scatter search and adaptive memory programming), global search metaheuristics (Monte Carlo and simulated annealing), swarm intelligence metaheuristics for local and neighborhood search (ant colony optimization, particle swarm optimization and stochastic diffusion search) and artificial immune systems metaheuristics. In general, these metaheuristic models involve learning processes made possible by the combination of memory and evolution. The metaheuristics are shortcuts for finding rapid solutions to optimization problems.

The local search metaheuristics develop an initial solution by relying on a short-term memory (although adaptive memory programming uses long-term memory), limited search constraints and a constant updating of the memory catalogue of objects that are learned in the heuristic process. Global search metaheuristics are generalized stochastic random processes for solving optimization problems. Swarm intelligence metaheuristics utilize collective memory and reinforcement learning from multiple agents to create a model for solving optimization problems.

Local Search Models

Developed by Glover, the tabu search (TS), scatter search (SS) and adaptive memory programming (AMP) models use similar search strategies to access a memory, reprogram the memory with new information obtained in the search process and guide the search process by accessing a catalogue created by the memory updating process. The combination of memory and evolutionary progression create a learning process.

Tabu Search

The TS metaheuristic uses a local or neighborhood search process to interactively move from one solution to a modified solution until a specific constraint has been satisfied. As the search progresses, information is excluded that guides the process to search space that is increasingly probable to achieve success in solving a problem. TS uses short-term memory structures in order to access a tabu list that contains solutions to problems that have been visited in the recent past. Solutions from the tabu list are excluded from the new search. Further, the tabu list can be overridden by using "aspiration criteria" so as to allow better solutions than are currently available.

TS methods use "inhibition" to exclude criteria and continuously filter the search space. The memory elements of the tabu process are updated from the past search results so as to limit the forward search space to non-redundant locations. This model increases efficiency in local or neighborhood search as it creates a pattern of development. This is a form of subtractive or exclusionary analysis that filters search space that has already been determined not to contain the desired solution.

A simple analogy to TS would be the search and rescue of a hiker or swimmer. In a static environment, the search party will cover a terrain and not return there because doing so would be redundant and inefficient. In order to keep track of the terrain they covered, the search party keeps a checklist of specific spaces and marks off the spaces after they have been searched. This process narrows the search over time, increases the likelihood of finding the hiker or swimmer and conserves scarce resources.

The exclusionary model of TS has limits. First, there are limits to the development of the initial catalogue based on an arbitrary local search. That is, the initial construction of a catalogue accessed in updatable memory is arbitrary. Second, since this initial position is arbitrary, the pattern of search is random as well, a further inefficiency. Third, the memory process is limited to the past, which is conditioned upon the arbitrary and random evidence obtained in the search process at a particular time. Fourth, the TS model is limited by the timing of the updating process. This limitation represents an arbitrary cross-section of time, which constrains the process to a static search space. Specifically, TS is not effective in an evolving environment with changing conditions unless the catalogue is continuously updated to reflect the reinvestigation of space that was subsequently covered under specific conditions.

Scatter Search

The SS method is an evolutionary approach that joins solutions based on a "generalized path" between two previous initial solutions. A reference set of two points in a search space is connected to create a new solution. The chief way to create the initial solutions is to combine linear points representing two solutions. The initial reference set then evolves in such a way that the new solutions are incorporated into the updated reference set for locating future solutions and so on.

SS uses several components in an evolutionary process: (a) Diversification generation method, (b) improvement method, (c) reference set update method, (d) subset generation method and (e) solution combination method. After the SS method generates a starting set of solution vectors, it then creates new points from linear combinations of subsets of current reference points. Finally, it extracts a collection of the best points from the previous phase as starting points for new applications of the heuristic process of the later phase.

There are limitations to the SS metaheuristic model. First, SS merely seeks averages of arbitrary initial search space. Second, the local arbitrary averaging is generalized and reinforced. This model is inefficient unless it can be continuously optimized by updating its reference set. Next, there are limits to the timing of the updating of the catalogue. Finally, this model is particularly limited in environments that are evolving in which it is required to revisit previously searched space.

The AMP model of a generalized search approach overcomes some of the limits of TS and SS. AMP utilizes a longer term memory and a neighborhood search space. Still, AMP suffers from some of the limits of the local search metaheuristics. Additional local search models, including GRASP, suffer from the same constraints of local search space optimization methods.

Swarm Intelligence Metaheuristics

Ant colony optimization (ACO) techniques, particle swarm optimization (PSO) and stochastic diffusion search (SDS) models use neighborhood search approaches to solve optimization problems. The biologically-inspired model of swarm intelligence uses the collective behavior of cooperating insects.

Ant Colony Optimization

Developed by Dorigo, following the work of Wilson, ACO techniques rely on ant collective behaviors for inspiration to develop a cooperating model of solving optimization problems. For example, ants use pheromones, a chemical substance that is emitted and detected, to guide behaviors. Computational emulation of this type of process in ant collective behaviors allows a limited intelligence to emerge that solves optimization problems. Reinforcement learning occurs via use of the pheromone deposition strategy, which emulates an externally accessible memory system. The pheromone system is self-reinforcing in the sense that it increases with more use and decreases with less use. The ACO process is adaptive to environmental change but relies on the combined efforts of multiple agents that interact in a local or neighborhood space.

One particular use of the ACO is development of workarounds for bottlenecks. In the case of actual ant colony operation, if a piece of food is obstructed, ants will find a way around the obstruction and reinforce this pathway.

ACO has limits. It is limited to locally obtained information. Specifically, the most recent data are reinforced, rather than the correct data. The initial set of data is arbitrary and risks running the ant agents into blind, and inefficient, alleys that squander scarce resources. In effect, the ACO translates a quantity of inputs into intensity; however, if the source of the initial, random quantity is inefficient, the whole system will be inefficient. The system lacks a way to minimize its losses. Ultimately, this model will find solutions to optimization problems under constraints, but its learning model is solipsistic and circular.

Particle Swarm Optimization

The logic of swarm behaviors is to avoid neighbors while also following a leader, even as the leadership role changes at key thresholds. Within this changed leadership, the initiation process is asymmetric. Like ACO, the PSO metaheuristic uses local and neighborhood search techniques which rely on the interactive behaviors of neighboring agents. In the case of PSO, the model uses a universal access memory because any agent can access the behavior of other agents in the swarm configuration at a specific time.

One of the key objectives of PSO is identification of the conditions that allow a leader to change in the swarm. The asymmetric effects of PSO behaviors provide a random search process. The memory register of the swarm is generalized as the system accesses information from the behaviors of all of the collective's membership. However, the positioning of particular members is restricted to specific actions relative to the positions of other agents in the swarm.

Stochastic Diffusion Search

SDS blends aspects of ACO and PSO by allowing one-to-one direct communication between agents. In SDS, a subgroup of agents in the general collective test and optimize initial solutions which behave as hypotheses for future potential actions. Agents perform a preliminary evaluation and generate a candidate solution to a search problem. However, agents share information about these hypotheses, which illustrates how the diffusion model operates directly (one-to-one) between agents. High quality solutions can be generated from groups of interacting agents by using the hypotheses.

Like the PSO, SDS is limited to local and neighborhood search because the agents need to communicate with each other directly. Again, the initial hypothesis is arbitrary and may misdirect the group, thus providing an inefficient start of a search process. As feedback is provided to update the hypotheses, the system learns, but the learning occurs only within the context of specifically interacting agents in real time. If the environment changes, the earlier hypotheses become obsolete.

General Metaheuristics

Global search heuristics include Monte Carlo and simulated annealing models. These models generally breed randomized variations within a defined range to create a model to solve optimization problems.

An additional category of metaheuristics uses the human immune system as guidance to create an artificial immune system (AIS). AISs are computationally emulated learning models that imitate the operation of the immune system's humoral and adaptive subsystems in order to develop a defense against a new pathogen and then, once learned, to pass on the new immunity to a new generation for rapid defense against a known pathogen.

Glover also developed a surrogate constraint method for solving a class of optimization problems.

Genetic Algorithms

Holland developed a way to emulate the process of evolution in order to solve optimization problems. Genetic algorithms (GAs) create numerous generations by emulating sexual reproduction and random mutations in order to create later generations that are fit enough to match an environment and thus present adequate solutions to complex problems.

By emulating the genetic model in nature, GAs perform specific functions that allow organisms to better fit their environment and thereby gain a competitive advantage to survive. The most fit organism reinforces its competitive advantage and passes on its genes to future generations.

A problem with traditional GA is that its evolution relies only on random crossover and random mutation. In some cases, many thousands of generations of evolution are necessary in order to identify a solution, which is time consuming and inefficient. While the evolutionary process of the GA develops in order to solve problems of matching fitness of a strong group with an environment, as the environment itself evolves, the evolutionary process must continue to develop. Identifying co-evolutionary processes at worst is arbitrary and at best develops a solipsistic equilibrium in a static environment. Finally, because the environment changes in unpredictable ways, and because the GA development process is past-solution based, it is unable to offer predictions of future possible optimal fitness of the environment. This makes GA ineffective for solving problems in crisis periods of rapid or volatile environmental change.

Unlike the local search or swarm intelligence models, GA lacks a "memory" and must be constantly compared at each new generation to the fitness of the environment. In this sense, the environmental feedback is instantaneous.

These GA limitations are overcome by combining them with other metaheuristics techniques to create hybrid metaheuristics. By combining elements of positive-inclusive metaheuristics (ACO, PSO and SDS) with negative-exclusionary metaheuristics (TS, SS and AMP), the present hybrid GA metaheuristic is able to develop learning capabilities and to successfully solve problems. Such a hybrid GA model will reject unsuccessful solution attempts, re-focus on and accelerate successful solution attempts and develop positive reinforcement based on initial success.

The present system provides a range of new methods for improving GA and for creating novel hybrid metaheuristics using GA. By removing some of the GA constraints of (a) randomness, (b) ever-present environmental fitness criteria and (c) memory, the present system provides a radical alternative that is able to develop a learning heuristic that efficiently solves bi-objective optimization problems. Learning is seen as a byproduct of the combination of several key elements, including memory and evolution, in a hybrid GA metaheuristic. The adaptation made possible by the application of learning solves complex optimization problems.

Bi-Objective Optimization Problems

Solving optimization problems involves finding the best results within specific constraints. Many engineering optimization problems are very complex and involve the need to solve problems with multiple constraints. In order to build a successful car, for instance, a manufacturer needs a design that is stylish but also fuel efficient, safe and economically priced. These multiple constraints provide substantial engineering challenges.

In order to increase the chances of success in finding solutions, multi-objective optimization problems (MOOPs) are broken down into their simplest elements. The simplest combinatorial optimization problems are bi-objective optimization problems (BOOPs) that balance two constraints. Single objective optimization problems (SOOPs) do not capture the "compromise" between key constraints necessary to solve BOOPs. BOOPs are the significant unit in optimization problems, upon which MOOPs are built. Multiple variables and constraints can be deconstructed to the most elemental BOOP in order to assess sets of solution space options.

A major challenge in solving BOOPs by using metaheuristic techniques is to identify ways to obtain global information in a local search environment. Since BOOPs are the simplest type of combinatorial optimization problem, the issue of moving from one to two opposing goals involves balancing objectives. Metaheuristic techniques have been valuable in solving different classes of optimization problems because of the ability of the learning mechanism, via the use of memory and evolution, to delimit specific constraints over time in order to identify the best options from among a set of solution candidates.

An example of a SOOP is finding the shortest path. This minimization optimization search space involves finding solutions within a field of options with limited constraints. When an additional set of constraints is introduced, as in the case of BOOPs, the conflict arises in which a single option is impossible; rather, the solution space involves locating multiple optimization options, or a family of solutions. The best-available solution involves selecting specific combinations of solutions within limited constraints. These sets of possible solutions refer to probable combinations that represent a compromise between extreme SOOP constraints.

While the minimization search problem epitomizes the SOOP, the allocation problem epitomizes the BOOP. The aim is to find the fewest resources necessary to satisfy a set of constraints. An example of the allocation problem involves scheduling, in which priorities are made over at least two points of time. The traveling salesman problem (TSP) represents a sort of BOOP. The greatest benefit of solving BOOPs is that they define the resources needed to most efficiently proceed with a particular set of goals.

In communications systems, for example, BOOPs are applied to bandwidth resource constraints, load balancing, path optimization and goal prioritization problems. In general, in computer systems, the simplest or earliest problem is solved, then the more complete problem is solved. The BOOP is a central element of optimization problems that leads to different levels of solutions for more complex optimization problems.

GAs maintain a pool of solutions, rather than a single solution. By mimicking biological evolution, the GA finds superior sets of solutions over time. The solution options are randomly combined or mutated to alter the composition of the pool of solutions. Inferior solutions, as measured by the real-time environmental fitness criterion, are discarded.

GAs as presently conceived, however, are limited in their ability to solve BOOPs efficiently. Precisely because they rely on random combinations and mutations and are compared with a present environmental fitness criterion, they provide narrow and somewhat inefficient solution options. Ironically, they lack an evolutionary character that accommodates the evolving solutions needed within a changing environment. Since they are restricted to past-oriented generations, they do not build new solutions to evolving problems. Since they lack memory capacities, they also lack the learning functions of other metaheuristics. Consequently, there is a tendency to repeat past solutions, which fail to solve new problems in a time-sensitive way.

What is needed to solve BOOPs in a complex evolving environment is a hybrid of GA and other metaheuristics techniques. The hybrid GA metaheuristic technique disclosed in the present invention is efficient, on-demand and flexible. In the short-run, it provides adequate solutions to BOOPs that allow more solutions to be offered to more complex combinatorial optimization problems. Overall, the present invention develops a system in which global information is made available to local search behaviors in order to increase efficiency of combinatorial optimization problem solving procedures.

In order to develop an effective and efficient GA metaheuristic, the critical functions of crossover and mutation need to be reexamined and refined. The present system offers methods to perform these functions.

There is a range of information technology, computer science and engineering systems to which the present system applies. The present system solves optimization problems involving computing, communications and robotics.

SUMMARY

The present system develops a novel efficient GA metaheuristic for solving BOOPs. Efficient GAs are developed by removing the constraint of pure randomization in both crossover and mutation. The resulting efficient GA model is faster, more efficient and more accurate in presenting solutions to optimization problems.

In general, GA has used the natural world for inspiration in computationally emulating a biological evolution model. However, imperfections in the natural model can be artificially corrected. By limiting randomization, the GA evolutionary models are intentional and directed. This efficient GA metaheuristic model transcends the limits of past-focus and present-environment matching to create solutions to evolutionary optimization problems.

After disclosing the efficient GA model, the invention elucidates the environmental feedback mechanism, the fitness assessment criterion and the co-evolutionary processes to which GA candidate solutions are compared.

The present system identifies shortcuts in the GA model that are effective in the production of efficient optimization solutions. The present system further applies soft computing techniques to GA in order to maximize computational conservation and eliminate redundancies.

There are key constraint categories that are necessary to observe in order to build a model that adopts hybrid metaheuristics to solve optimization problems. These constraints include time, memory, and computational and communications resources as they are applied to real problems. The present system addresses these constraint categories and seeks to make computational analysis more efficient and effective in solving real engineering problems.

The dynamics of interacting aspects of the present hybrid metaheuristic are also specified.

The combination of specific local search and swarm intelligence metaheuristics with GAs is also specified in the context of particular operations. For instance, TS is combined with a non-random mutation process of GAs to create a far more efficient generation production model. In addition, SS is combined with the GA crossover mechanism to increase the efficiency of the process. Moreover, ACO is combined with GAs in order to increase the efficiency of the fitness matching mechanism. These synthetic metaheuristics have greater power in solving BOOPs.

Finally, practical applications of the present system are provided, ranging from network computing to communications and from nanotechnology to robotics.

ADVANTAGES OF THE PRESENT SYSTEM

One of the challenges of GA is to develop an efficient model of evolutionary adaptation. Mere emulation of natural processes, however, leads to multiple inefficiencies in the traditional GA model. The present system is able to overcome these limitations by integrating non-random mechanisms in a hybrid GA model for creation of multiple generations of solutions for increased efficiency relative to traditional GAs.

One advantage of this efficient GA metaheuristic is that the system is increasingly responsive to environmental feedback. By increasing environmental feedback responsiveness, the system more efficiently guides the development of future generations.

Unlike the traditional GA model, the present system responds to real-time change in the environment. This allows a dynamic approach to solving optimization problems.

The present system provides not only more rapid responses to the environment, but also more complete responses. The hyper-efficient hybrid GA model disclosed herein is able to solve problems in real time. This real time environmental interaction capability allows the system to be integrated into complex engineering systems that involve indeterministic feedback.

In practical terms, numerous engineering systems benefit from development of the present efficient GA. Computer networking and communications systems that employ the present system will maximize efficiency appreciably, thereby providing users competitive advantages.

In the field of robotics, efficient GA enable the generation and selection of sets of solutions to complex BOOPs in real time and thus allow immediate environmental interaction. In particular, in the field of collective robotics, the present system solves critical problems of obtaining global information in a local search space. In the application of collective robotics to manufacturing, the present system solves BOOPs involving resource constraints. The present system also efficiently solves routing and scheduling problems.

In the case of nano-robotics and artificial synthetic biology, the challenges of severe resource constraints are overcome by employing the present system. In particular, resource constraints involving time, memory, computational and communications resources are solvable using the present hybrid GA system.

DESCRIPTION OF THE PRESENT INVENTION (A) Efficient GA Metaheuristic System

In traditional GA models, genes are evolved by randomly combining elements of selected chromosomes to create new generations of genes. The process is enhanced by randomly mutating the genes. The resulting generations are then compared to the present environment, the best fit generations are preserved and the least fit are removed, and the process continues until a generation of genes is produced that most adequately fits the environment. This model is employed to solve complex optimization problems because the generations of genes represent solution candidates and the best fit generation most suitably overcomes environmental constraints.

The present system transcends this traditional model by developing a model in which the randomness functions are minimized. By so limiting this critical traditional facet of the GA model, the present system is more efficient than the biologically-inspired genetic model from which it draws. The goal is to develop a GA model that goes beyond natural selection, because the traditional bio-inspired model is flawed, slow and inefficient. The present system uses narrower ranges to mutate the crossover (mating) and mutation operations of the evolutionary process. In addition, the fitness matching process is optimized in order to enhance the feedback mechanisms necessary to create a hyper-efficient GA metaheuristic model for solving optimization problems.

(1) Planned Genetic Algorithm Parenthood

The random combination of genes is inefficient. The present system uses selected mating of pairs to reproduce a subsequent generation. This intentional combination of parent genes is far more efficient than traditional GA approaches.

The parent genes self-select each other to satisfy specific constraints. The mating pairs are selected for crossover by using specific criteria. This intentional mating process produces a narrower band of differentiation within future generations but limits the development time necessary to achieve solutions to problems in a local search space.

One constraint satisfaction criterion involves temporality. The mating pairs are selected only at a specific threshold of time. In most applications of the present intentional mating pattern of parent generations, probabilistic evaluations are necessary to select the candidates most likely to be successful.

The application of intentional gene combination at the crossover stage yields stronger progeny, with an increased likelihood of survival within a narrower band of likely success.

In another embodiment of the system, female lines have specific limiting functions of final determination of the mating process. This limiting factor allows them to select preferences that will direct the successive generations according to a specific bias.

(2) Efficient Mating Process

Though traditional GA random pairings occur in the crossover process, in presenting a system for efficient mating, the invention indicates a mutual aspect of selection that satisfies dual constraints. This BOOP is solved by examining and analyzing the specific results of past genealogical pairings and resulting generations.

Self-selection of pairs of genes is maximally competitive. The initial assessment process of sexual reproduction is performed by examining prior examples of successful breeding pairs. This intentional process increases efficiency of the breeding process and saves time by immediately rejecting inappropriate partners that do not satisfy requirements. The range of the variability of the traits of the males and females is narrowed in order to present increasingly likely matching that yield the strongest solutions.

The goal of the efficient mating process is to produce successful offspring that will optimally fit the environment and subsequently survive. These successor offspring solve optimization problems as they evolve. Using the efficient mating process makes it possible to seek equilibrium in the system much more quickly because the system uses mutual selection to produce appropriate offspring rather than continually going down blind alleys.

(3) Non-random Evolutionary Directionality: Semi-Intentional Mutation Vectors

Traditional GA uses random mutation processes to produce the strongest available generations to match an environment. The problem is that this random process is inefficient and takes so much time that if the environment changes, the solutions will no longer fit and/or the search process must recommence. In reality, nature does not operate by using completely random mutations. If totally random mutations affected the human genome, there would be little stability. In fact, most genomes are partially random, the product of limited change within a narrow range. This focused random search process is semi-directed.

The present system is designed to develop somewhat directed, or intentional, mutations. There is a spectrum between totally random and totally intentional mutation development. The random model is inefficient and unreliable.

The key problem is determining the best direction in which to evolve. By analyzing past generation evolutionary vectors, the present system improves the likelihood, and speed, of environmental fitness matching. Using the knowledge of past experience to identify what worked before is an efficient strategy. This past evaluation provides reference points for inference of future possibilities, which are then generated within a narrow range.

The mutation ranges are adjusted every generation. The vectors of the evolution of each subsequent generation are constantly adjusted as well. As information becomes available from the resultant generation, it is compared for fitness with the environment. The historical record of past generations is accessed and the most likely mutation vector is introduced to guide the subsequent generation. The process repeats every generation to access prior experience and to assess fitness before the development of a new vector sequence for the next generation. This strategic coherence trumps pure randomness.

The probabilistic ranges of the mutation vectors are narrowed or broadened every generation in order to produce more accurate and efficient vector pathways and evolutionary processes. This process produces a system of intentional evolution with deliberate mutation vectors.

(4) Accelerated Intentional Evolution

Not only are mutations nonrandomized in the present system, they are also accelerated. By variably adjusting mutation vectors between generations, the system allows the greatest degree of acceleration of the evolutionary computation process.

In addition to adjusting mutation vectors, the EC process is accelerated by faster matching of each generation with an environmental goal.

Modulating the mutation rate as well as the vector differentiation accelerates the overall rate of evolution of the generations. Moreover, adjusting the evolution pattern to reduce mutation changes accelerates the evolutionary process.

Insofar as it learns from the experience of past matches of older generations with their environments, which it does by accessing a general catalogue that allows the system to focus on successful prior matches, the evolutionary process is increasingly informed about the mutation vector variability and mutation rates. The system can avoid what has not worked in the past and can refocus on what has worked and what may work in the future, particularly by comparing past combinations with similar environments.

In another embodiment of the system, the acceleration of the intentional evolutionary process occurs by using parallel processing capabilities. A number of the generations are divided out and processed by separate computing resources in order to achieve more rapid solutions. In this model, the separate generations are structured to compete with each other in order to identify more effective solutions in a winner-take-all way. Separate types of populations develop different solutions simultaneously by separating into diverse groups. The separate populations are bred efficiently and the differentiated solutions are recombined to solve specific BOOPs. In a complex organization of parallel GA metaheuristics, loops of deconstruction and recombination of parallel GA are constantly reorganized in networks. This model uses incentives to induce the competitive populations to accelerate the problem solving process. The use of efficient GA with parallel processing combines elements of sequential processing with distributed computing.

(5) Limited Number of Generations

In biological evolution, mutation rates are slow and require many generations to adjust the populations to a substantial environmental change. In traditional GA, which emulates biological evolution by using purely random mutation mechanisms, the rates of evolution are also relatively slow. This traditional model often requires the generation of many thousands, or even millions, of generations to solve complex optimization problems.

The challenge is to identify ways to accelerate this process without compromising performance. One main way to achieve this goal is to find methods to limit the number of generations. This is performed by adjusting the range of mutations.

By limiting the scope of mutations between generations, the vector of the pathways between generations is narrowed. Contrarily, by widening the scope of mutations, the evolutionary vectors are broadened. In solving BOOPs, the wider mutations are able to identify solutions in a limited number of generations. However, these solutions are less precise than solutions generated from narrower mutation vectors.

(6) On-Demand Gene Activation

Another way the present system modifies the traditional GA model is to selectively activate specific genes on demand. When a gene is known to activate a specific function, such as a known solution to a BOOP, it can be inserted into the population at will. This process will test specific genes for specific effects. This model allows the system to experiment with turning on and off specific genes at key times rather than generating millions of random generations to find a solution. This process facilitates the intentional evolutionary computing process.

This gene-insertion process is performed by accessing a central catalogue, determining prior solutions to similar problems and reverse engineering the appropriate gene for achieving the goal of solving a BOOP.

(7) Evolutionary Scenarios

An additional method for improving the performance of GAs in solving BOOPs involves identifying the scenarios of evolution. Not only are specific mutation and crossover vectors modified in real time to respond to a present environmental state; the sum of the transformed populations are modeled as well. These models track the fitness landscape of the evolutionary process as the variable mutations and crossovers are modified to create newer populations.

When this modeling process is combined with the learning process gained from analyzing the past performance of the evolutionary process, the obtained feedback allows the system to focus and refocus the evolutionary track. The most successful populations are matched for fitness, and the solutions are preserved and used to inform future potential developments. The various scenarios of evolutionary development are modeled to identify the most successful solutions. Prior solutions are then used to guide the evolution of the subsequent populations by modifying the mutation vectors and crossover combinations.

(8) Selective Gene Modification

Not only is each gene modified with mutations and unique combinations to produce subsequent populations; the present system further describes a method to block the operation of a gene. Blocking a gene's function transforms the subsequent populations' results as well. The genes may be modified by self-selected combinations with other genes or by intentional mutations.

Specific intentional mutations are a form of short cut. The information from the results of past evolutionary generations makes it possible to see what works and what does not. The matching of genetically developed optimization solutions with the environmental problems allows the system to focus on ways to accelerate the evolutionary process. The intentional mutation method is a form of artificial "enzyme" that accelerates the evolutionary process to allow solutions to be generated.

(9) Periodicity Between Generations

One of the challenges of evolutionary computing models is to solve optimization problems by matching the development of populations with the fitness in the environment. An environmental change, however, presents a problem for the GA: Exactly which environmental state should it seek to match? Environmental inflexion points are critical in biological evolution as well as in evolutionary computation models. During inflexion points, a crisis in the environment requires a particularly rapid change in the rate of mutations so as to solve complex dynamic BOOPs.

In order to solve optimization problems during these crisis periods, it is necessary to modify the rate of variability of both the mutations and the crossover combinations between generations. If the evolutionary computation system proceeds to solve problems by seeking to find a fit to the earlier stable environment, the solutions will be incomplete and undecidable, because the environmental conditions have changed.

When a crisis period is identified, the present system modulates the periodicity between the generations in order to obtain more information, to adjust the mutation vectors and to obtain feedback from the environment as it is changing. The present system processes fewer generations of populations during these crisis periods. This process of adjusting the periodicity between generations during inflexion points allows the system to increase efficiency overall and to better direct evolutionary processes to solve complex optimization problems.

(10) Artificial Genetic Algorithm Catalogue

A central depository is used to track information in the artificial genetic process of the present system. The central depository, or catalogue, is updated by the processing of earlier generations.

The GA system is similar to the biological use of DNA as vessels to store data about genes which have specific functionality. As particular functionality is needed to solve problems of strong fit with the environment, the appropriate genes are activated. On the other hand, when they are not needed, the genes are inert in the catalogue. In nature, these inert genes are referred to as junk genes.

In the present system, the inactive genes are accessed in the main catalogue for effective functionality with reference to a specific present environmental problem. While these genes may have been active in the past to successfully match a past environmental problem, they are not useful in the present instance but are maintained until they may be useful in a potential future environmental matching process.

(11) Unexpected Mutation Results

While mutations are introduced to the GA system to produce evolutionary processes that vary in significant ways in order to present original solutions to problems, some mutations may present unexpected results. While these mutations do not match the present environment and thus may render the present population uncompetitive in terms of fitness, the mutations may, moreover, actually impede the genetic process. These mutations need to be recognized, evaluated and weeded out of the system.

There is an indirect effect of some patterns of semi-random mutation vectors, namely that the system heads in the wrong direction. Rather than getting closer to solutions, the system strays further away from optimal solutions. This is inefficient.

The present system identifies the misdirection of mutation vectors in comparison with a present environment and adjusts the evolution pattern accordingly.

The notion of GA is to set out to solve optimization problems without a preconceived notion of a solution. By definition, the process cannot anticipate the results of a pattern of mutation vectors. However, by adjusting, and constantly redirecting, the mutation vector pattern to more closely match the precise environmental problems, the system more likely produces accurate solutions in an efficient way.

(12) Consequences of Junk Genes

By accessing the central catalogue of evolutionary processes, the present system identifies junk genes, that is, genes that were useful in past environmental fitness matching but which are now no longer functionally useful. These sleeper genes, which lack reference to a present environmental solution, accumulate as the evolutionary process of the system progresses. While the current junk genes that accumulate in the catalogue are not necessarily presently useful in reference to the environment, they may be useful to later generations in future fitness matching to potential environmental problems. Junk genes are a sort of "impertinent" memory for the present invention.

These junk genes in the central catalogue are dormant. They act as a reserve of accumulated information on what has worked in past situations, which the system can access for future problem solving. Yet, temporarily junk genes may be useful at a future time.

The human genome, analogously, has a broad range of junk genes that no longer perform a specific function. This fact has raised doubt about the value of junk genes to human evolution, but this natural biological system provides inspiration for the present system, particularly if sleeper genes can be redirected for solving future, or unanticipated problems.

In addition to being inactive in the present generation, past functional genes that are now no longer useful may solve a particular problem in different ways. Redundancies of genes that perform the same general function in multiple ways increase the likelihood that a solution to a future optimization problem may be found. If the evolutionary vector of mutations results in the removal of an important gene, it is possible to obtain the same gene by accessing it in the central catalogue through other evolutionary vector patterns. It is thus important to organize genes in the central catalogue database of similar functional classifications so as to efficiently identify the similarities in functional operation of different genes.

(13) Combinations of Mutations

Multiple combinations of mutations create unique populations. These combinations of mutations produce combinations of attributes in the subsequent generations. These sets of attributes will influence the ability of the population to fit the environment. From such multiple simultaneous mutations that alter genes in unique combinations that solve optimization problems comes the recognition of an additional method to accelerate the development of BOOP solutions. Since latent, or junk, genes can be activated on demand, it is possible to specify the unique combination of multiple genes to solve a particular type of evolutionary problem. The system weeds out or combines mutations on demand in order to solve a BOOP.

In another embodiment of the present invention, random mutations are combined with directed mutations which may also be combined with semi-directed mutations. The directed mutations are derived from accessing the central depository and obtaining information on past successful mutations for a new environmental situation. The combination of several types of mutations in real time provides the present system with a competitive advantage in solving complex optimization problems.

In fact, the use of combinations of mutations efficiently solves combinatorial optimization problems.

When introduced into a dynamic environment, the accumulation of variations of mutation types, as combined in ways disclosed herein, leads to adaptation.

(14) Behaviors Influencing Optimal Evolution

Most of the aspects of the GA process involve the internal logic of the evolutionary system as it matches an environment. However, other elements of the evolutionary system allow it to succeed in solving problems. One example illustrates resultant behaviors of the genes that produce a match with an environment. Since the genes produce behaviors that are useful to the fit to an environment, successful behaviors themselves (as well as their genetic drivers) are necessary. These successful behaviors of computational agents are critical to passing on the effective genetic fit. Behaviors become a proxy for the successful gene combinations and provide a regulatory mechanism for matching the genes in a population with a particular environment.

The genetic processes not only influence the behaviors, but these functional behaviors further influence the evolutionary process, thereby producing an optimal environmental fit. If the behaviors are a proxy for the genetic evolutionary successes, then working towards maintaining these behaviors is critical to successfully identifying solutions to environmental problems.

In another embodiment of the present system, the behaviors of the agents embodying the genetic populations generated by the evolutionary computation models may be camouflaged as a survival mechanism.

(B) Modeling, Environmental Feedback, Fitness Assessment and Co-evolutionary Processes GAs are computational tools. One way to express these computational processes is in the form of modeling systems. In modeling the interactive processes of GA evolution, computational solutions to complex problems are presented. One main feature of the computational modeling process pertains to the environment. An environmental problem is assessed and GAs bred to solve the problem of successful population fitness to survive specific environmental constraints.

However, in the case of biological evolution, the environment is constantly changing. At critical junctures, the environment goes through a radical change, or inflexion point, after which the environmental conditions are dramatically altered relative to an earlier state. This environmental change can be computationally emulated and modeled.

Game theoretical modeling is useful in developing a computational method to represent the evolutionary process and environmental change. In a more robust view of evolutionary computation, multiple species interact in an ecosystem in which their various behaviors change the environment itself, thereby producing co-evolutionary effects of multi-organism development.

In a simple iteration of the GA there is limited information about the environment. For instance, there is little information about the past and therefore about past evolutionary experiences. This lack of memory robs the system of learning techniques from which to draw guidance in problem solving. The system operates with limited information in the present, generally without any advanced knowledge about the future as well as the past. In these cases, the system is short-term and the search space is local.

As the system gains layers of awareness, however, additional features allow the system to obtain advantages in helping to inform and guide an evolutionary computation. For instance, as memory becomes available—at first, short-term memory, then longer-term memory and eventually adaptive memory—the system is able to learn from past experience and to draw inferences to guide deliberate action. In essence, metaheuristics are computational processes that allow the combination of memory and evolutionary development to solve complex optimization problems and to adapt to uncertain environments. By constructing a hybrid model of GA with memory functions, the present system allows the traditional GA model to transcend substantial limits to build a powerful computational technique with numerous important applications.

In biological systems, there are typically several main stages of development. First, there is a growth stage. This is the stage of accelerated mutations to adapt to a new or rapidly changing environment. Second, an equilibrium stage adapts to a stable environment. Third, a refinement stage adapts to the stable evolution of a changing environment. The evolutionary process of a species will correspond to the changing environment. By matching the developmental process of the environment, a species will survive. Computer systems use models that emulate these developmental processes and environmental changes to solve complex optimization problems.

(1) Environmental Feedback and Intentional Mutation

Not only does the artificial organism emulate the genetic evolutionary process in order to evolve to fit an environment, but an environment will change and present feedback mechanisms to the species. Since the objective is to identify the best fit between a given population and a particular environment, the constraints of the environment are a critical determining factor of success at solving computational problems. In a static model, the genetic mutations randomly occur and the system waits to generate a fit with a particular static environment. However, in an active model, the environment is changing and the environment "pulls" mutation effects in the evolutionary species.

The interaction between the environment and the genetic evolution process is a symbiotic system in which the environment produces critical feedback mechanisms for the evolving species. The environmental change rate requires the evolving species to modulate the speed and direction of the mutation vector patterns to mirror the environment's development. In a strong model, the evolving species is responsive to its environment. The interaction between the species and the environment creates a redirection of mutation vector pathways on demand as well as modulation of the mutation rate.

In one embodiment of the present system, not only does the species evolve to solve problems in the static environment, but the co-evolutionary relationship of interaction between species and environment allows the computer model to reverse engineer a solution from the environmental configuration and trajectory. In turn, the species evolutionary vector pattern changes to better design optimization solutions.

This model, which accommodates the co-evolution of the species and the environment, produces not only critical feedback to guide the species' evolutionary mechanisms, but an important experimentation process in which the environment is constantly tested by the evolving species. The reaction from the experimentation process then provides valuable information on directional development of the species that it uses to modulate its evolutionary direction and speed. This process provides a mechanism of constant evolutionary re-calibration in order to solve optimization problems. The end result is that not only are BOOPs solved within resource constraints, but they are solved in an evolutionary environment that results in adaptation.

(2) Fitness Assessment Process

One of the key aspects of evolutionary computation is the fitness assessment process. The fitness of each newly generated population is matched to the environment. If the constraints of the environment are matched by the particular population, then the optimization problem is solved. The fitness matching process is performed in real time by comparing an evolved population to a present environment. As the environment changes, the fitness of the evolving population changes, thereby requiring a constant matching between evolved population and shifting environmental conditions or constraints.

If the environment constantly changes, the process of testing the fitness of the population to the environment must be active. The system constantly probes the environment, seeking solutions in the form of an optimal fit. The best available fit of the species to the environment presents a competitive model. Beyond mere survival, which is reflected in a match of gene configuration to the general parameters of an environment, there exists an optimal fit that presents the best opportunity for a species' success. The optimal criteria transcend mere fitness criteria.

By comparing the past fitness of previous generations of a species to prior environmental constraints, and by constantly updating a central catalogue of past species-environmental matching, the present system develops a model that satisfies the evolutionary constraints of a given environment. Access to information about past fitness assessments allows the present (and future) generations to have advantages of prior experience to update mutation vector pathways; such advantages increase the chances of success in assessing fitness for subsequent attempts to match complex environmental constraints and to solve optimization problems.

(3) Fitness Testing Interactivity

As the populations in the efficient GA model are bred, their fitness is compared to the environment. The most fit populations are retained and bred again while the least fit are pruned. This comparison process involves continued fitness testing as new populations are generated and compared to the environment. The interactive aspect of the fitness testing process is a critical part of the GA process.

At least two mutation vector options are compared with the environment at each population generation junction, with the solution of the present environmental state taking the highest priority. Evolution pathway vectors are determined by matching the optimal population to the present environmental constraints. When a sub-optimal solution is presented, it is rejected. The efficient GA computational model selects out sub-optimal options and seeks to reinforce the successful genetic options.

As the environment changes, it presents different criteria for selection. The evolving environmental criteria involve the adaptation of the evolving GA populations during each phase of the process. The interaction between the genetic evolutionary process and the evolving environment becomes dynamic. In order to survive, the GA populations must satisfy a range of conditions within the environment. A population that may have been optimal in one phase of environmental conditions may not be so in another. There is an optimal window of opportunity in matching a transforming environment to evolving genes; within it, multiple selective conditions may be satisfied by two or more environmental sets of constraints.

The feedback that the genetic evolutionary process obtains from constantly matching with a changing environment provides an interactive model for fitness testing. This feedback mechanism actively directs the evolutionary characteristics of the genetic system by "pulling" the alteration of the genes to the environment rather than randomly waiting for an accidental fit. Particularly in the case of a changing environment, the random model is extremely inefficient because it needs to begin again with every major alteration of environmental constraints without any advanced knowledge of the environmental change.

When combined with access to a central catalogue of past mutations and their fitness to their respective environments, the present system is made increasingly efficient. The use of the catalogue to access past events, when combined with the active feedback mechanisms of the present model, produces a dynamic effect of guided interaction between the evolving GA and the changing environment.

The present system outperforms traditional GA at testing and matching evolving populations to their environments. By pruning out unsuccessful matches, by narrowing the mutation vectors, by directing the mutation and crossover combination vectors and by matching these evolving genes interactively to the environment, the present system is far more accelerated and efficient than prior systems.

(4) Limited Prediction of Fitness

The evolutionary process whereby aspects of each generation of populations change to accommodate the environment depends on constant short-term adjustments. At each phase in the development of a generation, the fitness of a population is compared to the environment. There is an advantage to short-run re-assessments with each new generation as the results of their new crossovers and mutations are compared to the environment at each phase.

As each new generation is compared to the environment, the GA process requires feedback from the environment regarding the appropriate fitness to satisfy constraints. This fitness matching process then directs the development of the next generation. The problem is that several lags exist between (a) when a population is produced, (b) when it is compared to the environment, (c) when the feedback information about fitness is presented and, finally, (d) when the suboptimal generation is pruned and the optimal generation is selected for further breeding. The lags are particularly pronounced in evolving environments.

These lags create a bottleneck in the traditional GA process. The present system uses criteria to match subsequent populations to the environment more efficiently, yet the horizon of predictability that the use of criteria to accelerate the feedback mechanism allows is not unlimited. While the present system accelerates these lags by providing feedback of a match and pruning the suboptimal populations, prediction of fitness based on these feedback processes remains limited. The system is primarily useful in short-run solutions.

Fitness landscapes are used to model the range of optimal solutions to evolving environments. The fitness landscape model presents a way to see the evolutionary patterns and to adjust the feedback mechanism between the GA and the environment. This modeling approach is particularly useful in mapping optimal solutions to changing and unpredictable environments. In this case, the fitness matching mechanism is inversely related to the degree of the change in the environment; a rapidly changing environment produces a slower response from the evolving GA populations as they adjust, even as the changing environment produces a feedback mechanism that is interactive with the GA evolution. As the environment achieves equilibrium, the GA progression experiences a lag before achieving fitness equilibrium.

(5) Genetic Mechanism to Evolve to Changing Environment

Prior population-environment matches are assessed by present GA populations in the central catalogue. This advantage of accessing past fitness matches presents mutation vector and crossover options that increase the likelihood of success in similar environmental conditions.

Since the environment changes, satisfying the constraints at one time will not be the same as satisfying the constraints of the environment at another time. Consequently, it is important to identify a range of options for the satisfaction of general constraints. Further, if one solution would satisfy the constraints of one environmental situation, it is possible that it would also satisfy the constraints of a future situation. In fact, as explained above, the central catalogue contains examples of past matches that are no longer valid in a current environment and which appear as junk genes, yet these may be active and useful in a future environmental situation. In a sense, the limits of each phase of an environment will in effect pass information to the GA evolutionary process that affects the evolutionary characteristics of the system.

By identifying a range of environmental options for constraint satisfaction, it is more likely for the GA populations to match an evolving environment. In particular cases in which the environment is indeterministic and rapidly evolving, we do not know when the future possible environment will match specific GA populations, or even which populations. In this regard future forecasting models with either the traditional GA or the efficient GA metaheuristic search methods are limited.

(6) Directed Co-Evolutionary Process

The passive model of the traditional GA suggests that through a series of random processes and natural selection, the evolutionary process will eventually match an environment and solve problems by finding an appropriate fit. The present efficient GA model indicates numerous methods to accelerate this process. One consequence of this model is the development of a co-evolutionary mechanism.

The present efficient GA model suggests not only that the organism is influenced by the conditions of the environment, but also that it is possible for the organism, or multiple organisms, to influence the evolution of the environment itself. Particularly since the environment is constantly evolving from inputs from various constraints, these changes influence the range of optimal solutions for presenting an organism's fitness. However, the organisms themselves influence the environment as they influence the environmental variables in the ecosystem.

This dynamic process produces a co-evolutionary model without equilibrium since the organism and the environment are constantly evolving. There are brief windows of constraint satisfaction in which optimal ranges are reached between the EGA evolutionary process and the changing environment, but biological history shows that ultimately all species will become extinct as it is impossible in the long run to satisfy all constraints. On the other hand, if the environment itself can be controlled, it is possible to create a stable co-evolutionary model in which there is synchronization between the two evolutionary processes. In these cases, an exogenous factor influences a change in the environment that requires the rapid genetic evolution of a species if it is to survive. During these inflexion points, there is increased mutation and crossover variability. As the EGA evolutionary process adapts to the new variable, however, the system returns to its stable state.

In the case of solving complex optimization problems in particular, the adjustment of variables on the environmental side allows the hybrid GA process to adapt to non-static situations and to experiment with solutions that allow it to adjust to the constraints.

(C) GA Shortcuts and Fuzzy Logic Applied to Computational Economics

The importance of GA shortcuts and soft computing to computational economics is articulated in this section. First, computational economics is described. Then the value to efficient computing models of GA shortcuts, as illuminated in the present invention, is explained. Lastly, the computational technique of fuzzy logic is combined with the present efficient GA model to illustrate an even more efficient model.

(1) Computational Economics

The economics of computing modeling emphasizes the efficiency of the use of computer resources. For example, computational economics has been applied to network computing in order to assess the most efficient usage patterns, assigning a lower value to off-peak times and a higher value to peak use times.

A key question that arises is how to optimize the use of limited computational resources. This is particularly problematic in cases in which there are finite computational resources, such as in systems with major constraints of size or extreme environmental conditions. In these environments it is critical to conserve computational resources. In order to maximize the efficiency of the computational resources, the inputs and the outputs ought to match; in this sense, the economy of the process will be optimized. An efficient metaheuristic is akin to a calorie restricted diet; much as a good diet has the effect of optimizing the performance of an organism, an efficient metaheuristic will optimize the performance of a computer system.

The present system is designed to increase computational efficiency at solving a particular critical class of optimization problems, viz., the BOOP, to which the MOOP can be deconstructed. Once ways are identified to solve the BOOP efficiently, then other optimization problems can be solved rapidly as well.

While there are limits to the prior local and neighborhood search metaheuristics, the efficient GA metaheuristic delineated in the present invention solves many of these constraints and most efficiently solves BOOPs. One main idea of the efficient GA metaheuristic is to use only the minimum computational resources necessary to achieve a short-term goal. Use of the present system's global information—namely past-based catalogue information about prior experiences and fitness matching—focuses the model and allows development of increasingly effective solutions. Rather than taking the direction of the greedy solution in which the maximum limit is always selected first, the present invention uses minima optimization criteria in which the simplest path is typically preferred to solve a problem in real time. In practical use under resource constraints, the present system defaults to minimum selection criteria. In this way, just enough resources are used to solve problems, so as to conserve the computational resources.

In actuality, there are layers of efficiency that modulate according to the availability of computational resources. The system continually steps up and steps down its use of resources relative to their availability and flexibility. This component of the EGA approach behaves as a switching engine or active metaheuristic filter that assesses the appropriate tool within constraints to solve a problem. This pragmatic model realizes waves of efficiency in the application of efficient evolutionary computation.

In particular, the present system uses a shorter number of generations, increasingly efficient breeding of genes, the modulation of mutation vector pathways, interactive fitness matching mechanisms and co-evolutionary processes to create non-random, or directed, solutions to complex problems. In addition, by using parallel computation, that is, by dividing the problems into parts and having each part simultaneously processed and then recombined, it is possible to accelerate the efficiency of the computational problem-solving processes even further.

(2) Genetic Evolution Shortcuts

The efficient GA model described in the present invention presents a new kind of computing system. The present system uses a variety of shortcuts in which logic, memory and learning processes are coordinated and accelerated. An analogous shortcut in nature is the application of enzymes to rapidly accelerate specific biological protein network processes. In the present system, the efficient GA model rapidly accelerates a computational procedure whose goal is to solve an optimization problem. The combination of the several distinct techniques specified in the present invention creates hyper-efficiencies akin to the application of enzymes in biologic systems. The combined effects of these efficiencies produce some pregnant synergies in optimization problem solving that are particularly suited to engineering applications involving computational constraints.

One of the prominent shortcuts specified in the present system is the use of memory in the form of access to a central depository. By accessing a catalogue of prior evolutionary patterns and their matching, the present system has advantages of experiential information that far transcends past random-limited models. The use of a memory module, akin to local search metaheuristics (TS, SS and AMP), by an efficient GA metaheuristic as described herein, produces a powerful tool that is applied to optimization problems. By accessing memory, the process learns rapidly from past mistakes and more efficiently adapts to its environment.

In general, by combining various techniques to narrow the range of solutions, the problem solving process is rapidly accelerated.

(3) Soft Computing in Genetic Evolution

The present model uses fuzzy logic to integrate a hybrid technique to approximate a solution in order to further increase the efficiency of the problem solving processes.

In other models, the last fifty percent of computing power is applied to refine the last one percent of a problem. This is obviously highly inefficient. FL is applied to this challenge by reducing the requirements of finding a precise solution.

In economics, the problem of finding a solution to a problem of maximum efficiency is presented as a form of marginal utility. In most cases, there is a limit after which there is not an efficient use of resources. For instance, once a household has bought all of its essential goods, it simply does not need more stuff. Therefore, when it hits this peak, it is not efficient to buy more. Similarly with computational problem solving, there is a threshold point after which it is inefficient to continue to expend resources to seek a solution.

The amount of precision used to solve a problem needs to fit the situation. In general, the more efficient computational models, such as the efficient hybrid GA model presented here, will not seek to find perfect solutions, but rather to minimally solve optimization problems within a range. In some cases, FL is useful to guide the progress of an efficient GA to a rough solution. The use of FL-driven rough estimates of evolutionary pathway vectors dramatically increases efficiency and limits the expenditure of scarce computational resources.

(4) Resource Constraint Categories

Efficient GA processes are applied to constrained resources. In addition to computation resource constraints there are several other key constraint categories that effectively apply efficient GA models to solve optimization problems. Prominent constraint categories in many engineering problems include communications constraints, information constraints, temporal constraints and memory constraints. A constraint category that is not satisfied becomes a bottleneck. In the case of communications, for example, if there are intermittent communications capabilities, the mission will not be optimized.

In the context of a resource category limitation, it is necessary to solve a problem at a key juncture. The question that the present system asks when solving these problems is: what are the minimum resources that are required to pass a specific threshold at the present time?

In the case of temporal constraints, the problem is deconstructed to a series of optimization solutions. Temporal dynamics are reduced to a multi-phasal problem in which the available resources are used to solve the problem as rapidly as possible.

In the case of computational constraints, the problem is reduced to its simplest components. The optimization solution becomes one of constantly prioritizing for the most efficient use of resources to solve problems. This solution involves the system engaging in bursts of intense activity separated by periods of extended inactivity.

Computer memory is also a key category of constraint. Accessing the memory system requires overcoming bottlenecks, particularly during periods of maximum capacity. Identifying ways to access different types of memory and to balance the use of different types of memory in order to achieve a particular goal is the challenge of many engineering problems.

In the case of communication constraints, the modulation of bandwidth use is critical in order to maintain an efficient network. Communications networks will continuously reroute the pathways of their systems in order to modulate their most effective use.

In computer networks, the continuous modulation of computational resources and communications resources is performed as well. If some computer nodes are underperforming, tasks are routed to others that have capacity; similarly, if the communications network achieves maximum function at a particular time or place, the network is rerouted to other parts that have unused capacity.

Clearly, more resources allow a longer-term emphasis, deeper analysis, increased dynamics and more complete solutions. But in practical engineering systems, these goals are ideal. In most cases, it is necessary to deal with the limits of available resources. In these cases, the present system is tremendously beneficial in solving complex problems.

(D) Dynamics of Interacting Evolutionary Aspects

There are several layers of natural biological evolution. These include the genetic, the epigenetic, the behavioral and the symbolic. Each of these functions provides guides that allow a species to be evolutionarily successful. While the genetic element is well described in the literature, the epigenetic aspect deals with complex cellular processes that have co-evolved and that affect genetic mutations and natural selection mechanisms. Similarly, the behavioral and symbolic (language) layers provide a species with tools to cooperate, share information, express preferences and ultimately to survive; the survivors then pass their genes on to future generations.

The present invention looks to systems biology models to understand ways to computationally solve complex optimization problems. By integrating some of these techniques into the efficient GA model, the present system transcends traditional GA approaches.

(1) Evolutionary System Categories

In addition to the traditional genetic evolutionary categories, there are several additional influences on evolutionary processes. These include epigenetic evolutionary characteristics and behavioral evolutionary characteristics. These additional evolutionary layers affect the genetic operations of natural selection that involve identifying solutions to complex problems. A simulation module computationally matches an evolving species to its environment and assesses the genetic fitness of candidate solutions.

In biological systems, the epigenetic layer delineates cellular processes that affect genetic evolutionary pathways. In computational systems, the epigenetic layer affects aspects of the species. The equilibrium points in specific evolutionary techniques involve interaction, specifically, crossover candidate selection processes and mutation vector selection processes: these processes comprise an analytical component manifest in the epigenetic layer. Use of this critical layer, which continually updates, and accesses, a central catalogue facilitates learning and adaptation processes. The epigenetic layer relies on memory components to learn and thereby to guide mutations.

Similarly, behavioral components intermediate interaction with the environment. When a population is compared to the environment for relative fitness, the behavior of the system provides feedback that involves interaction. Specific behaviors are cultivated by matching a specific environment. The learning process that is embodied by the epigenetic layer is guided by the behavioral layer as it interacts with a particular environment in seeking solutions of optimum fitness.

Simulation modeling is a process that matches the genetic fitness of a population to the changing environment. Over time, the simulations produce a fitness landscape of optimal conditions for a successful species, which transcends any particular population. The longer-term view of the simulation allows the model to anticipate environmental change by extrapolating data from the model.

While the DNA backbone of the system retains its integrity, the genetic layer guides the mutation of populations with directed vector patterns based on feedback from the environment and on access to a catalogue of prior experience. The epigenetic layer reacts to the environmental change, thereby allowing intentional evolution. The behavioral layer provides feedback that is necessary to increase the rate of intentional change by adjusting mutation vectors and crossover combinations. The simulations guide the model further by providing a view beyond the present analysis and circumstance to more fully inform the other layers.

Given limited computational resources, the system defaults to its simplest local search process. However, with more resources, the process provides a highly efficient and accelerated optimization problem solving model.

Overall, the system solves the problem of identifying global information to use in the local search process to solve BOOPs in real time.

(2) Evolutionary System Dynamics

The present system affects additional dynamics involving the interaction of various evolutionary elements. First, the local and global information systems interact. Second, in the context of a computing network environment, there are relationships between the computing and communications elements. Third, there are analytical and active functions. Finally, there are dynamics between these elements.

The present system is designed to operate in complex computer networks to solve problems in real time. In most situations, the computer systems in which the present invention operates have substantial resource constraints. A computer network is analogous to a biological regulatory network comprised of proteins in that various feedback mechanisms guide the behavior of the protein network to perform its functions within optimal constraints.

The present invention goes beyond the biological system analogies, however. While there are natural limits of protein networks, artificial adaptation mechanisms present superior results. What may take millions of years to solve in biological systems will take a few moments in a computer system using the present invention.

The present system seeks to continuously achieve optimum conditions by co-evolving a computational species with an environment. As the system analytically computes the best path to achieve a solution to an optimization problem, it also acts by taking a step during each generation toward seeking the best fit with an environment. These actions are compared and provide feedback in the system to continue to analytically solve the next problem, which leads to more action and so on. The dynamic feedback process that produces the co-evolutionary model is interactive and adaptive. The present system provides the most efficient path to achieve a solution to a BOOP.

(E) Synthetic Metaheuristics

Various metaheuristics—including local search and swarm intelligence techniques—are applicable to the present efficient GA model in order to construct novel hybrid GA metaheuristic models. In particular, the TS, SS, ACO and PSO techniques are applied to the present system to produce synthetic hybrid metaheuristics with increasing effectiveness. Each specific metaheuristic is applied to the present system in a particular context to further increase its efficiency in solving optimization problems.

(1) TS and Efficient GA

Tabu search operates by updating a short term memory about previously searched space and removing previously searched space—determined by updating and accessing the memory—from subsequent searches.

TS is applied to the present system by constantly updating and accessing the catalogue of events produced from the experience of GA mutation vectors. TS operates as an epigenetic mechanism that checks the memory, defines the search parameters and guides subsequent mutation search processes in a directed manner. By eliminating what has been shown not to work, the TS provides an efficient mechanism for guiding the critical mutation elements of GA evolutionary processes. This directed mutation mechanism provides vastly accelerated performance compared to traditional GA models.

In another embodiment of the present system, TS is applied to crossover combination vectors, so as to limit and direct the development of the reproductive element of the hybrid GA process.

(2) SS and Efficient GA

Scatter search develops a method of updating an initial random search by interpolating the initial outcomes and creating a memory that is constantly updated by the compromises of subsequent search patterns. SS is applied to the crossover combination elements of the hybrid GA model. By continuously compromising on a range of crossover combinations, and by accessing a memory component that actively learns from feedback of comparing actual environmental results, the present system is made much more efficient.

In still another embodiment, SS is used to partition the search space of mutation vector parameters. By using this synthetic technique, mutation vector directions are optimized.

In another mode of applying local search mechanisms to the present efficient GA system, adaptive memory programming is applied to both the crossover and mutation mechanisms. The advantage of AMP is that it possesses a longer-term memory mechanism that is capable of accessing more global information and is applied in the context of local GA search. AMP is used to actively access the central catalogue for further genetic comparison. The learning mechanism of AMP is particularly suited to the interactive processes of environmental feedback.

(3) ACO and Efficient GA

Ant colony optimization is a metaheuristic that learns by using the cooperating elements of its system to reinforce learning between its members, much as a group of ants work together to forage for food. In general, the ACO metaheuristic process is short-term; once the pheromones wear off, they will no longer reinforce positive behaviors.

ACO is integrated with efficient GA by facilitating and increasing the efficiency of the fitness matching process between the genetic evolution and the environment. Since the matching process is interactive and requires feedback, the ACO is useful in accessing a short-term memory to match candidate solutions to the changing environment. The ACO method reinforces strong connections between the environment and the evolving system and limits weak connections. This mechanism of reinforcement in the interactive matching process rapidly accelerates the system to increase its efficiency.

(4) PSO and Efficient GA

Particle swarm optimization operates by having individual members interact to efficiently achieve a group goal, much as a swarm of bees behaves when attacking a predator. PSO has a longer-term memory than ACO. This is useful in application to efficient GA.

In order to maximize efficiency of the GA process, it is important to not only match the environment, but to anticipate environmental change and to co-evolve with the environmental change. The PSO model provides a mechanism for accessing longer-term memory to allow the simulation model to assess a longer-term fitness landscape, which then informs a co-evolutionary process between the genes and the environment.

In another embodiment of the present invention, the stochastic diffusion search (SDS) metaheuristic is applied to the same process in order to differentiate between members of the swarm. In this event, the individual swarm members have direct contact, which reinforces the memories of the members when performing specific simulations and reinforces the learning mechanisms between the genes and the environment, thereby creating smoother co-evolutionary processes.

Both PSO and SDS provide longer-term memory access that increasingly provides global solution candidates to local problems. Particularly since the traditional GA model not only is limited to local search but also proceeds with no memory mechanism, the present model, with its unique hybrid syntheses, provides a clear map for combining (both short-term and longer-term) memory with GA and global information for local search. The consequence of these combinations is a clear increase in effective solutions and far more rapid solutions than previous metaheuristic techniques alone achieve.

(F) Applications of Hybrid GA

There are numerous practical applications of the present system. In particular, the present invention is ideal in applications of modeling. These modeling applications include economic modeling, physical modeling, biological modeling and modeling of dynamic systems. In addition to modeling, the present system is applicable to computation systems (including network computing), communications systems, evolvable systems and robotics.

(1) Computing Systems

The system is ideal for computing systems with severe resource constraints. Whereas the reduced instruction set computing (RISC) model was a hardware computing architecture for resource constraints, the present invention provides a software system for resource constraints. In the context of computing, the invention maximizes the efficiency of the computer system. In the context of network computing, the network capacity of the system is maximized by using the present system because it seeks to constantly optimize resources.

In particular, the efficient GA is applied to organizing data in distributed databases. In addition, the efficient GA is applied to methods of accessing memory devices in semiconductors, particularly microprocessors.

Network computing is applied to enterprise systems. In one application in particular, viz., autonomic computing, the present system is highly effective at maximizing the processes and functions of self-diagnosing, self-regulating, self-defending and self-correcting network computing systems.

Specific classes of BOOPs are applicable to computer networks. These affect the scheduling, routing and load balancing problem categories.

In particular, the present invention is useful for adaptive network computing processes.

(2) Communications Systems

The present system is applied to communications systems by modulating the networks to create optimal plasticity. In particular, the present system is useful in optimizing the topological configuration of communication networks by continuously rerouting the networks.

(3) Robotic Systems

The system is useful in applications to robotics. The invention is applicable to a broad range of robotic control systems to improve efficiency as a robot interacts with its indeterminate environments.

(4) Evolvable Systems

There are several classes of evolvable systems, including evolvable hardware. Field programmable gate arrays (FPGAs) are semiconductors that evolve and are used for rapid prototyping. FPGAs are organized to continually modify to their indeterministic environment.

The present invention is optimal to provide FPGAs with critical software components to accelerate these evolvable behaviors and radically improve operational functionality.

In particular, the system is used as a limiter to restrict the range of operations in an indeterministic continuously programmable FPGA and to thereby focus and accelerate the restructuring functions to more closely mirror the present environment.

Another class of evolvable hardware applies to aggregation processes of collectives of nano- and micro-robotics. In these cases, there are severe computational resource constraints that are ideally suited for the application of the present efficient GA model. In particular, the reaggregation processes of the nano-robotic collectives require feedback from the indeterministic environment to perform adaptation processes, which the present system facilitates and enables. The interaction mechanisms between the collective system and the environment require a high degree of efficiency that the present system provides.

(5) Collective Robotics

Collective robotics systems require the present system to efficiently manage computational, communications and temporal resources in order to perform a function in an uncertain environment. The positioning and repositioning of the various robots resembles natural systems such as a swarm of ants that constantly reconfigures to solve problems such as hazard management or remote sensing behaviors. The present system is ideally suited to solve CR problems in real-time by preserving scarce resources and maximizing functionality. The use of global information in solving real time optimization problems makes the present system well suited to CR.

CR processes are also applicable to factory automation systems. These processes must solve BOOPs in real time within constraints. The present system is ideally suited to these factory automation applications.

Because it provides global information to global search processes, the present efficient GA system is useful in modeling three-dimensional cellular automata (CA) processes. These 3D CA models usefully apply to all collective robotics applications and allow, for example, robots to emulate the behaviors of a swarm of bees.

(6) Multi-Agent Software Systems

The present system is applied to collective behaviors of autonomous software agents in network computing environments. Software agent collectives use the methods delineated herein to perform complex functions of cooperation, collaboration and competition in order to solve complex optimization problems.

In addition, the present hybrid GA metaheuristic is applied to genetic programming (GP) processes. In GP, software code uses the hybrid GA techniques presented herein to develop automated programming models. This is facilitated by integrating these processes into software agent collective behaviors in multi-agent systems.

In another embodiment of the present system, all of the software agents in a distributed computing environment access and update the central catalogue that operates as the systems' collective memory. This is performed in much the same way as DNA operates in the biological system domain. As the sequences of genes are accumulated by the progress of experience, the genes are duplicated and periodically provided to the individual software agents as continuous updates. This functional process allows the system to transcend the limits of centrality so that the agents may access the global information more easily in order to solve local search problems.

In its application to each engineering category, the present system will be tailored, with specific advantages to different cases in which there are extremely scarce computational resources. In general, the present system is ideal in those engineering applications in which there is the uncertainty of an indeterministic environment.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.) the terms (including a reference to a "means") used to describe such elements are intended to correspond, unless otherwise indicated, to any element that performs the specified function of the described element (i.e., that is functionally equivalent), even though not structurally equivalent to the disclosed structure that performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

LIST OF ACRONYMS

ACO, ant colony optimization
AMP, adaptive memory programming
BOOP, bi-objective optimization problem
EC, evolutionary computation
EGA, efficient genetic algorithms FPGA, field programmable gate array
GA, genetic algorithm
GRASP, greedy randomized adaptive search procedure
MOOP, multi-objective optimization problem
PSO, particle swarm optimization
SDS, stochastic diffusion search
SOOP, single-objective optimization problem
SS, scatter search
TS, tabu search

DESCRIPTION OF THE DRAWINGS

FIG. 32 is a chart showing a metaheuristic typology.

FIG. 70 is a schematic diagram showing three phases of the process of transformation of a network using EGA to solve BOOPs at each phase.

DETAILED DESCRIPTION OF THE DRAWINGS

Figure 1:
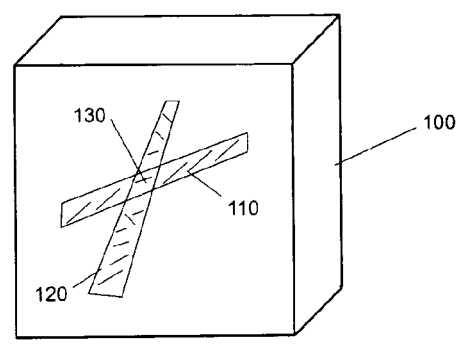
FIG. 1 is a schematic drawing of the intersection of two planes to represent a bi-objective optimization problem.

FIG. 1 shows a cube in which two intersecting rectangular planes (110 and 120) represent disparate constraints. The area of the intersection (at 130) represents the bi-objective optimization problem (BOOP). In order to satisfy a solution to the problem, solution candidates must satisfy the conditions of the area within the boundaries of 130.

Figure 2:
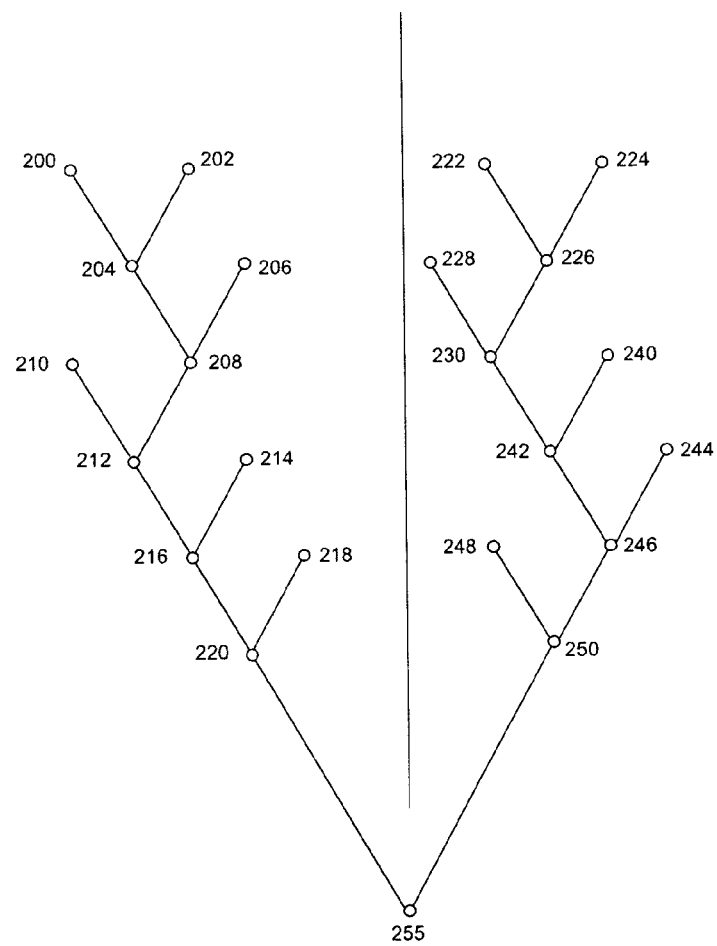
FIG. 2 is a schematic drawing of crossover components of genetic algorithm sequence.

FIG. 2 shows two genetic algorithm sequences in which multiple generations are bred and combined at specific phases. In this example, individuals at 200 and 202 are combined at 204. Individuals at 204 and 206 are combined at 208 and so on. The two genetic algorithm sequences are joined at 255.

Figure 3:
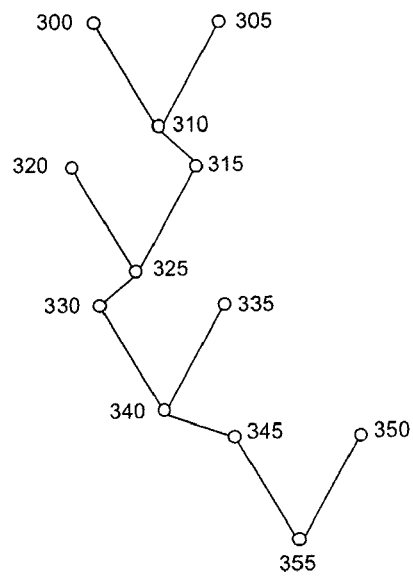
FIG. 3 is a schematic representation of mutations in a genetic algorithm sequence.

In FIG. 3, the process of mutation in a genetic algorithm is described. After the crossover of individuals at 300 and 305 to create 310, a mutation alters the specific solution outcome at 315. This revised individual is then combined with 320 to create 325 and so on until the genetic algorithm sequence reaches 355 in this drawing.

Figure 4:
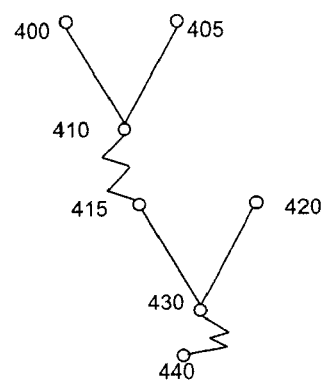
FIG. 4 is a schematic representation of complex mutations in a genetic algorithms sequence.

Complex mutations are described in FIG. 4. After combining populations at 400 and 405 into an initial outcome at 410, the system produces 415 as a supplement of a complex mutation that consists of multiple variables. This mutated outcome is then combined with the population at 420 to produce 430, which is then substantially mutated at 440 to produce a new population.

Figure 5:
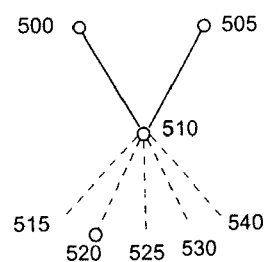
FIG. 5 is a schematic drawing of mutation vectors within a specific range of probabilities.

FIG. 5 shows mutation vector probabilities. Once the populations at 500 and 505 are united at 510, the newly created population is mutated. The probabilities of the mutation are indicated at 515, 520, 525, 530 and 540. Each of these vectors represents a relative variability of several degrees. The outcome of the example in FIG. 5 shows that 520 is the effective mutation population.

Figure 6:
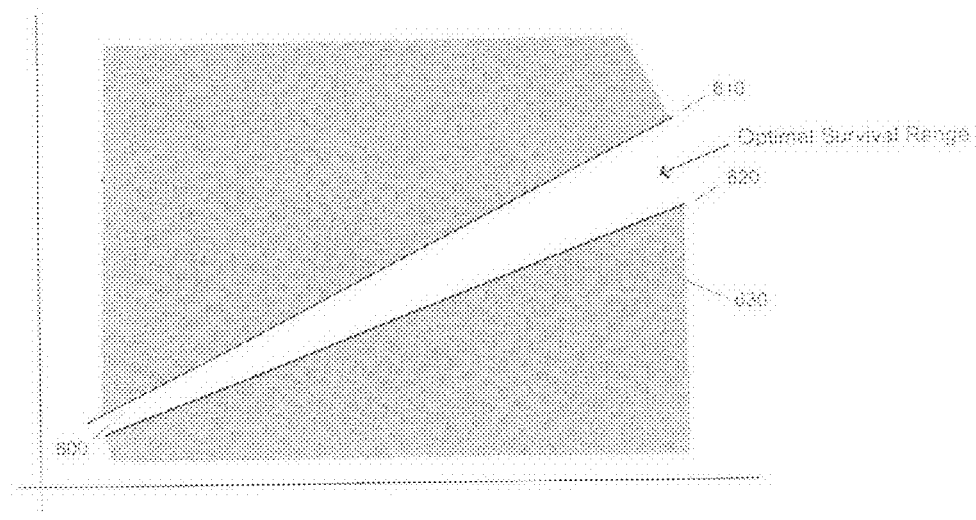
FIG. 6 is a chart showing the optimal survival range of efficient genetic algorithms (EGAs).

FIG. 6 shows the range of the optimal survival range (600) of a genetic algorithm solution between the frontiers at 610 and 620 and the boundaries at 630.

Figure 7:
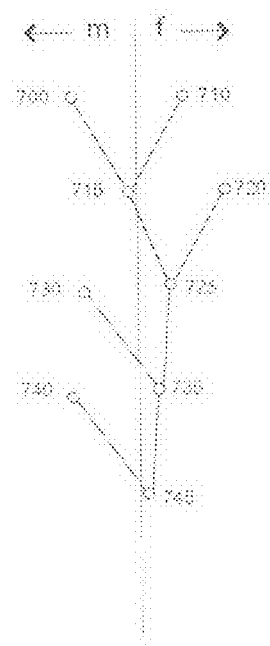
FIG. 7 is a schematic drawing showing the gender specificity of a genetic algorithm sequence.

FIG. 7 shows a genetic algorithm sequence in which males are biased on the left side of the line and females are biased on the right side. In this illustration, ultimately a female (745) GA candidate embodies the solution.

Figure 8:
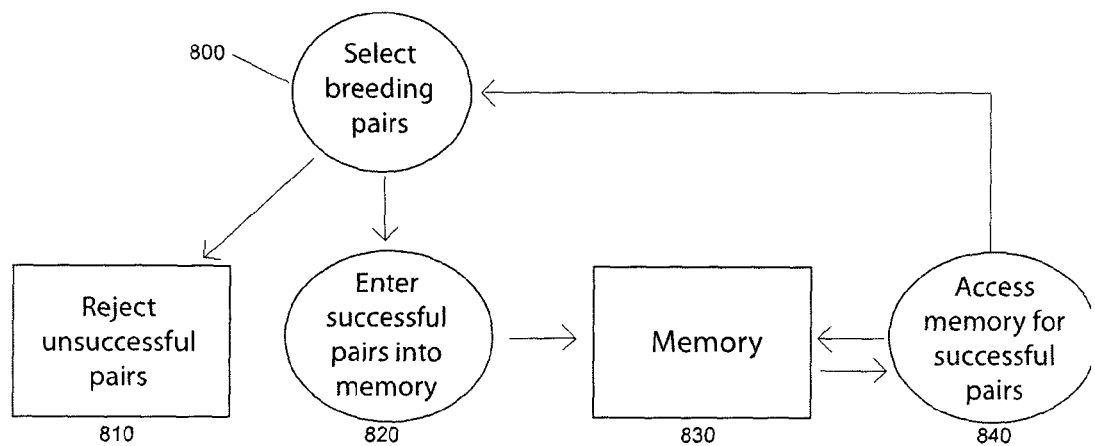
FIG. 8 is a flow chart describing the memory access process in a computational EGA.

FIG. 8 describes the use of memory in the GA process. After selecting breeding pairs (800), the system enters successful pairs into memory (820) and rejects unsuccessful pairs (810). The memory (830) is accessed for successful pairs (840), information that is available to the system for continued breeding (800).

Figure 9:
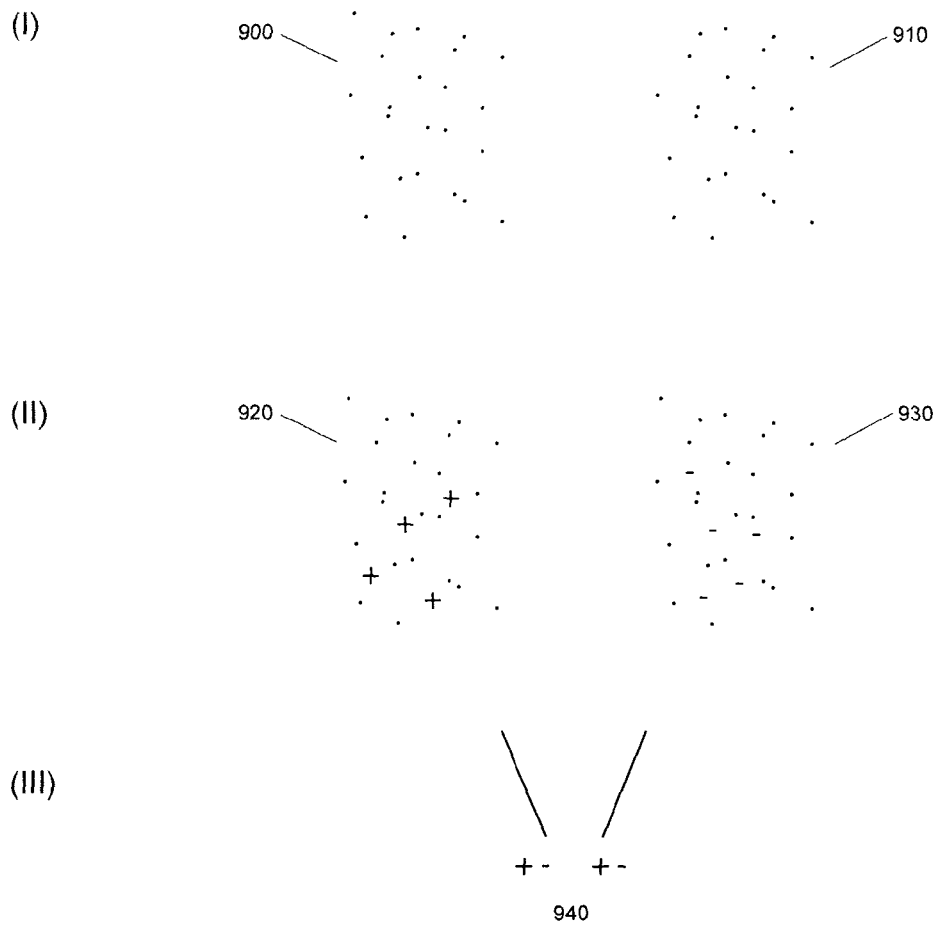
FIG. 9 is a schematic drawing illustrating the process of matching "charmed" particles after charming, prior to the EGA sequence process.

In FIG. 9, three phases are shown in which apparently random particles (900 and 910) in phase I are charged into positive (920) and negative (930) charges at phase II and combined into coupled pairs (940) at phase III. This process allows the organization of male and female lines on demand in the GA process, which facilitates the rapid breeding of EGA sequences.

Figure 10:
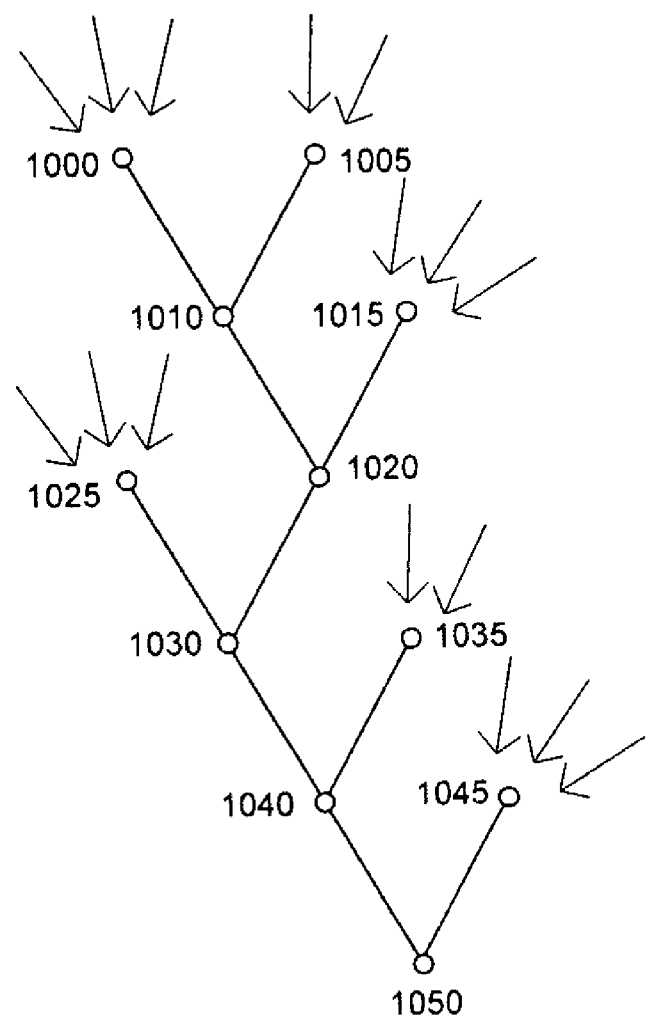
FIG. 10 is a schematic drawing showing the multiple prospective sources of new individuals used to breed in a EGA sequence.

FIG. 10 shows a genetic algorithm sequence which has multiple possible sources of new individuals that represent the outcome of specific prior breeding. In the case of 1000, 1015, 1025 and 1045, there are three choices each from which to select a single prospective outcome. Each new individual used to breed at each subsequent phase represents the outcome of the best choice of several prospects.

Figure 11:
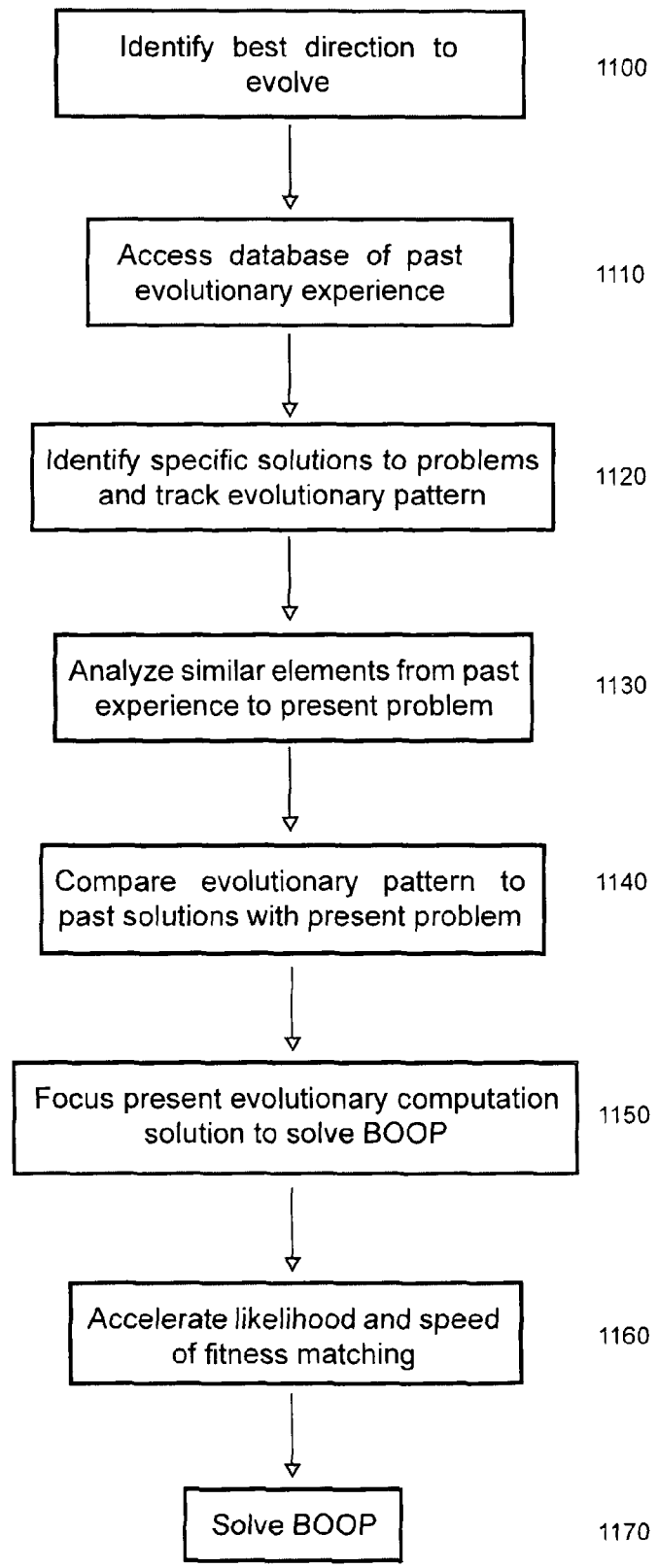
FIG. 11 is a flow chart showing the use of EGAs to solve BOOPs.

In FIG. 11 the process of solving BOOPs by using EGAs is shown. After the best direction to evolve is identified (1100), a database is accessed to obtain data on past evolutionary experience (1110). Specific solutions to problems are then identified and evolutionary patterns are tracked (1120). Similar elements from past experience to a present problem are then analyzed (1130) and the evolutionary pattern to past solutions are compared to the present problem (1140). The present evolutionary computation solution to the BOOP is then focused (1150) and the likelihood and speed of fitness matching is accelerated (1160) until the BOOP is solved.

Figure 12:
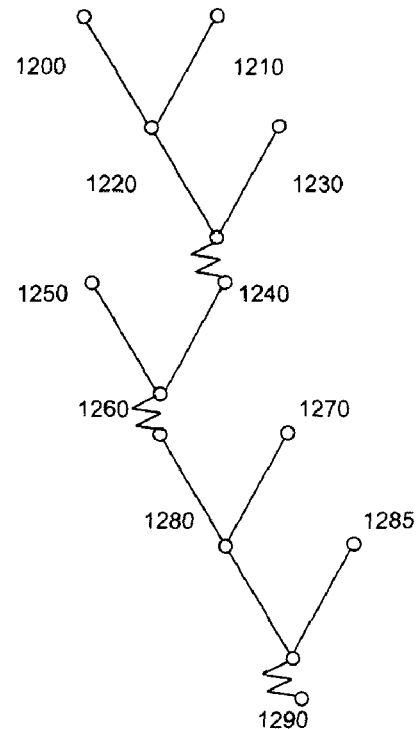
FIG. 12 is a schematic drawing showing mutation ranges adjusted at each generation.

In FIG. 12, the phases of mutation ranges in an EGA sequence are adjusted each generation. Rather than taking the same amount of time and computational analysis to breed each generation, the phase state of the mutation stage is variable, thereby allowing the process to be modulated, with relatively faster and slower processing for each stage. In particular, the phase between 1230 and 1240, the phase between 1250 and 1260 and the phase between 1280 and 1290 are longer than the other phases. This longer processing is caused by the fact that the selection of 1230, 1250 and 1280 are outcomes that derive from a delayed selection process.

Figure 13:
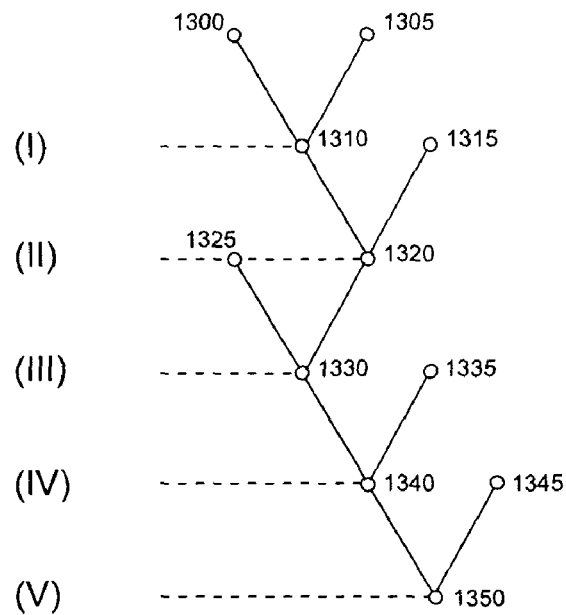
FIG. 13 is a schematic drawing describing the comparison of each resultant generation to the environment.

FIG. 13 shows several phases of the breeding process of an EGA sequence. The usefulness of segregating the phases of the process is to allow each resultant individual to be compared to the environment for fitness. As a result of this comparison process, the timing of each phase will be modulated for environmental synchronization and adjustment at each stage.

Figure 14:
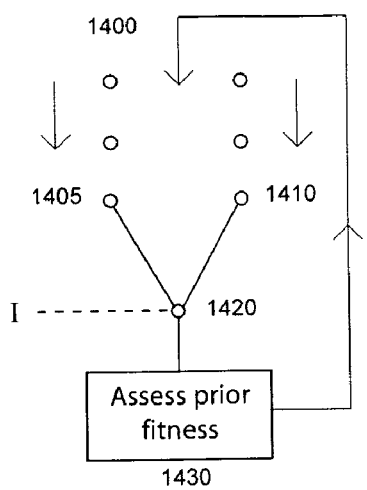
FIG. 14 is a schematic drawing showing fitness assessment of candidates at a phase in an EGA.

FIG. 14 shows a specific phase of an EGA sequence at 1420, which represents an outcome of the breeding of individuals at 1405 and 1410. At 1420, the fitness of the resultant individual is assessed. The data from this assessment is then used to inform the breeding process that feeds the individuals at 1405 and 1410.

Figure 15:
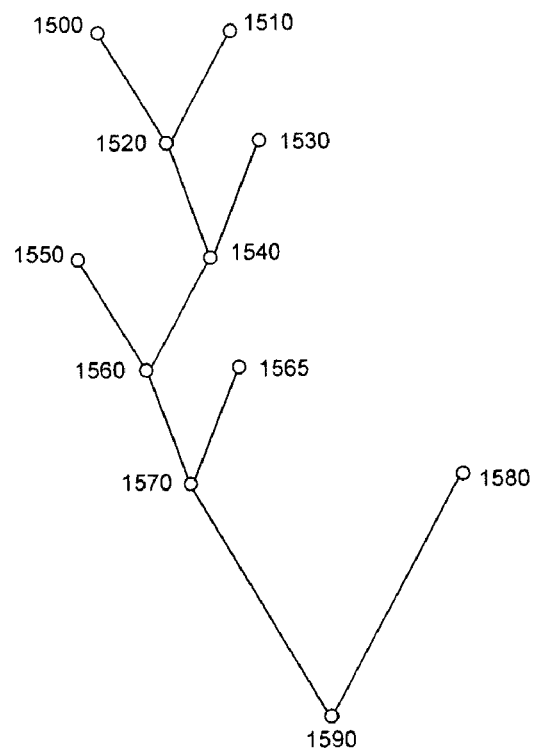
FIG. 15 is a schematic drawing showing the narrowing or broadening of mutation vectors in an EGA.

In FIG. 15, the interstices between specific combined pairs are elongated. In this drawing, the length of the connections between 1570 and 1590 and between 1580 and 1590 is relatively elongated. In addition to the length of the connections, the vector angles between the bred pairs and the progeny vary substantially. The straighter the line (the angle is reduced), the faster the processing of the EGA. Similarly, the shorter the lines between each phase in the generations, the faster the processing of the EGA.

Figure 16:
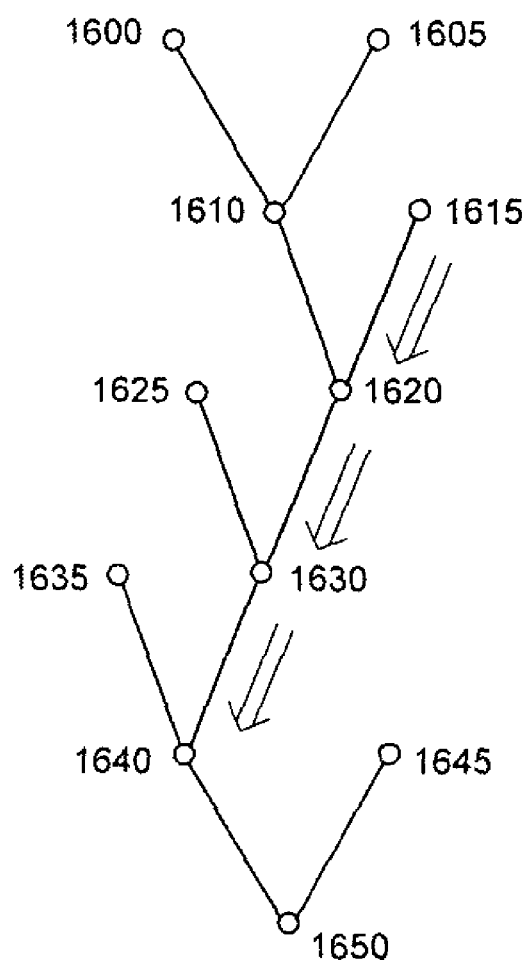
FIG. 16 is a schematic drawing showing the accelerated and variable development of an EGA sequence.

FIG. 16 shows the acceleration of processing at specific stages of the EGA sequence. Specifically, the stages between 1615 and 1620, 1620 and 1630 and 1630 and 1640 are accelerated relative to the other phases in the sequence. This continuous leg between 1615 and 1640 emulates an enzyme in nature which accelerates the protein regulatory network at a key junction.

Figure 17:
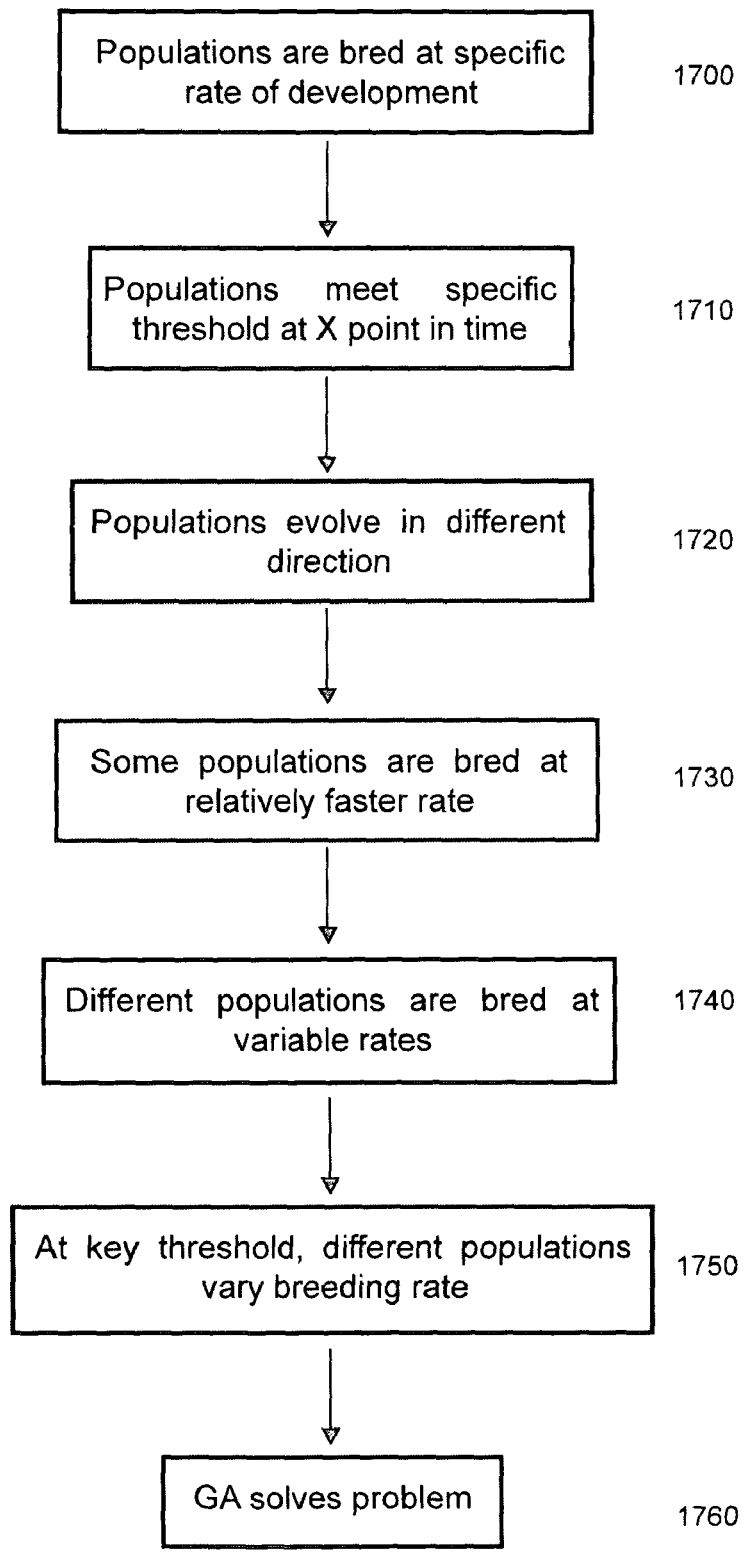
FIG. 17 is a flow chart describing the evolution of specific populations in an EGA sequence.

In FIG. 17, a system is described for the production of GA to solve BOOPs. Once populations are bred at a specific rate of development (1700), the populations meet a threshold at a point in time (1710). The populations evolve in a different direction (1720) once the threshold is met wherein some populations are bred at a relatively faster rate (1730) and other populations are bred at variable, and oscillating, rates (1740). At a key threshold, different populations vary the breeding rate (1750) until the problem is solved (1760).

Figure 18:
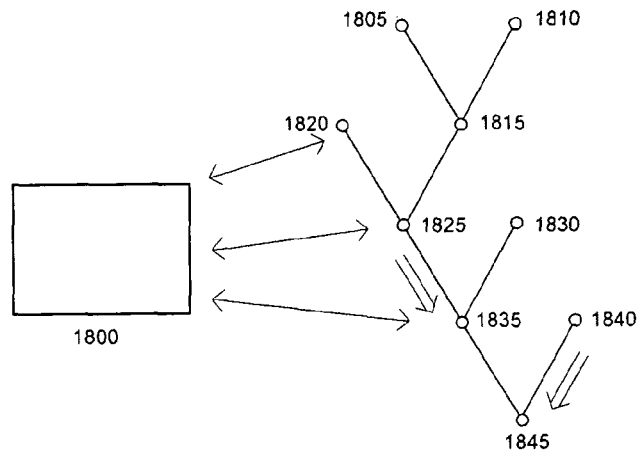
FIG. 18 is a schematic diagram showing access of an EGA sequence to prior evolutionary patterns so that the EGA development rate is adjusted.

FIG. 18 shows an EGA sequence (1805 to 1845) interact with a central catalogue (1800). The interaction process occurs at 1820, 1825 and 1835. Access to the central database is used to compare prior evolutionary patterns and to adjust the development rate. Specifically, after comparing prior evolutionary patterns in the central catalogue, the system accelerates the EGA sequence at 1825 to 1835 and at 1840 to 1845.

Figure 19:
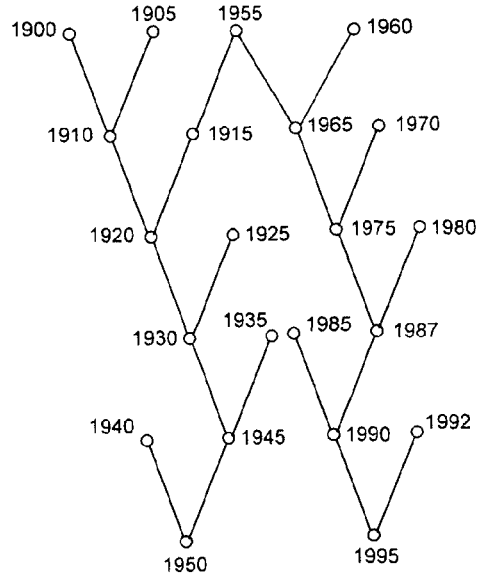
FIG. 19 is a schematic diagram of deconstructed parallel EGA sequences.

FIG. 19 shows parallel EGA sequences. The left EGA sequence from 1900 to 1950 is parallel to the right EGA sequence from 1955 to 1995. The two sequences combine the final outputs (1950 and 1995) to produce a single output.

Figure 20:
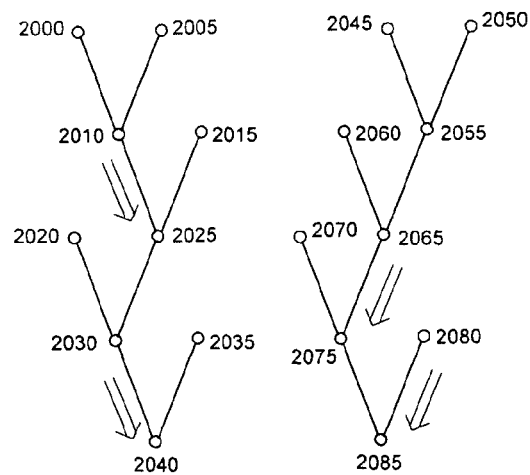
FIG. 20 is a schematic diagram showing competitive parallel EGA sequences.

FIG. 20 shows competitive parallel EGA sequences in which specific phases of each sequence will compete with the parallel operations of a competitor. In this case, the phase between 2010 and 2025 accelerates past the sequence between 2060 and 2065. Similarly the sequence at 2065 and 2075 accelerates past the sequence between 2020 and 2030. Finally, the sequence at 2030-2040 competes with the sequence at 2080 and 2085. By modulating the speed of each EGA sequence, the parallel sequences are competitive.

Figure 21:
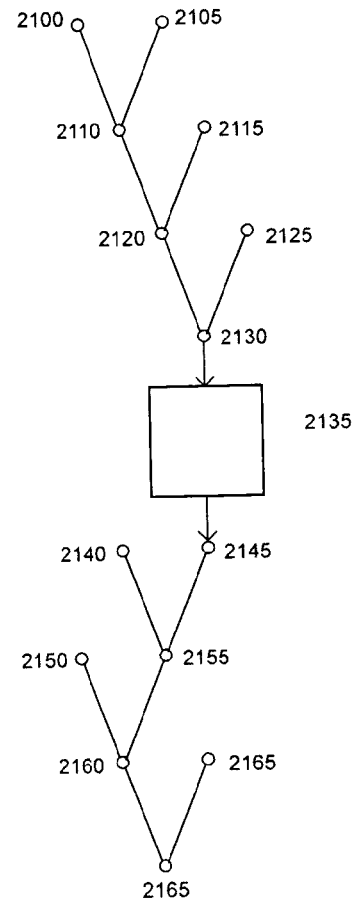
FIG. 21 is a schematic diagram showing assessment and experimentation of an EGA sequence.

The EGA sequence in FIG. 21 shows a phase, between 2130 and 2145, in which an assessment is made. This process of comparison of the outcome at a specific phase with the fitness matching with the environment allows the sequence to be adjusted on demand.

Figure 22:
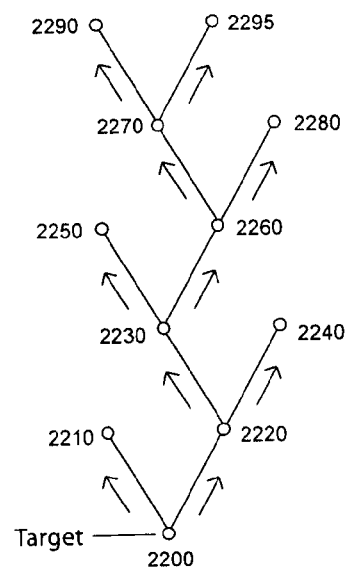
FIG. 22 is a schematic diagram showing the reverse engineering process of an EGA sequence.

FIG. 22 shows the reverse engineering process of an EGA sequence. By targeting a solution at 2200, the EGA sequence identifies the prior requirements in order to make the solution possible. This process of identifying prior components of solutions at each stage proceeds for numerous phases.

Figure 23:
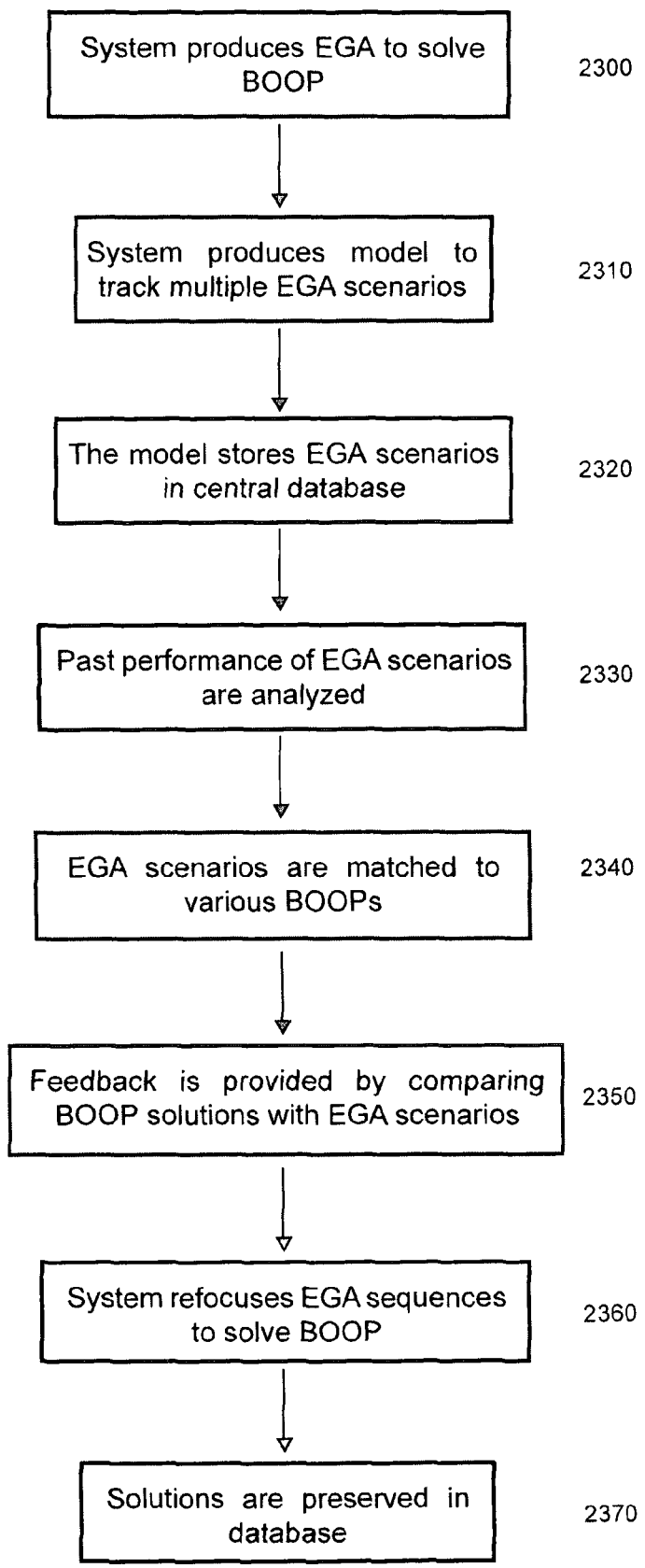
FIG. 23 is a flow chart illustrating the feedback process used by EGAs to solve BOOPs.

FIG. 23 shows the feedback process the EGA system uses to solve BOOPs. After the system produces an EGA sequence to solve a BOOP (2300), the system produces a model to track multiple EGA scenarios (2310). The model stores the EGA scenarios in the central database (2320). The past performance of EGA scenarios is analyzed (2330) and the EGA scenarios are matched to various BOOPs (2340). The feedback is provided by comparing the BOOP solutions with EGA scenarios (2350) and the system refocuses the EGA sequences to solve the BOOP (2360). The solutions are then preserved in the database (2370).

Figure 24:
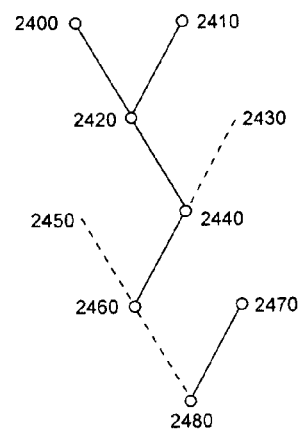
FIG. 24 is a schematic diagram showing the blocking of gene function in an EGA sequence.

FIG. 24 shows an EGA sequence in which the gene functions are blocked. In this example, the connecting information at specific phases is blocked at 2430 to 2440, 2450 to 2460 and 2460 to 2480. This process allows the evolutionary orientation of subsequent individuals to be produced with one inert parent, which allows the sequence to be artificially guided to a specific outcome.

Figure 25:
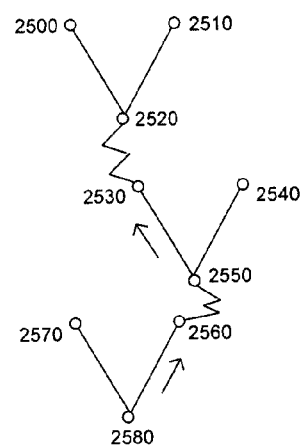
FIG. 25 is a schematic diagram showing a short cut with reverse engineering applied to multiple mutations in an EGA sequence.

FIG. 25 shows a short cut with reverse engineering and with multiple mutations. In this example, the 2580 is the outcome which is reverse engineered to the two parents at 2570 and 2560. However, the mutation sequence between 2550 and 2560 is manipulated in order to produce the specific outcome at 2580. Similarly, the individual at 2550 is manipulated (before mutation modulation) by reverse engineering the two parents at 2530 and 2540. The individual at 2350 is configured as a result of a modulated mutation between 2520 and 2530. Finally, the individual that begins the mutation process at 2520 is created by forming the individuals at 2500 and 2510.

Figure 26:
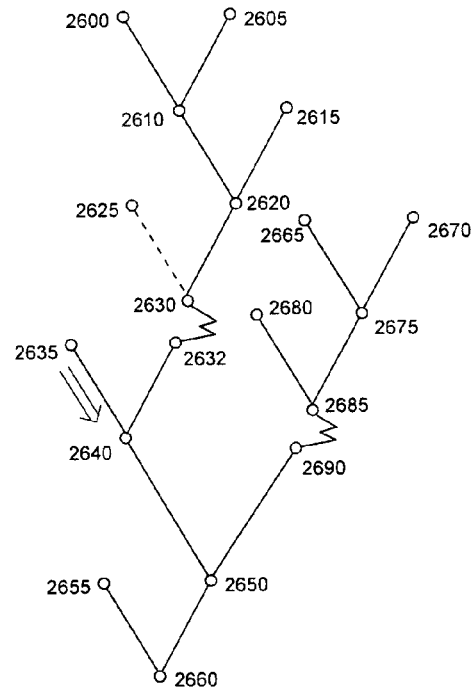
FIG. 26 is a schematic diagram showing intentional mutations as inflexion points in a complex EGA sequence.

FIG. 26 shows a complex EGA sequence consisting of conjoined sequences. In this example the intentional mutations are structured at key inflexion points in order to reorient the specific phase of the sequences to arrive at a specific outcome to derive a solution to a BOOP. The combination of techniques are illustrated, with multiple vectors, acceleration of processing, long interstices, variable mutations and gene blocking in order to arrive at a solution.

Figure 27:
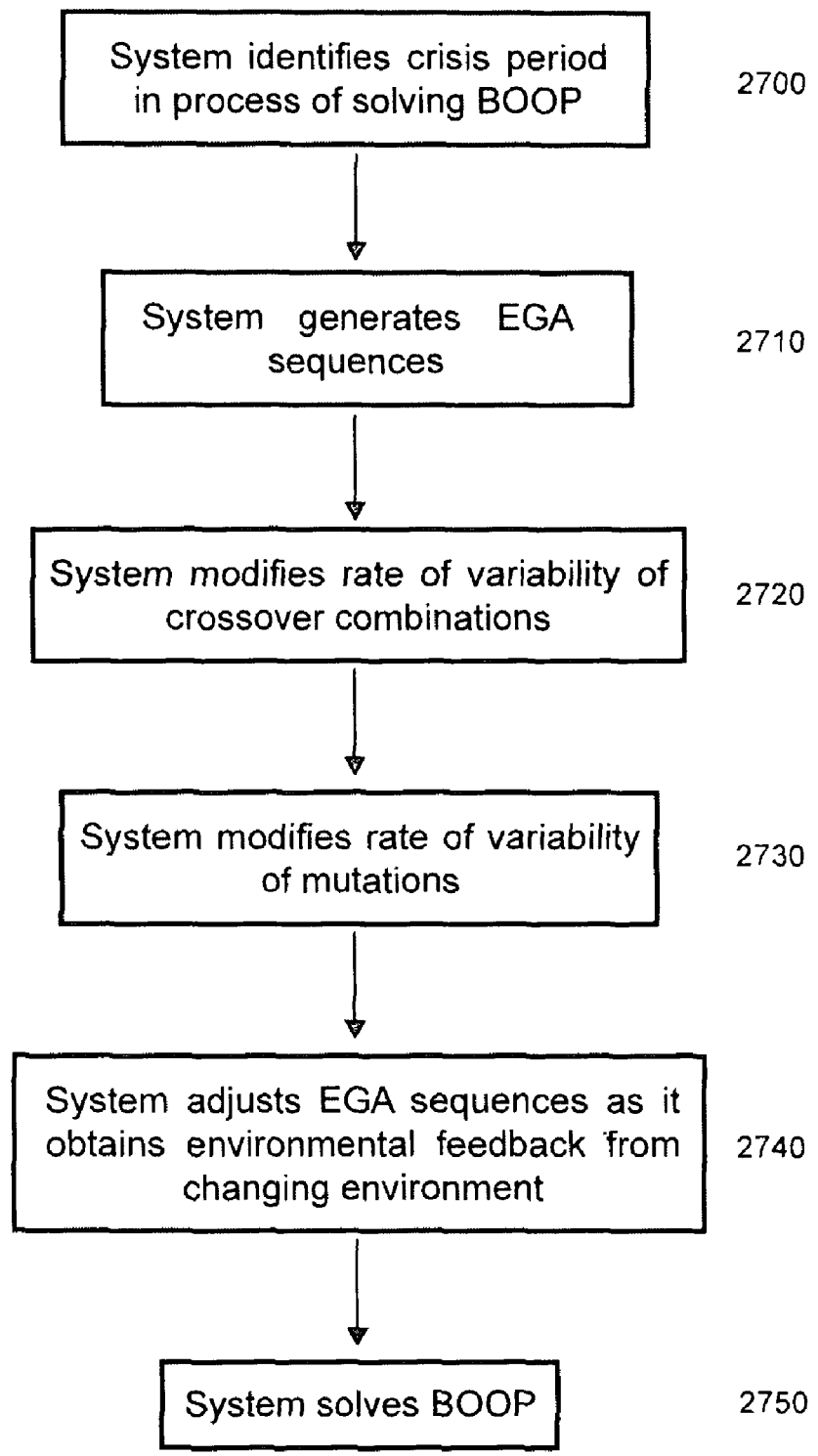
FIG. 27 is a flow chart illustrating the process of modifying development rates in an EGA sequence.

FIG. 27 shows the process of modifying development rates in an EGA sequence. Once the system identifies a crisis period in the process of solving a BOOP (2700), the system generates EGA sequences (2710) and modifies the rate of variability of crossover combinations (2720) and mutations (2730). The system then adjusts the EGA sequences as it obtains environmental feedback from the changing environment (2740) and solves the BOOP (2750).

Figure 28:
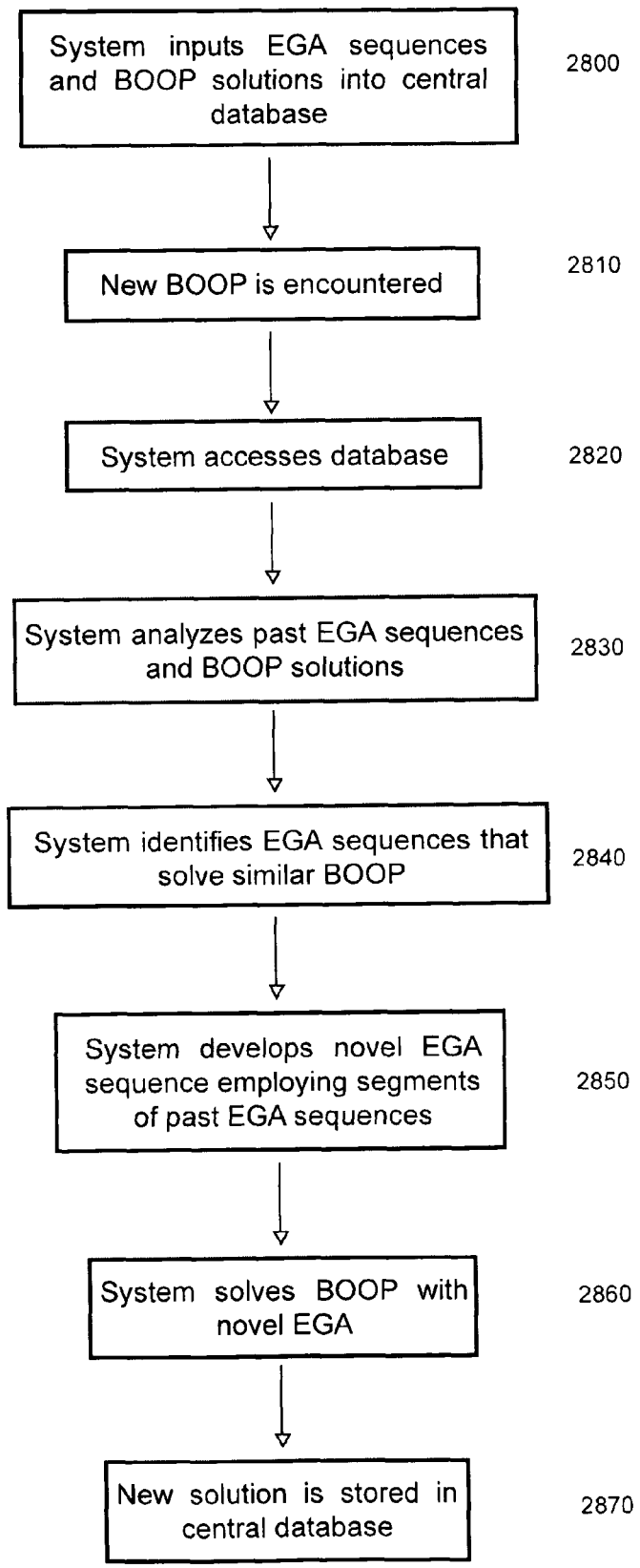
FIG. 28 is a flow chart showing the process of solving BOOPs by analyzing prior solutions of successful EGAs.

FIG. 28 shows the process of solving BOOPs by analyzing prior solutions of successful EGAs. After the system inputs EGA sequences and BOOP solutions into the central database (2800), a new BOOP is encountered (2810) and the system accesses the database (2820). The system then analyzes past EGA sequences and BOOP solutions (2830) and identifies EGA sequences that solve a similar BOOP (2840). The system develops a novel EGA sequence employing segments of past EGA sequences (2850) and solves the BOOP with a novel EGA sequence (2860). The new solution is then stored in the central database (2870).

Figure 29:
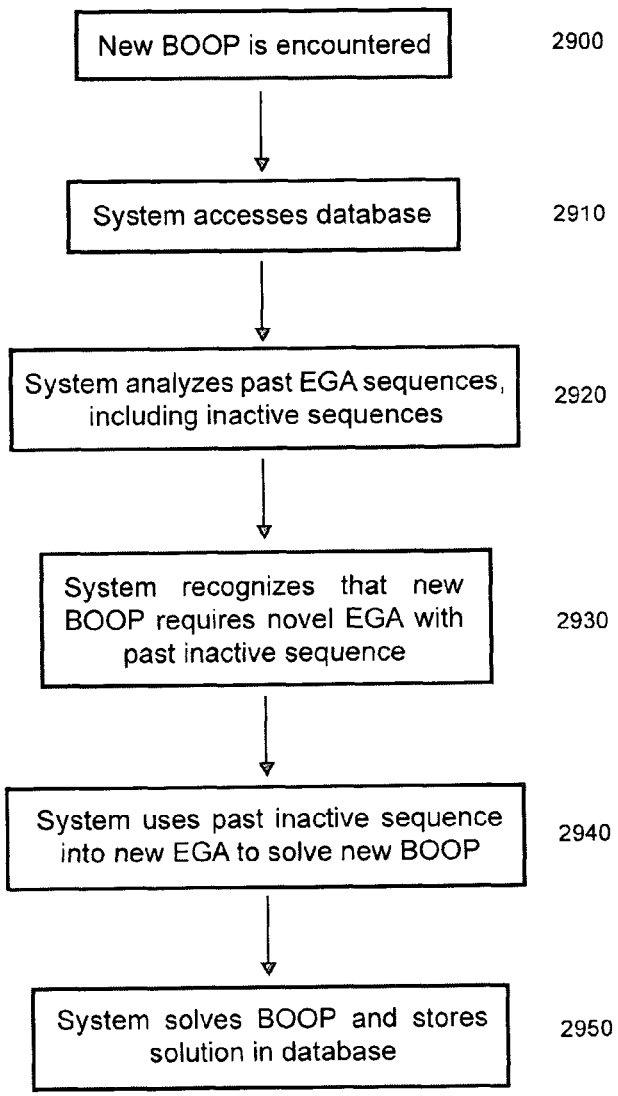
FIG. 29 is a flow chart showing the application of inactive sequences in subsequent EGA sequences to solve BOOPs.

FIG. 29 shows the application of inactive sequences in subsequent EGA sequences to solve BOOPs. Once a new BOOP is encountered (2900), the system accesses a database (2910) and analyzes past EGA sequences, including inactive sequences (2920). The system recognizes that a new BOOP requires a novel EGA that contains a past inactive sequence (2930). The system then uses past inactive sequence in the new EGA to solve a new BOOP (2940), solves the BOOP and stores the solution in the database (2950).

Figure 30:
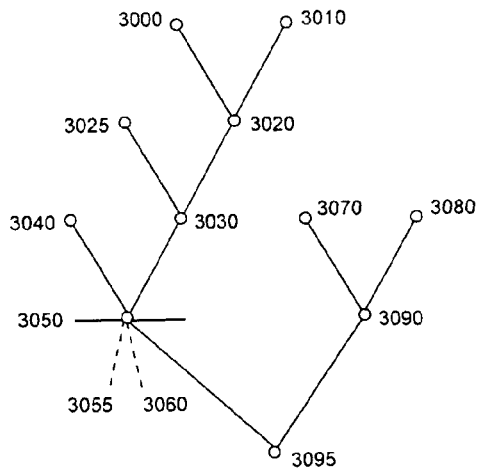
FIG. 30 is a schematic drawing showing the process of correction of misdirection in EGA sequences.

In FIG. 30, a complex EGA sequence is shown which corrects for misdirection. While the EGA sequence between 3000 and 3050 proceeds normally, an evaluation for fitness at 3050 reveals that there are several possible vectors for continued breeding, including 3055, 3060 and 3095. However, only the vector at 3095, which is a substantial variance to the current direction of the EGA sequence, will provide the correct solution. By joining the leg of the corrected EGA sequence at 3050 to 3095 to the aligned sequence from 3070 to 3095, the EGA sequence produces a solution that solves a BOOP.

Figure 31:
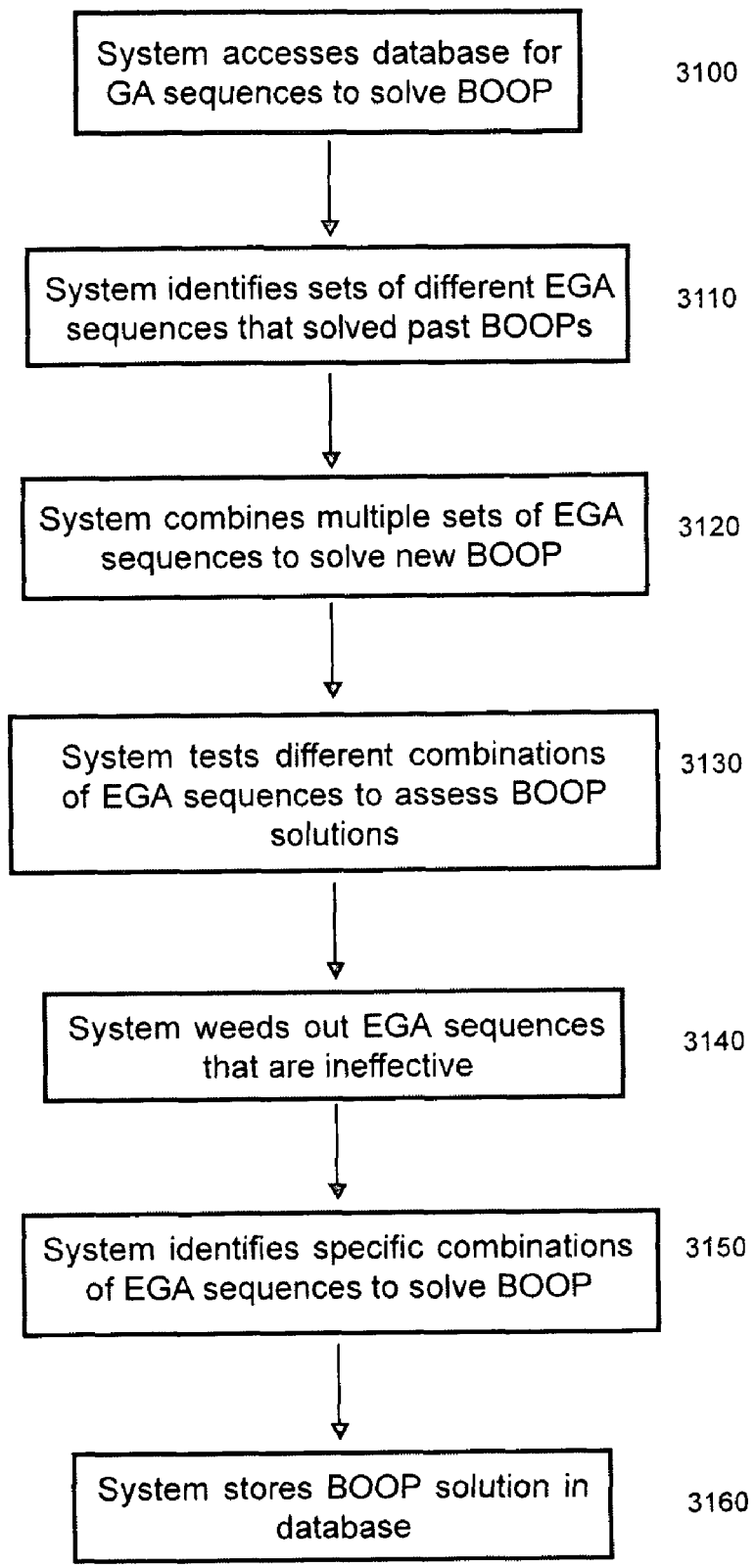
FIG. 31 is a flow chart showing the pruning process used to select EGA sequence combinations to solve BOOPs.

FIG. 31 shows the pruning process used to select EGA sequence combinations to solve BOOPs. After the system accesses a database for EGA sequences to solve a BOOP (3100), the system identifies sets of different EGA sequences that solved past BOOPs (3110). The system combines multiple sets of EGA sequences to solve a new BOOP (3120) and then tests different combinations of EGA sequences to assess BOOP solutions (3130). The system weeds out EGA sequences that are ineffective (3140) and identifies specific combinations of EGA sequences to solve the BOOP (3150). The system then stores the BOOP solution in the database (3160) for later retrieval for future problem solving.

FIG. 32 is a chart showing the metaheuristic typology.

Figure 33:
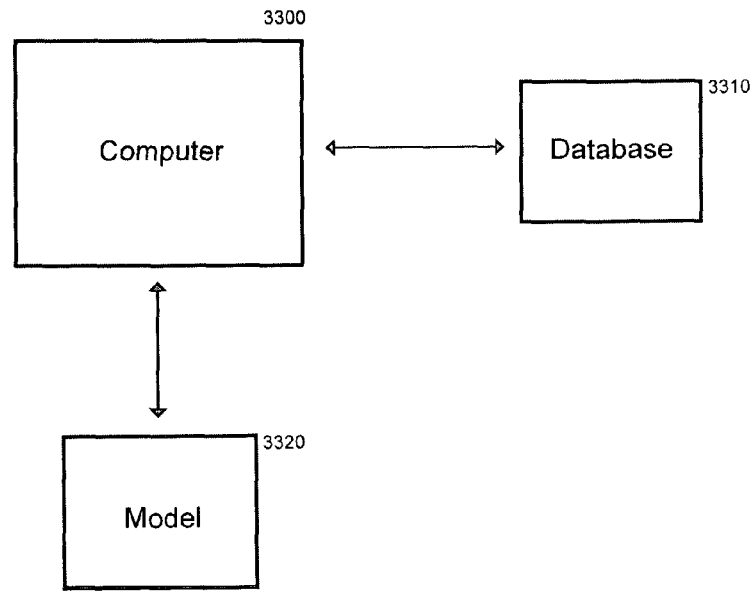
FIG. 33 is a schematic diagram showing the organization of a computer system used to solve BOOPs using EGA.

FIG. 33 shows the connections between a computer (3300) and a database (3310) and between a computer and a model (3320).

Figure 34:
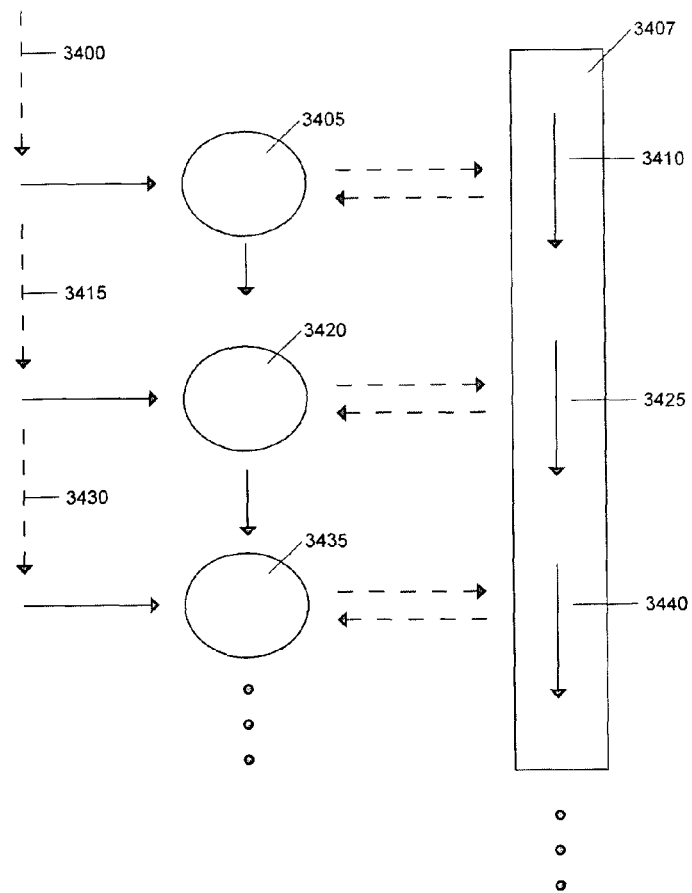
FIG. 34 is a schematic diagram showing the process of comparing EGA sequences to a changing environment.

FIG. 34 shows the evolution of EGA sequences (3400, 3415 and 3430), the outcomes at each phase (at 3405, 3420 and 3435) of which are compared to the evolving environment (at 3410, 3425 and 3440). The environment itself is represented at 3407. These processes are continued until BOOPs are solved.

Figure 35:
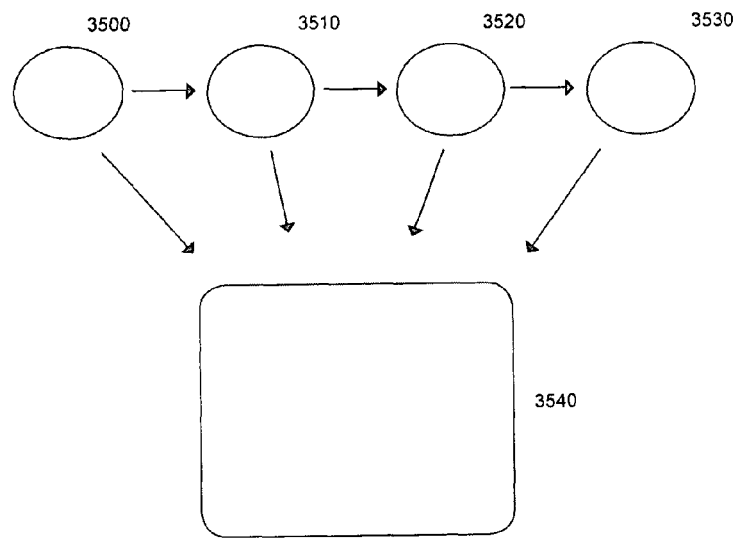
FIG. 35 is a schematic diagram showing an EGA sequence entering solutions into a central database at multiple phases.

FIG. 35 shows an evolutionary process of EGA at four phases (3500, 3510, 3520 and 3530), which enters information into a central catalogue (3540) at specific phases along the process. The central catalogue is a computer database that enters such EGA information as data objects, which include the unique computer code sequence of a specific EGA sequence as well as the phase in the process. These data sets are then organized by category. This data is then accessed by the computer system for future comparisons of data.

Figure 36:
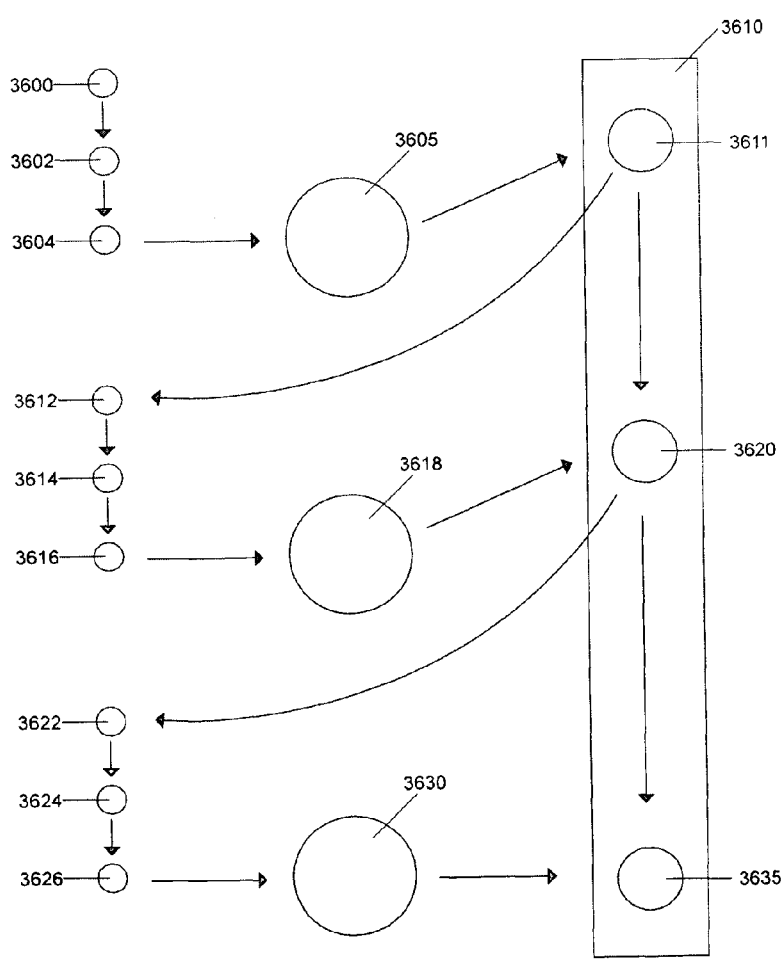
FIG. 36 is a schematic diagram showing the co-evolution of EGA sequences to produce solutions to BOOPs to satisfy evolutionary environmental constraints.

FIG. 36 shows specific EGA sequences that evolve to a specific phase, with the outcomes from each phase compared to specific phases of the environment (3610) in order to assess fitness, and with the fitness matching then informing the successive phase of the EGA process until the solution to a MOOP is provided. The initial sequence at 3600 to 3604 results in a specific outcome at 3605, which is then compared to the environmental phase at 3611. The results of this fitness comparison are then provided to the beginning of the next phase of EGA sequence at 3612 to 3616 and so on. A solution is provided in this example at 3635.

Figure 37:
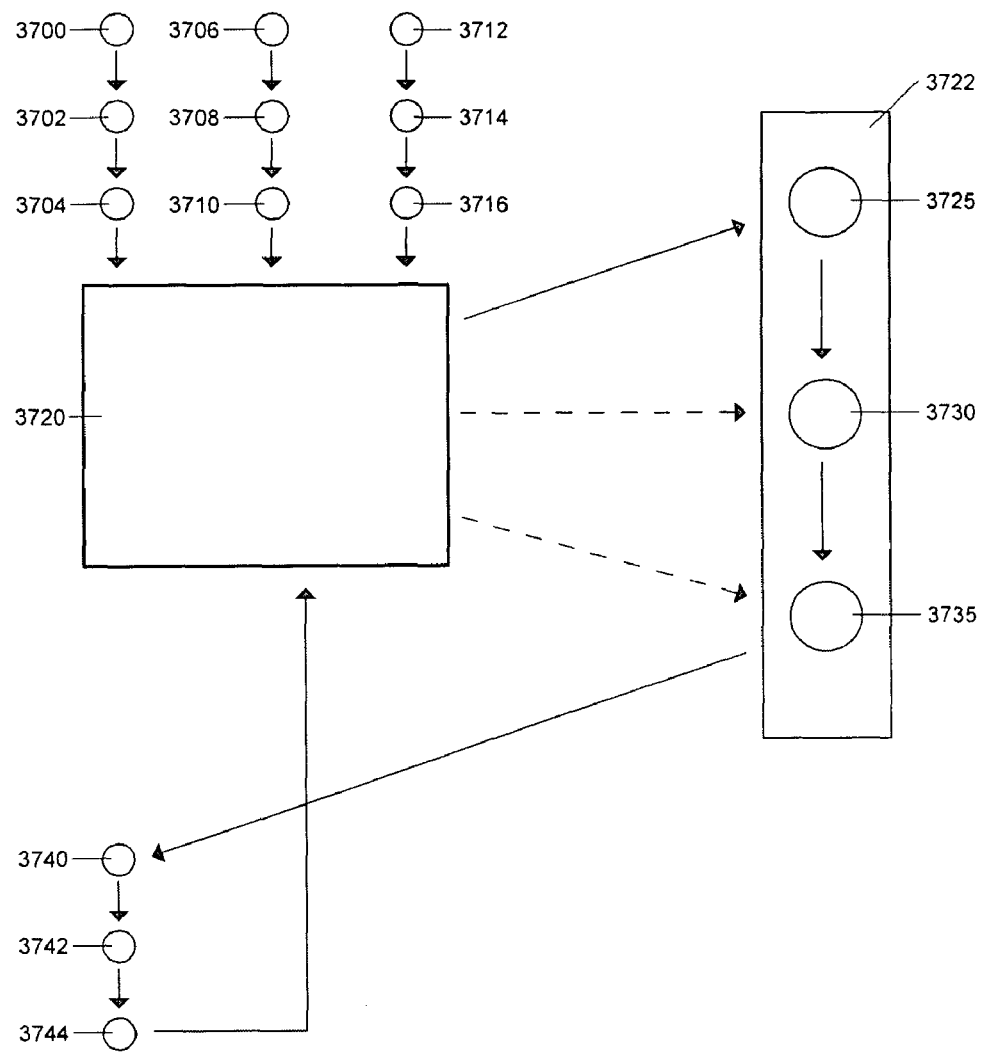
FIG. 37 is a schematic diagram showing the reverse engineering of solutions from feedback from multiple phases of an evolving environment.

FIG. 37 shows several EGA sequences (3700-3704, 3706-3710 and 3712-3716) simultaneously entered into a central database (3720). The sequences are then compared to the environment (3722) at specific phases (3725-3735) in order to compare the fitness of the outcome phase of each sequence to each specific environmental phase in order to solve a BOOP. In this example, the system generates at the final phase of the environment (at 3735) a new sequence (3740-3744) in order to solve a BOOP by reverse engineering the sequence. The sequence is then entered into the central database.

Figure 38:
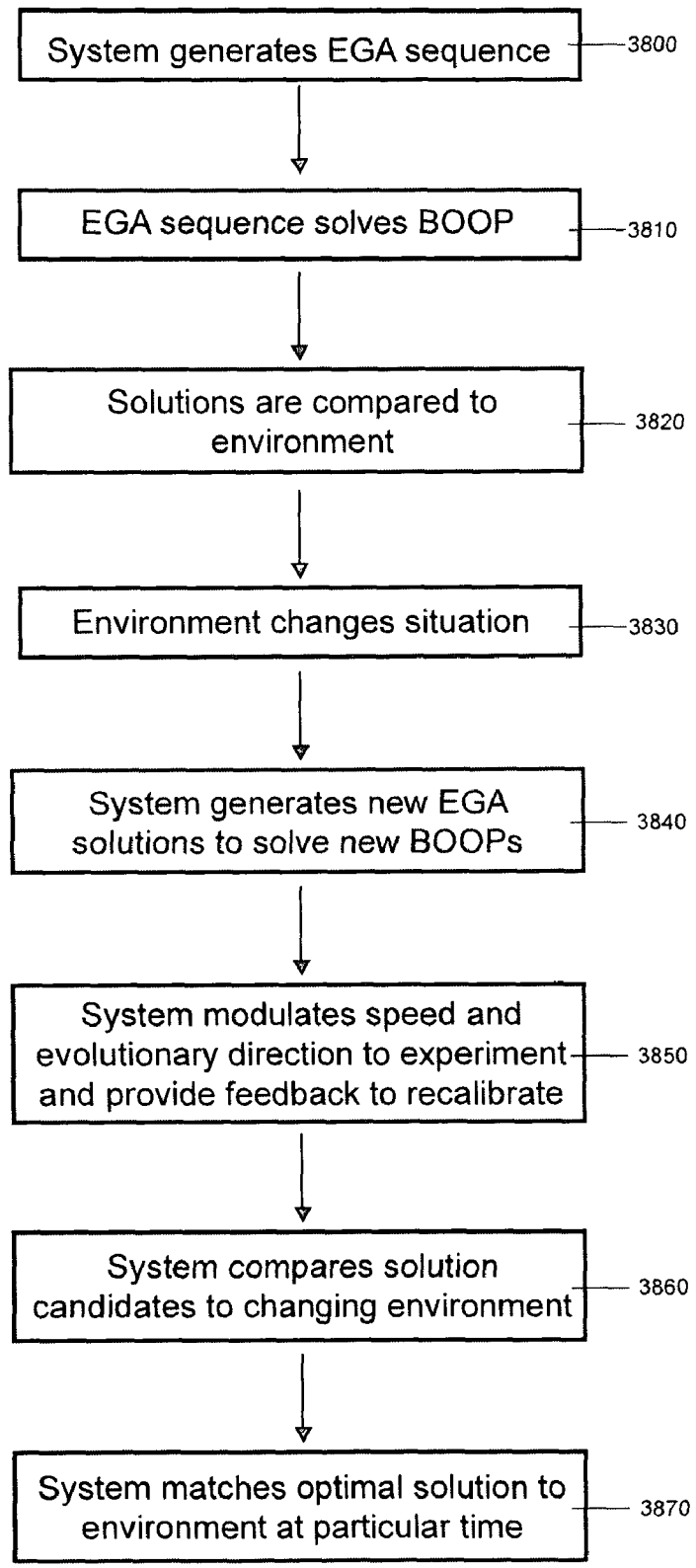
FIG. 38 is a flow chart describing the process of generating EGA sequences to solve evolving environmental problems.

In FIG. 38 shows the process of generating EGA sequences to solve evolving environmental problems. After the system generates an EGA sequence (3800), the EGA sequence solves a BOOP (3810). The solutions of multiple EGA sequences are compared to the environment (620) but the environment changes the situation (3830) and the system generates new EGA solutions to solve new BOOPs (3840). The system modulates the speed and evolutionary direction to experiment with and to provide feedback to recalibrate (3850) the EGA sequence generation process and then compares the newest solution candidates to the changing environment (3860). The system matches the optimal solution to the environment at a particular time (3870).

Figure 39:
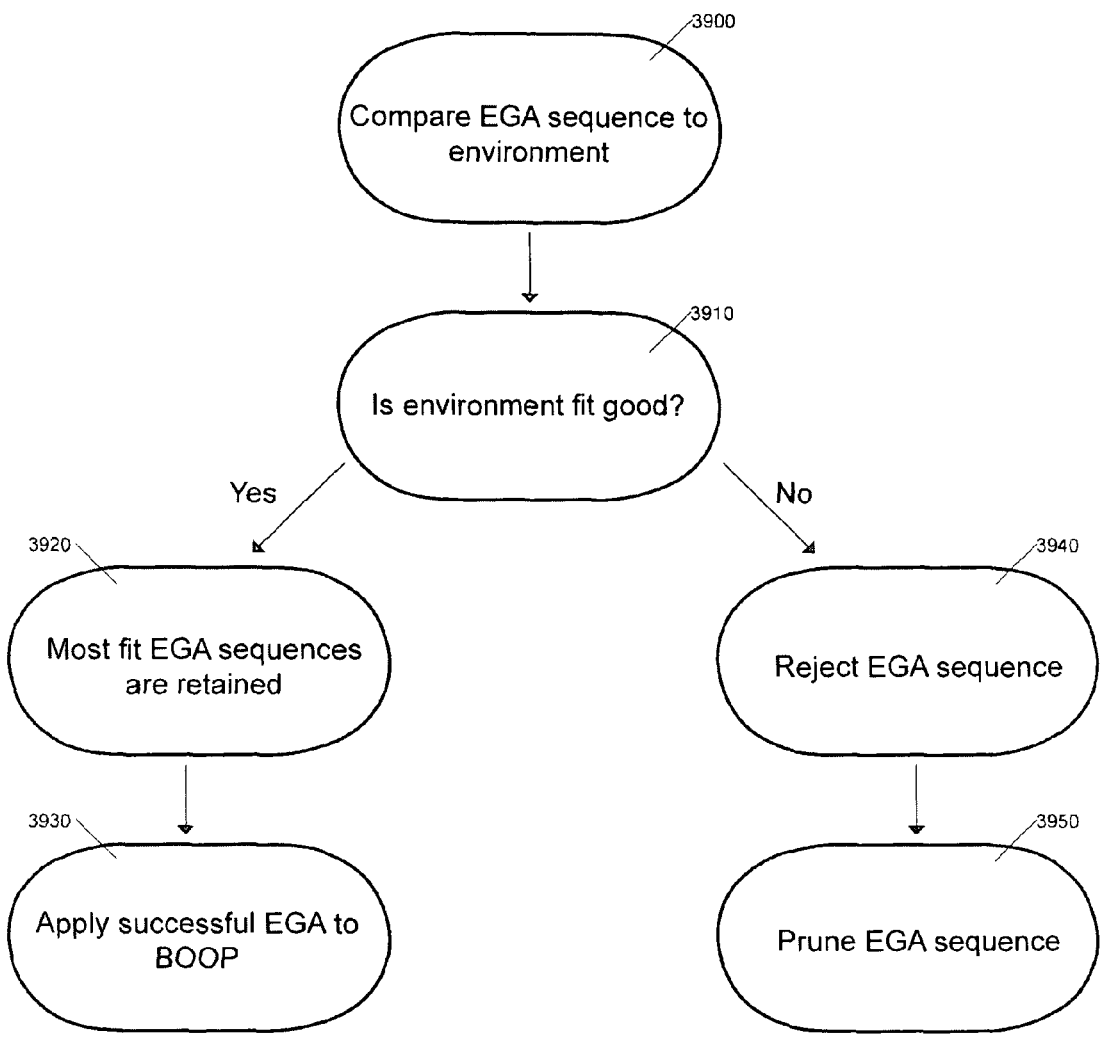
FIG. 39 is a flow chart describing the process of comparing EGA sequences to the environment for fit.

FIG. 39 shows the EGA-environment fitness comparison process. An EGA sequence is compared to the environment (3800) by assessing whether the environment is a good fit (3810). The most fit EGA sequences are retained (3840) and successful EGAs are applied to the BOOP (3850). The EGA sequences that do not fit the environment are rejected (3840) and pruned from the system (3850).

Figure 40:
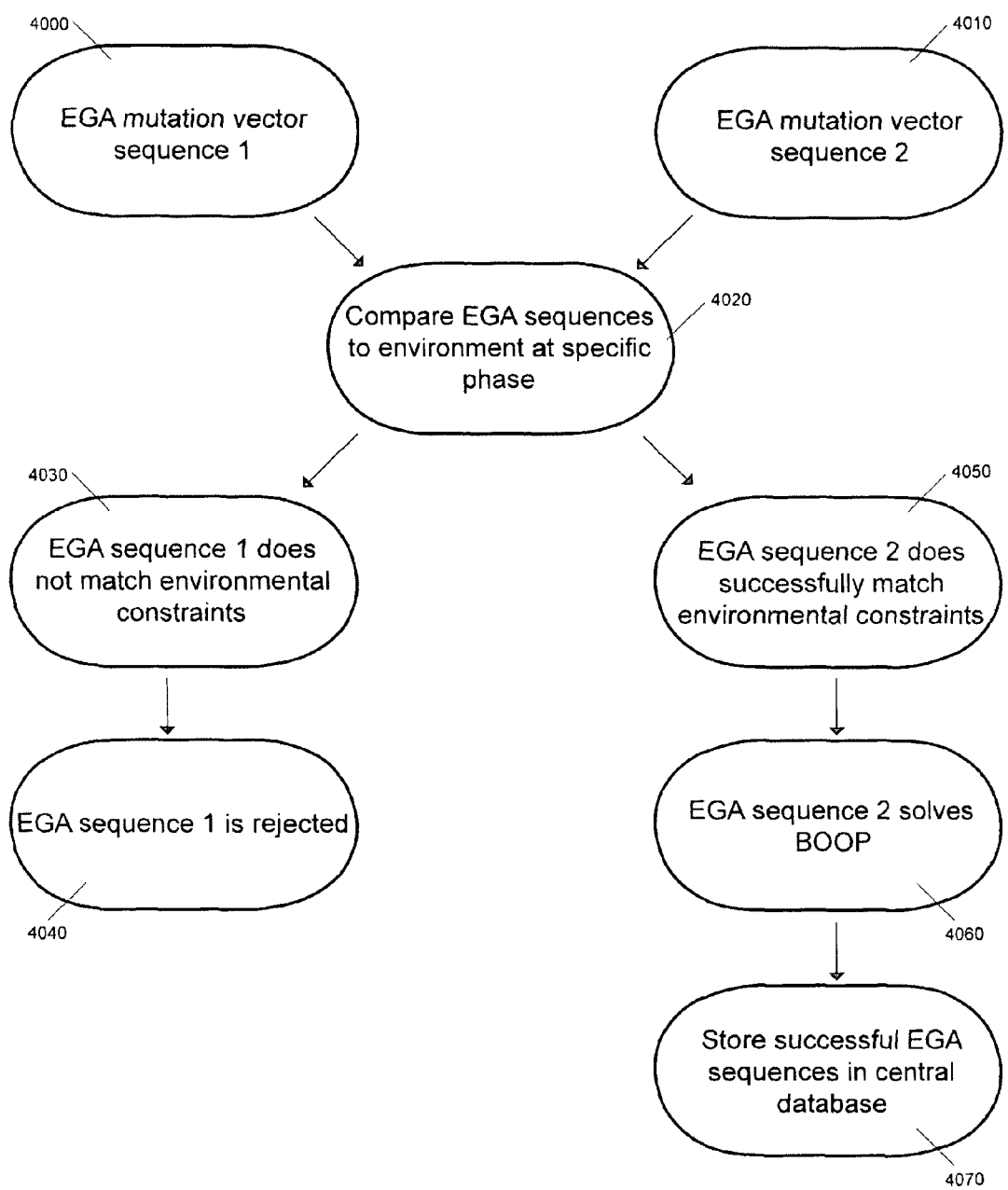
FIG. 40 is a flow chart describing the comparative process of matching two EGA sequences to the environment for fit.

FIG. 40 shows the comparative process of matching two EGA sequences to the environment for fit. In this example, EGA mutation vector sequence 1 (4000) and EGA mutation vector sequence 2 (4010) are compared to the environment at a specific phase (4020). EGA sequence 1 does not match the environmental constraints (4030) and is rejected (4040). EGA sequence 2 does successfully match environmental constraints (4050) and solves the BOOP (4060). The successful solution is then stored in the central database (4070).

Figure 41:
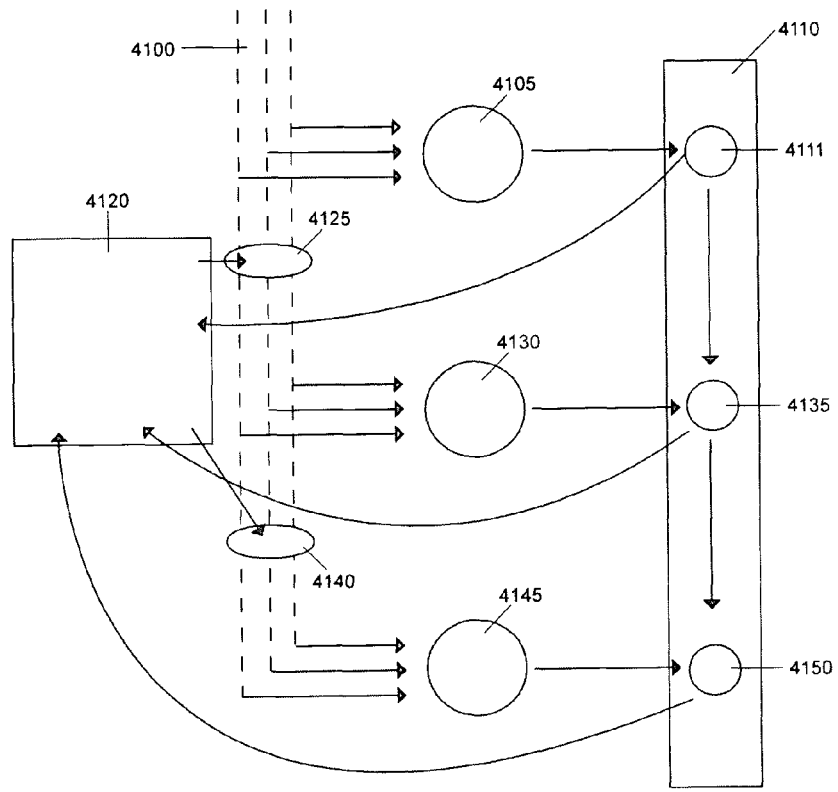
FIG. 41 is a schematic diagram showing the process of "pulling" genes from the environment to direct EGA sequences to solve BOOPs.

FIG. 41 shows the evolution of parallel EGA sequences at 4100, which are tested for fitness at 4105 by comparison with the environment (4110) at phase 4111. The results of the test are entered into the central database at 4120. The evolution of the parallel EGA sequences then continue, but are supplemented at 4125 with data from past successful EGA sequence matches to solve environmental BOOPs under specific constraints. The supplementation of the evolving EGA sequences is again matched at 4130 to the environmental phase at 4135. The process repeats until the solution is provided to the current environment BOOP. In effect, genes are pulled from the environment to insert into the evolutionary solution generation process on demand.

Figure 42:
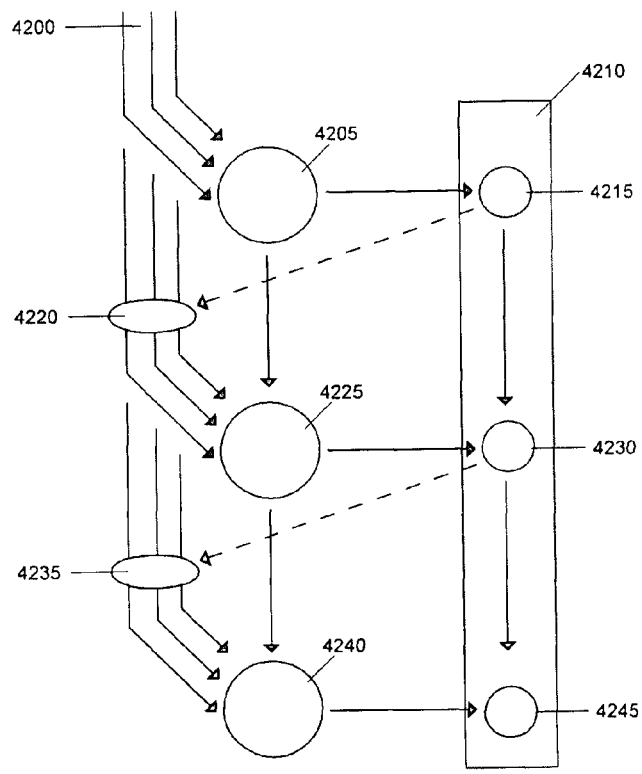
FIG. 42 is a schematic diagram showing the process of inserting genes with environmental feedback into the generation of multiple EGA sequences to solve BOOPs.

FIG. 42 shows the process of inserting genes with environmental feedback into the generation of multiple EGA sequences to solve BOOPs. The evolution of parallel EGA sequences is shown at 42000, which are tested for fitness at 4205 by comparison with the environment (4210) at 4215. The feedback from the comparison matching process at 4215 is then directly inserted into the continuing EGA sequence evolution process at 4220. The resulting supplemental EGA sequences are again matched at 4225 to the environment at 4230 and corrected genes are inserted at 4235. This process continues until the BOOP is solved.

Figure 43:
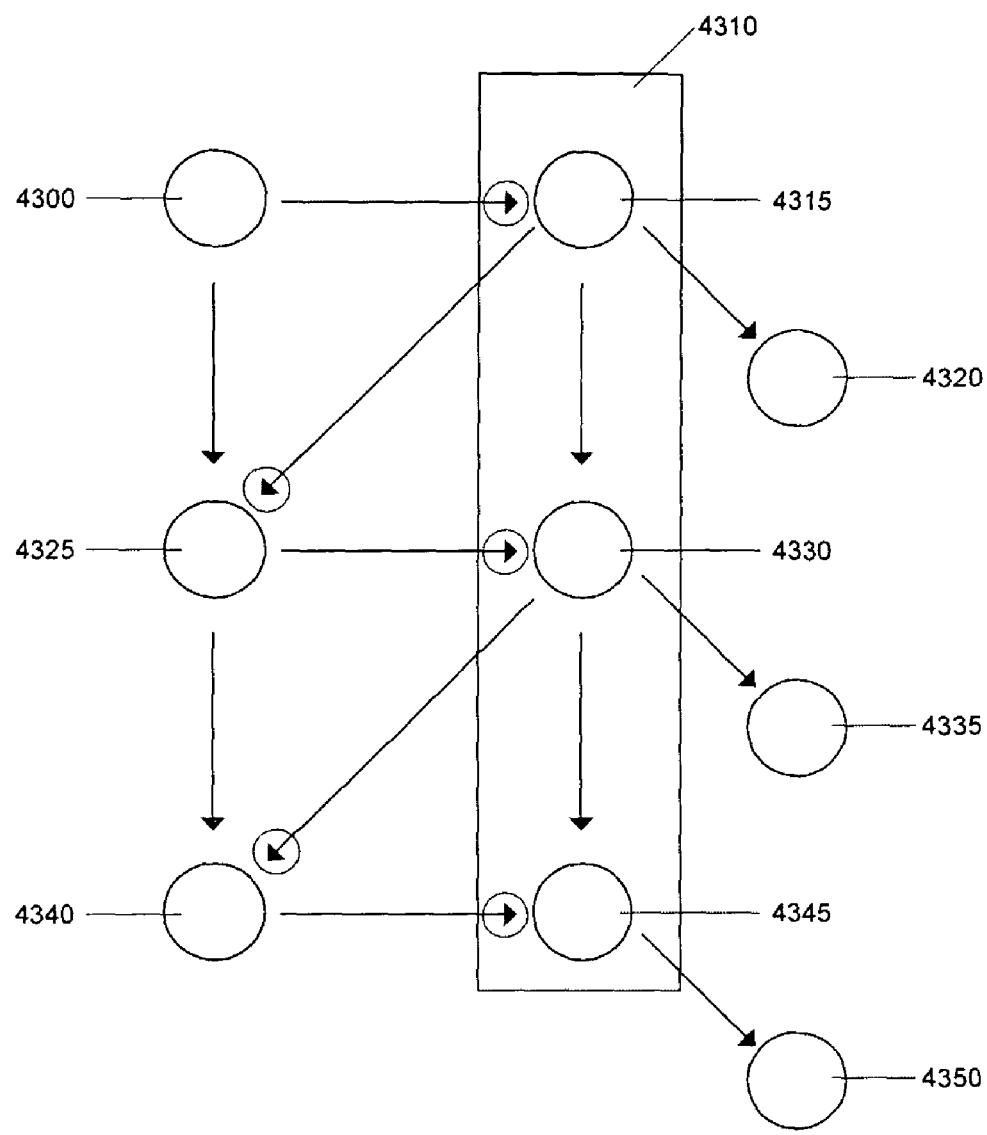
FIG. 43 is a schematic diagram showing the pruning of suboptimal EGA and the lags at each environmental comparison phase.

FIG. 43 shows the pruning of suboptimal EGA and the lags at each environmental comparison phase. Once EGA sequences (4300) are initially compared to the environment (4310) for fitness at 4315, the successful EGA sequences are inserted into the evolving EGA sequences at 4325. The unsuccessful EGA sequences are pruned at 4320. The circles around the arrows indicate that while this process is sequential it is not performed at a regular rate. Rather, there are lags in the comparison and insertion process as the data in the EGA sequences are compared to the environment for matching and as the successful sequences are inserted into the successive EGA sequences. The process continues until a solution to a BOOP is provided. However, as the environment changes, the circumstances for the satisfaction of constraints also change and the process continues to solve successive BOOPs to find equilibrium.

Figure 44:
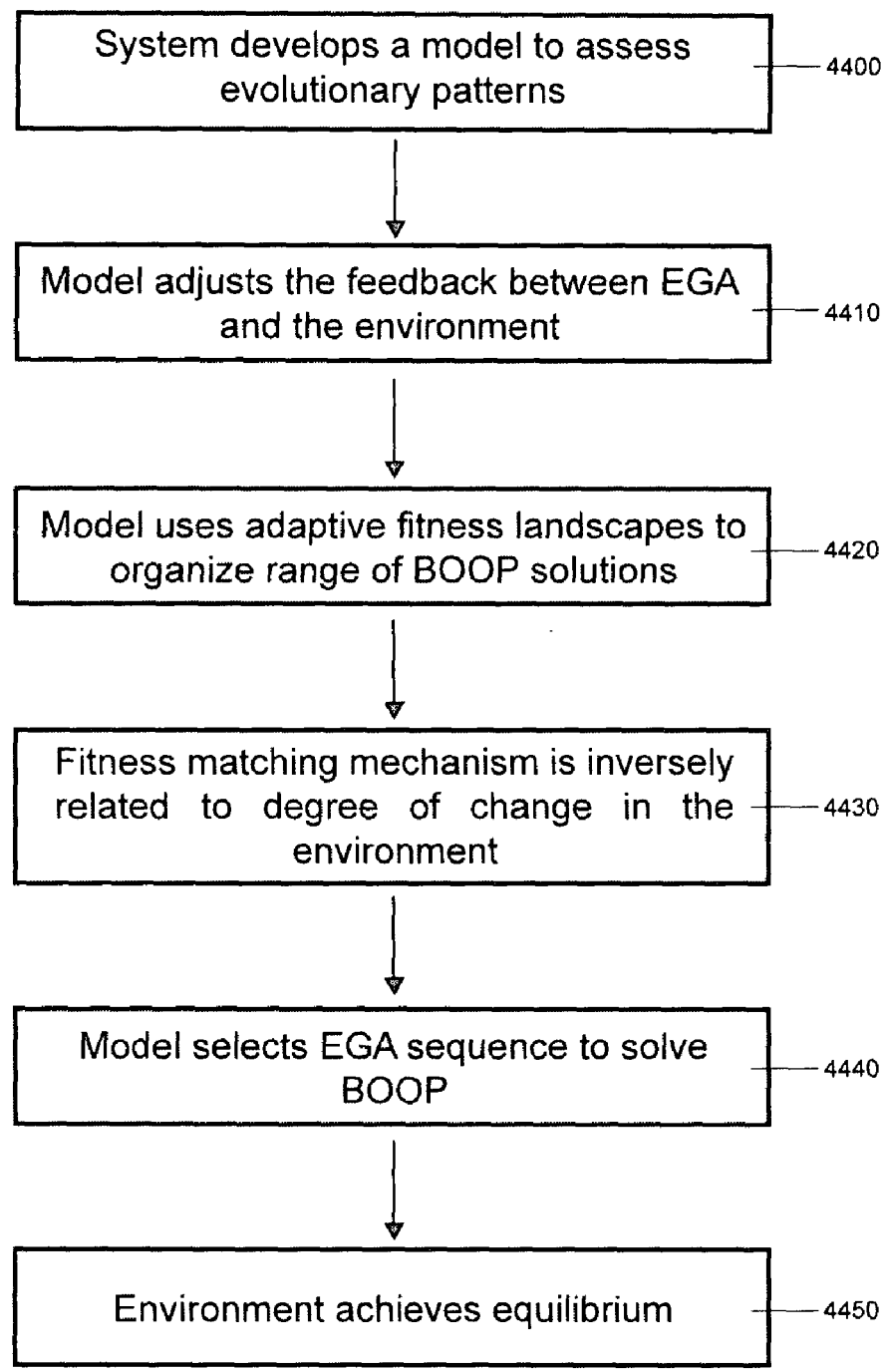
FIG. 44 is a flow chart showing the fitness matching process of generating and selecting EGA sequences to solve BOOPs.

FIG. 44 shows the fitness matching process of generating and selecting EGA sequences to solve BOOPs. After the system develops a model to assess the evolutionary patterns (4400), the model adjusts the feedback between the EGA and the environment (4410). The model uses adaptive fitness landscapes to organize the range of BOOP solutions (4420), wherein the fitness matching mechanism is inversely related to the degree of change in the environment (4430). The model then selects the EGA sequence to solve the BOOP (4440) and the environment achieves equilibrium (4450).

Figure 45:
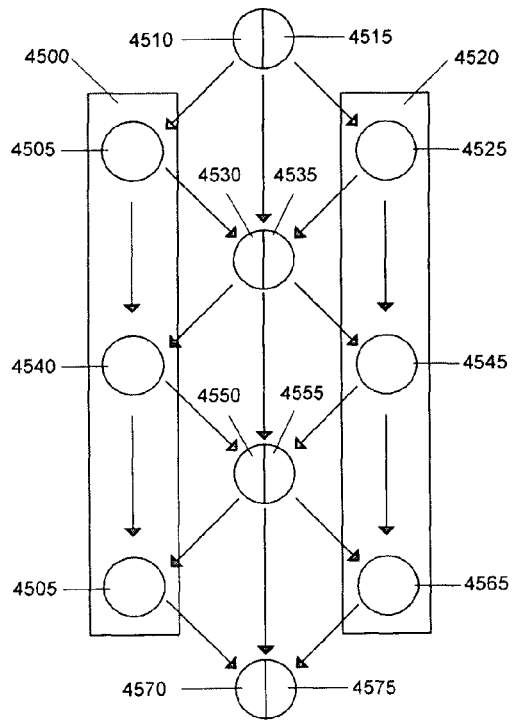
FIG. 45 is a schematic diagram showing the generation of EGA sequences to solve BOOPs in multiple parallel evolutionary environments.

FIG. 45 shows the comparison process of an EGA sequence with multiple environments simultaneously. The parallel EGA sequences are divided (4510 and 4515) and compared to the two evolving environments (1 and 2) shown at 4500 and 4520. EGA sequences at 4510 are compared to the phase of environment 1 at 4505, while the EGA sequences at 4515 are compared to the phase of environment 2 at 4525. The data from the feedback comparison process is then provided to the evolving EGA sequences at 4530 and 4535. This process continues until the BOOPs in each environment are solved. In one embodiment, the data received from the two environments are shared by the evolving sequences. This process of comparison with multiple environments is useful to compare the EGA sequences with multiple simultaneous BOOPs.

Figure 46:
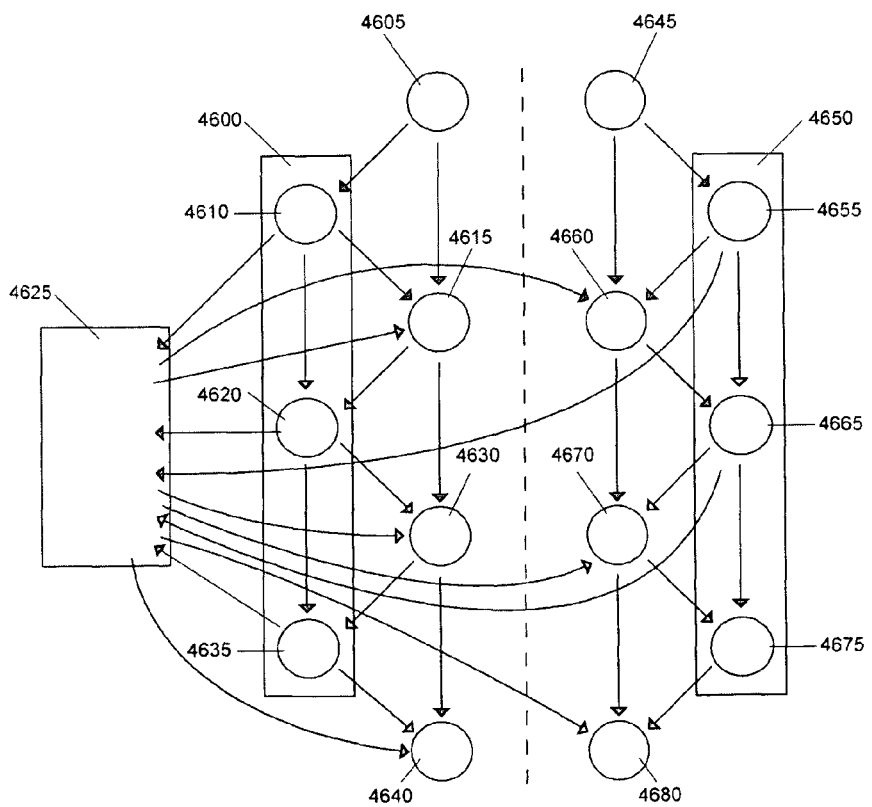
FIG. 46 is a schematic diagram showing the generation of two EGA sequence tracks and two parallel evolutionary environments coordinated with a central catalogue.

FIG. 46 shows the generation of two EGA sequence tracks and two parallel evolutionary environments coordinated with a central catalogue. Two independent EGA-environmental comparison tracks are coordinated, yet share a common central database. In the left sequence, the evolutionary EGA sequences (4605 to 4640) are compared at specific intervals (4610 to 4635) to the environment (4600) while also entering data at each phase into the central database. Data from the central database is then available to either EGA sequence track. Similarly, the EGA sequences (4645 to 4680) are compared to the evolving environment 2 (4650) at specific intervals (4655 to 4675). In this example, multiple solutions to multiple BOOPs are successfully generated.

Figure 47:
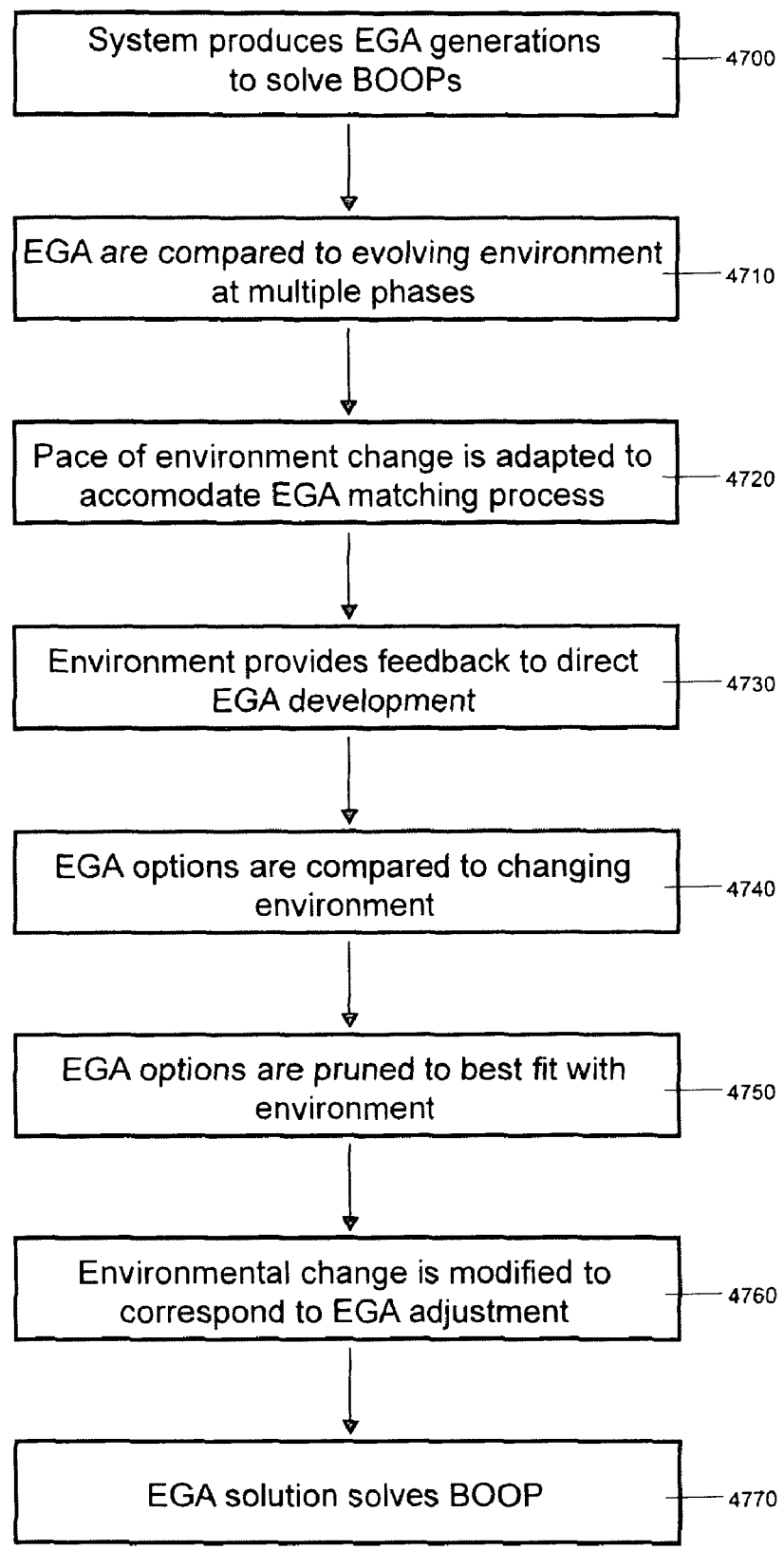
FIG. 47 is a flow chart describing the generation and selection of EGA sequences to solve BOOPs in a changing environment.

FIG. 47 shows the generation and selection of EGA sequences to solve BOOPs in a changing environment. Once the system produces EGA generations to solve BOOPs (4700), the EGA are compared to evolving environment at multiple phases (4710). The pace of the environmental change is adapted to accommodate the EGA matching process (4720). The environment provides feedback to direct the EGA development (4730) and the EGA options are compared to the changing environment (4740). The EGA options are then pruned to best fit with the environment (4750) and the environmental change is modified to correspond to the EGA adjustment (4760). The EGA solution solves the BOOP (4770) and the data is stored in the central catalogue.

Figure 48:
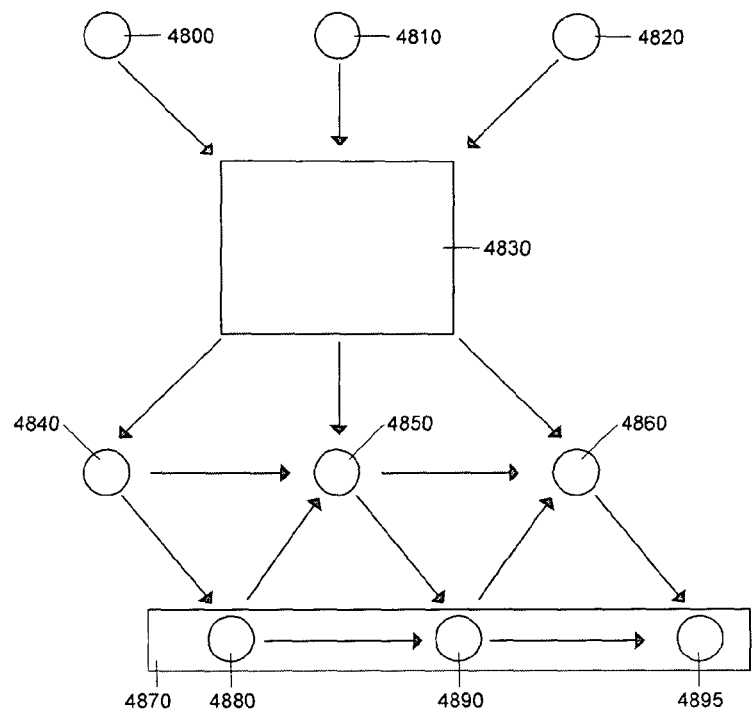
FIG. 48 is a schematic diagram illustrating a central database providing data for EGA sequences to solve BOOPs in an evolving environment.

FIG. 48 shows a computer system for generating, comparing, storing and accessing EGA sequences to solve BOOPs in evolving environments. Data objects (100 to 120) are entered into a central database (130), which is accessed in order to generate EGA sequences (140 to 160). These EGA sequences are then compared to the evolving environment (170) at intervals (180 to 195). Once the EGA sequences are matched to the environment at specific phases, BOOPs are solved for those circumstances.

Figure 49:
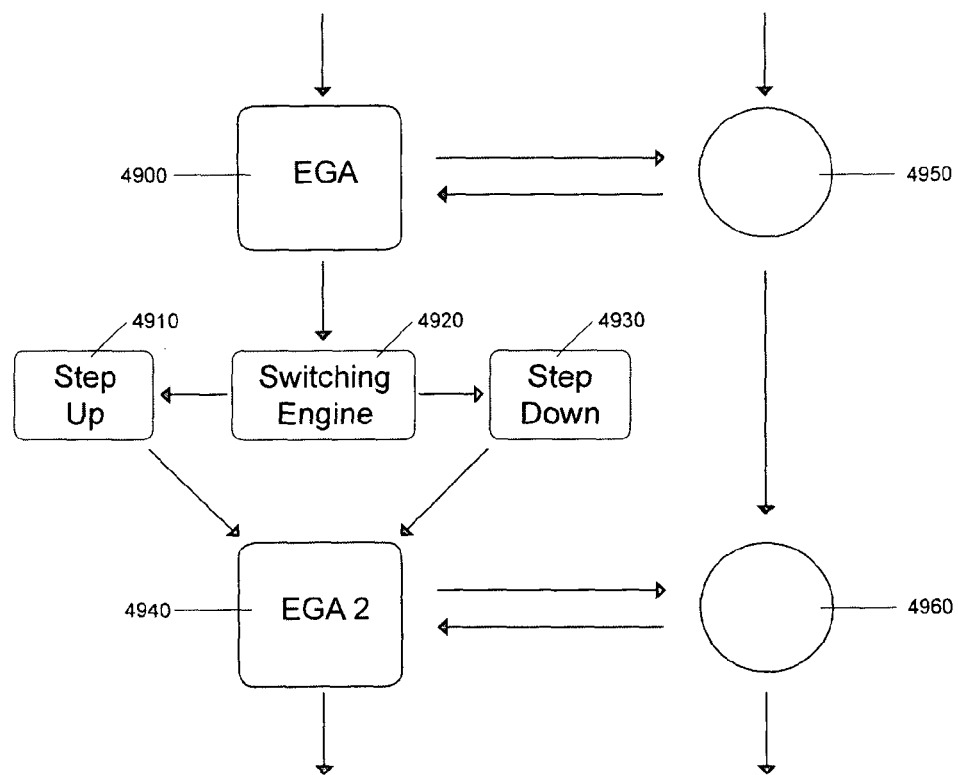
FIG. 49 is a schematic diagram showing the use of EGA sequences to solve BOOPs in an evolving environment at specific phases of development by modulating the solutions.

FIG. 49 shows the use of EGA sequences to solve BOOPs in an evolving environment at specific phases of development by modulating the solutions. EGA sequences (200) are generated and compared to an environmental phase (250) and feedback is provided to improve the EGA sequences. The sequences are modulated by the switching engine (220) by either stepping up (210) or stepping down (230) the sequences to generate a second phase of the EGA sequences (240), which repeats the environmental comparison process at 260. This process continues until the EGA solutions solve the environmental BOOP.

Figure 50:
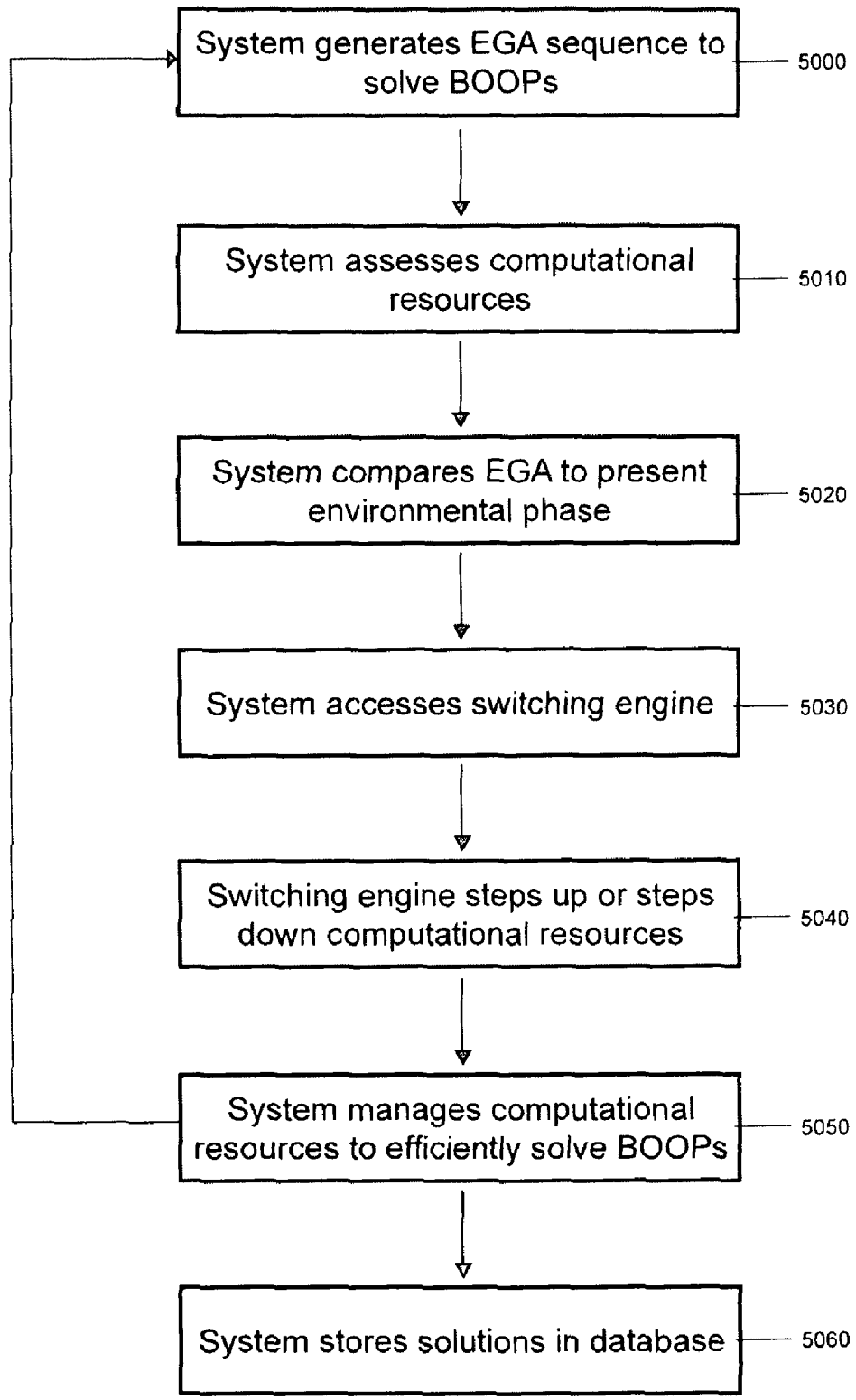
FIG. 50 is a flow chart showing the process of modulating the production of EGA sequences to solve BOOPs.

The modulation process involving solving BOOPs with EGA is described in FIG. 50. After the system generates an EGA sequence to solve BOOPs (5000), the system assesses computational resources (5010) and compares the EGA to the present environmental phase (5020). The system accesses the switching engine (5030) and the engine steps up or steps down the computational resources (5040) until the problem is solved. The system manages the computational resources efficiently to solve the BOOPs (5050).

Figure 51:
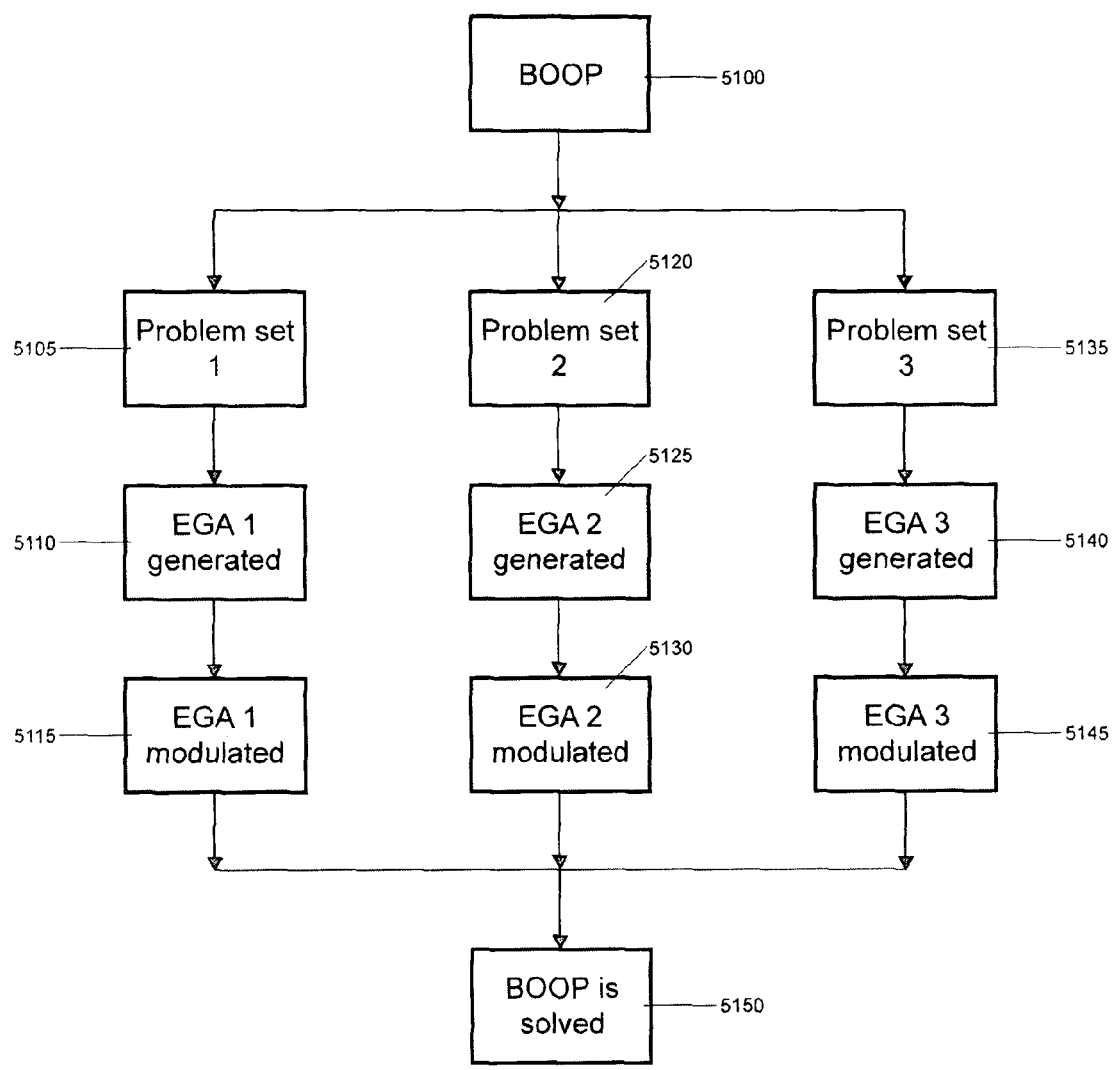
FIG. 51 is a flow chart showing the solution process of using the generation and modulation of three EGA sequences to solve a BOOP.

FIG. 51 shows the solution process of using the generation and modulation of three EGA sequences to solve a BOOP. The system seeks to solve a BOOP (5100) by generating three parallel EGA sequences (1, 2 and 3). In one embodiment, the BOOP itself is deconstructed into three parts of the problem. The problems sets (515, 5120 and 5135) lead to the creation of EGA sequences 1 (5110), 2 (5125) and 3 (5140). The EGA sequences are then modulated (5115, 5130 and 5145) until the BOOP is solved (5150). These sequences are timed to process in different phases to organize their coordination.

Figure 52:
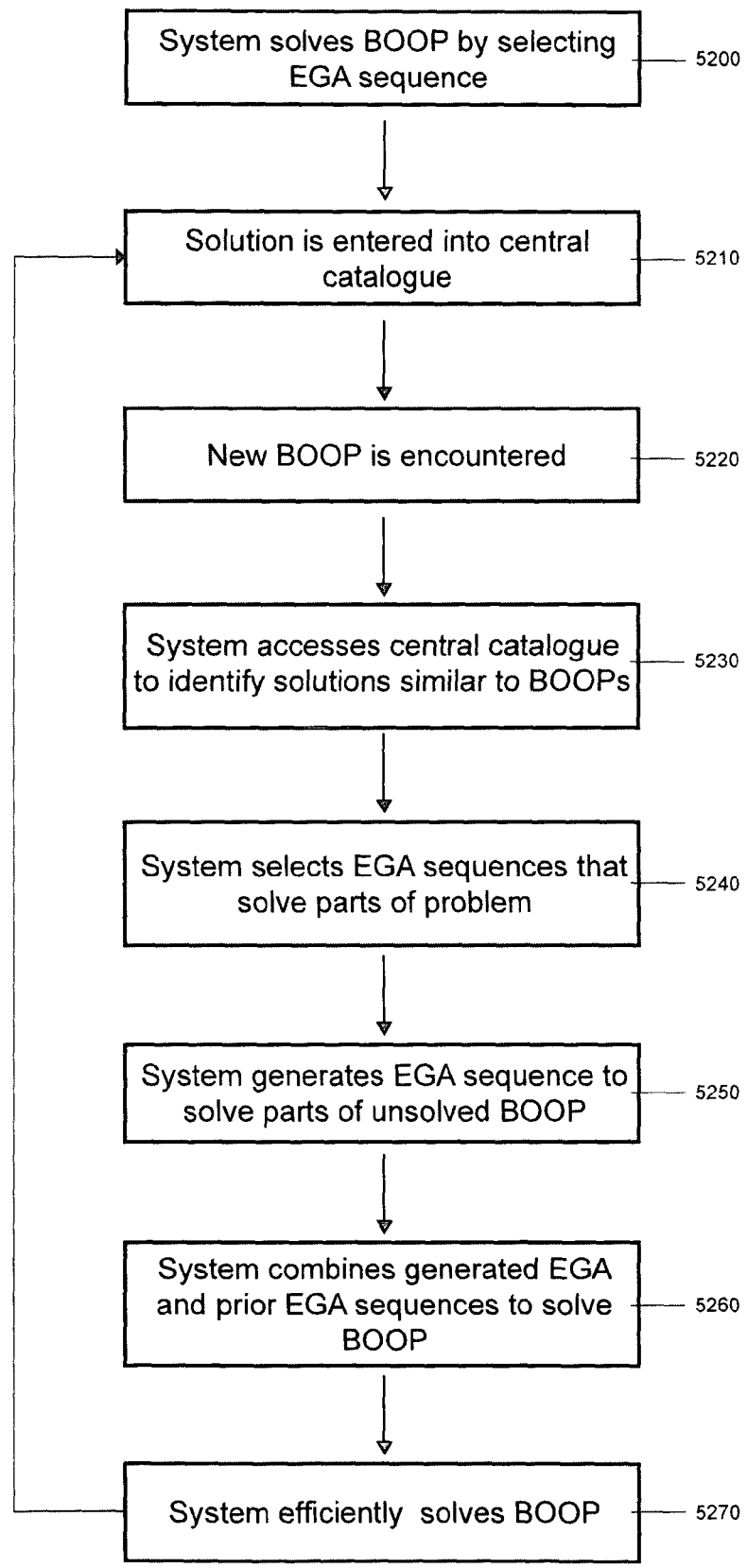
FIG. 52 is a flow chart showing the process of solving BOOPs using EGA sequences by accessing a central catalogue of prior solutions.

FIG. 52 shows the process of solving BOOPs using EGA sequences by accessing a central catalogue of prior solutions. After the system solves a BOOP by selecting a successful EGA sequence (500), the solution is entered into the central catalogue of the computer database (5210). A new BOOP is encountered (5220) and the system accesses the central catalogue to identify solutions of similar BOOPs (5230). The system then selects EGA sequences that solve parts of the problem (5240) and generates an EGA sequence to solve parts of the unsolved BOOP (5250). The system combines the generated EGA and the prior EGA sequence to solve the BOOP (5260) and the system efficiently solves the BOOP (5270). The solution is then stored in the central catalogue (5280).

Figure 53:
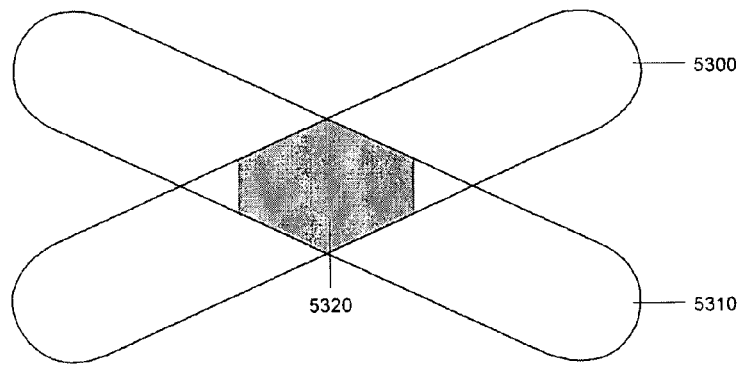
FIG. 53 is a schematic diagram showing the use of fuzzy logic by EGA processes to solve a majority of a BOOP.

FIG. 53 shows a BOOP in which the convergence of the two main constraints (5300 and 5310) create a central area (5320) that delineates the parameters of a solution space. However, in this case only about ninety five percent of the central area is covered, reflecting the fact that while all of the constraints are not fully satisfied, the majority of the constraints are satisfied. This application of fuzzy logic to the EGA is used in time sensitive situations in which it is inefficient to invest substantial computational resources in a complete solution to solve a BOOP in real time. The constraint restrictions, within specific parameters, are observed in the limited solution. This limitation to solving only part of a BOOP is important under time constraints.

Figure 54:
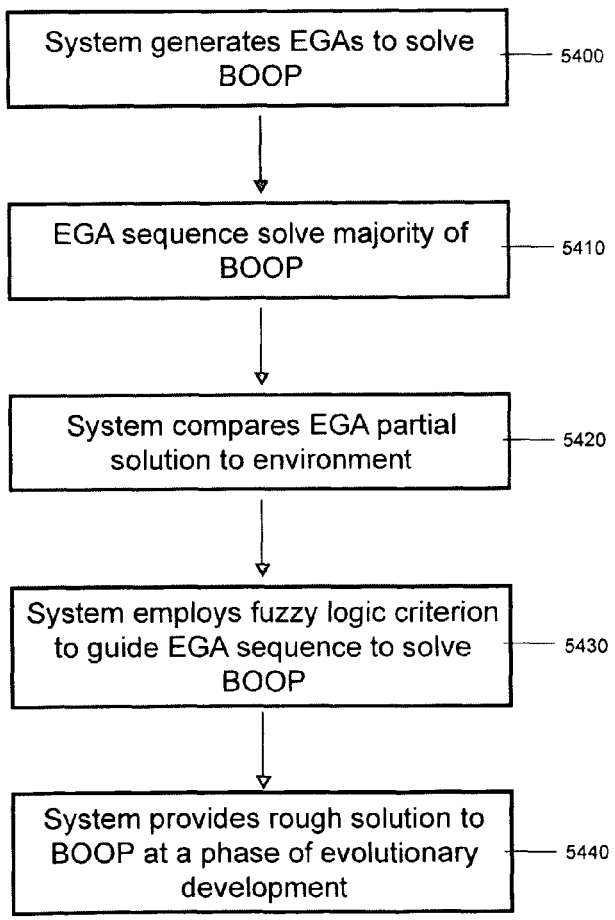
FIG. 54 is a flow chart showing the process of using fuzzy logic by EGAs to solve a BOOP.

FIG. 54 shows the process of using of fuzzy logic to solve BOOPs using EGA. After the system generates EGAs to solve a BOOP (5400), an EGA sequence solves a majority of a BOOP (5410) in a specific time frame. The system compares the EGA partial solution to the environment (5420). The system then employs fuzzy logic criterion to guide the EGA sequence to solve a BOOP (5430). The system provides a rough solution to the BOOP at a phase of evolutionary development (5440).

Figure 55:
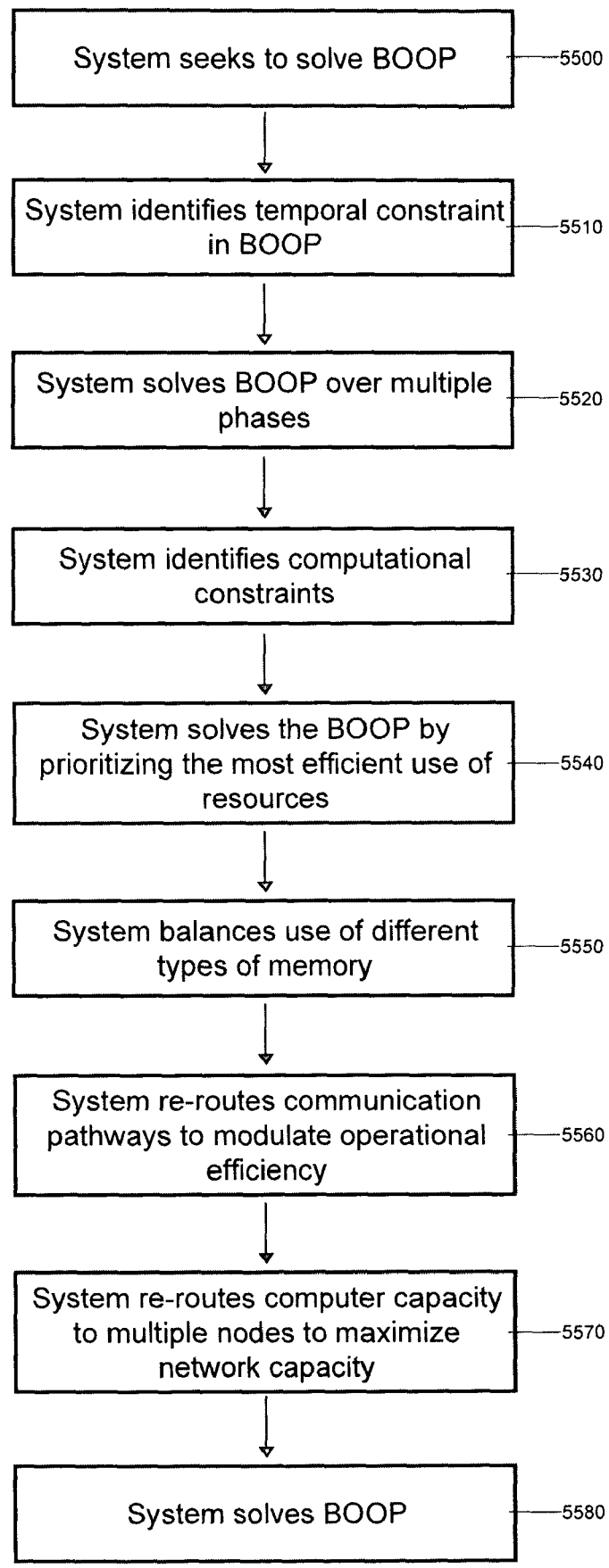
FIG. 55 is a flow chart showing the process of solving a BOOP within computational constraints.

FIG. 55 shows the process of solving a BOOP within computational constraints. Once the system seeks to solve a BOOP (5500), the system identifies temporal constraints in the BOOP (5510). The system solves the BOOP over multiple phases (5520) and identifies computational constraints (5530). The system then solves the BOOP by prioritizing the most efficient use of resources (5540) and balances the use of different memory types (5550). The system re-routes communication pathways to modulate the operational efficiency (5560) and re-routes the computer capacity to multiple nodes to maximize network capacity (5570) in processing the EGAs to solve the BOOP (5580).

Figure 56:
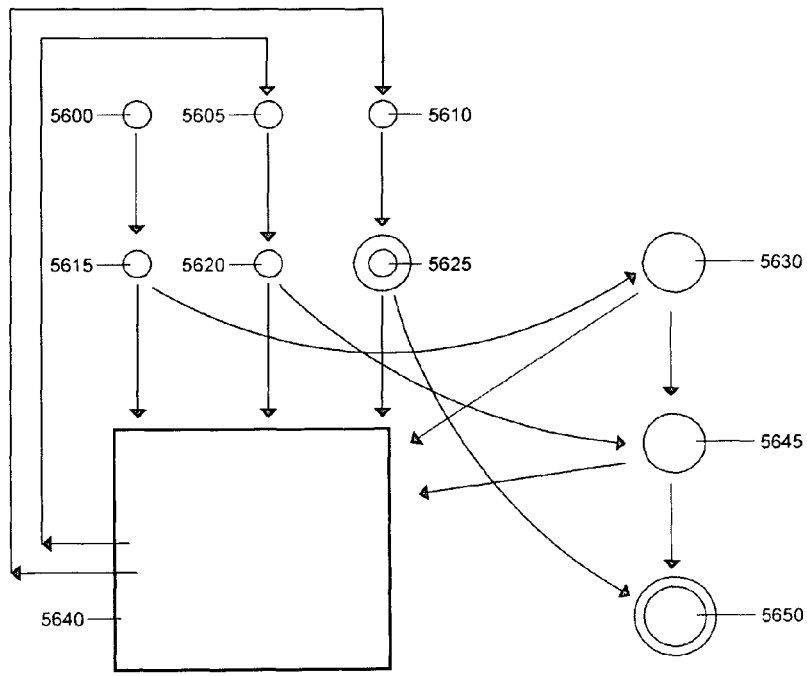
FIG. 56 is a schematic diagram showing the development of several EGA sequences, the use of a central catalogue to store EGAs and the interaction with a changing environment to solve a BOOP at a specific phase.

FIG. 56 shows three parallel EGA sequences solving BOOPs. The sequence at 5600 to 5615 is compared to the environment (5630), with fitness matching data entered into the central database (5640). Similarly, the sequence at 5605 to 5620 is compared to the environment at 5645, with fitness matching data entered into the database. In the case of the second sequence, data from the prior sequence informs the second EGA sequence to improve the EGA. Finally, the problem is solved in the third sequence (5610 to 5625) at 5650 once data from the prior sequences inform the third EGA sequence.

Figure 57:
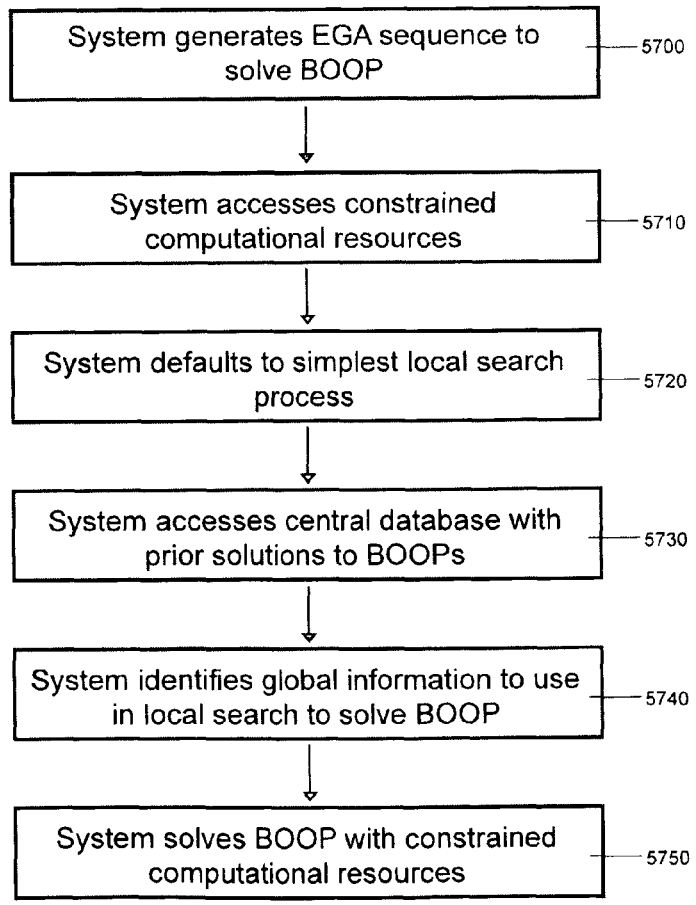
FIG. 57 is a flow chart showing the use of EGAs to solve a BOOP within computational constraints.

FIG. 57 shows the use of EGAs to solve a BOOP within computational constraints. After the system generates an EGA sequence to solve a BOOP (57000), the system accesses the constrained computational resources (5710) and defaults to the simplest local search process (5720). The system then accesses a central database with prior solutions to BOOPs (5730) and identifies global information to use in the local search to solve the BOOP (5740). The system finally solves the BOOP with constrained computational resources (5750).

Figure 58:
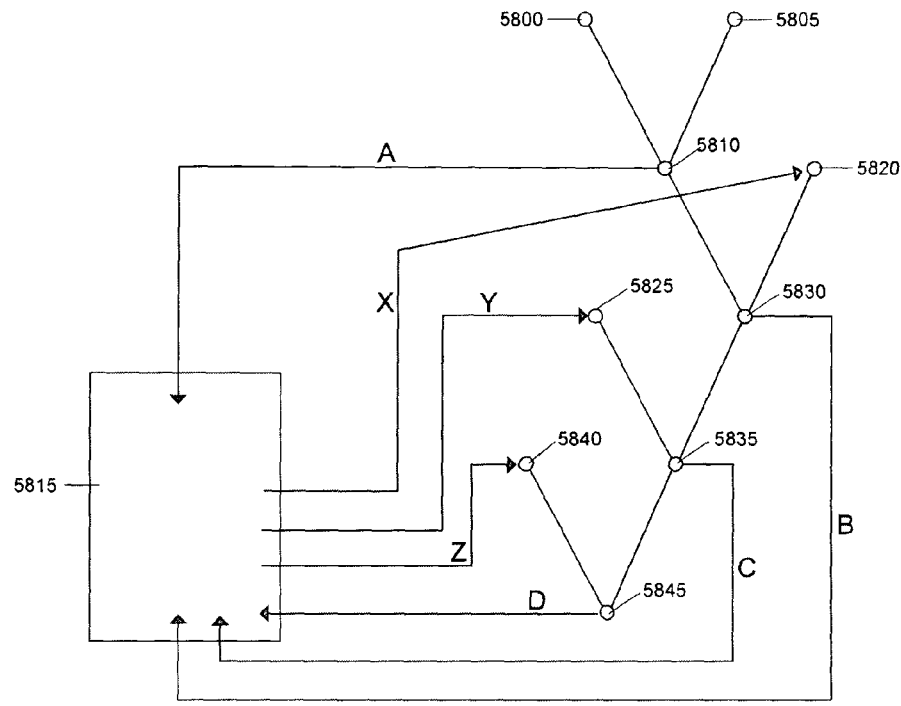
FIG. 58 is a schematic diagram showing the crossover process of EGA sequences combines with tabu search using a central catalogue.

FIG. 58 shows the crossover process of EGA sequences combined with tabu search to solve BOOPs. After the initial pair of individuals (580 and 5805) is combined to produce a progeny (5810), this solution candidate is entered into a central database (5815) at A. The database is accessed by the system to inform (at X) the creation of the individual at 5820, which is then combined with 5810 to create 5830. This solution candidate (5830) is entered into the central database at B. The database is again accessed by the system to inform (at Y) the creation of the individual at 5825. The individuals at 5825 and 5830 are combined to create the individual at 5835. This process repeats until at least one of the solution candidates solves the BOOP. The use of the central database as a memory system to learn from prior phases of the EGA development markedly improves the overall problem solving apparatus.

Figure 59:
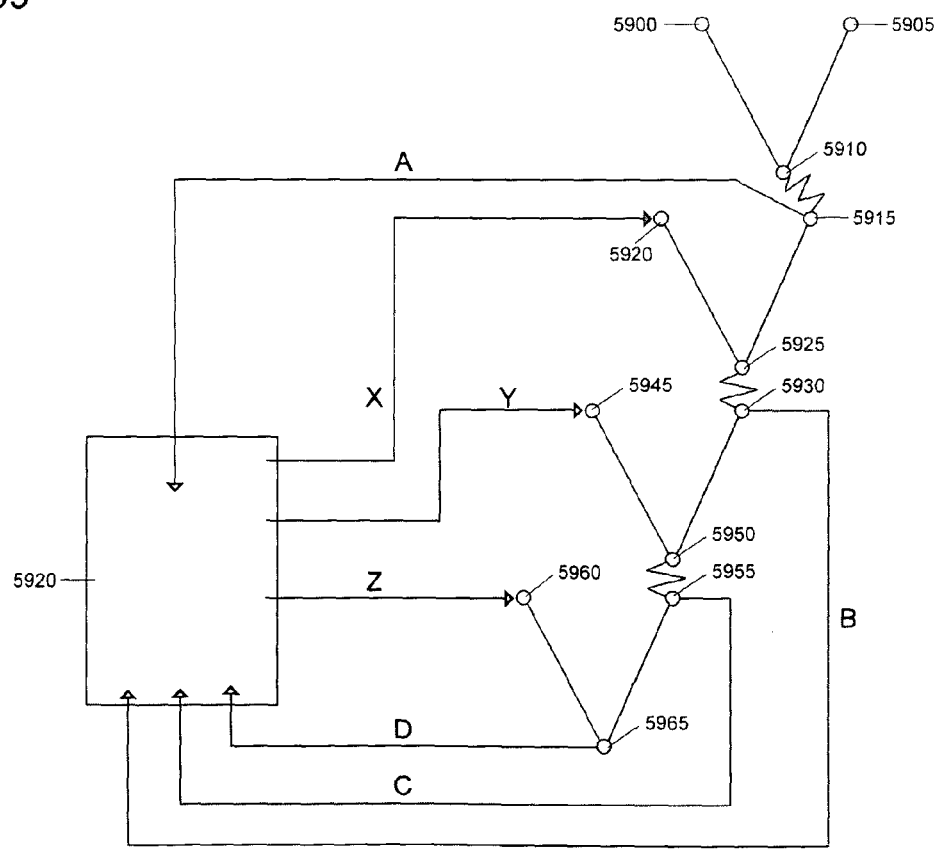
FIG. 59 is a schematic diagram showing the process of EGA mutation using the tabu search metaheuristic and a central catalogue.

FIG. 59 shows the process of generating mutations of EGA sequences combined with tabu search metaheuristic to solve BOOPs. After the initial pair (5900 and 5905) is combined to produce a progeny (5910), the progeny is mutated to create the individual at 5915, data on which are entered into a central database (5920). The database is accessed by the system to inform (at X) the creation of the individual (at 5920), which is then combined with 5915 to create 5925. This individual is then mutated to create 5930. This solution candidate is then entered into the central database at B. The database is again accessed by the system to inform (at Y) the creation of the individual at 5945. This process of crossover and mutation of individual solution candidate evolution is combined with the central database data inclusion and access process until solutions are generated to solve a BOOP. This combination of the EGA process, which includes both crossover and mutation, with tabu search, which uses a central database to inform and access at each phase, creates an efficient adaptive learning system to improve problem solving capabilities.

Figure 60:
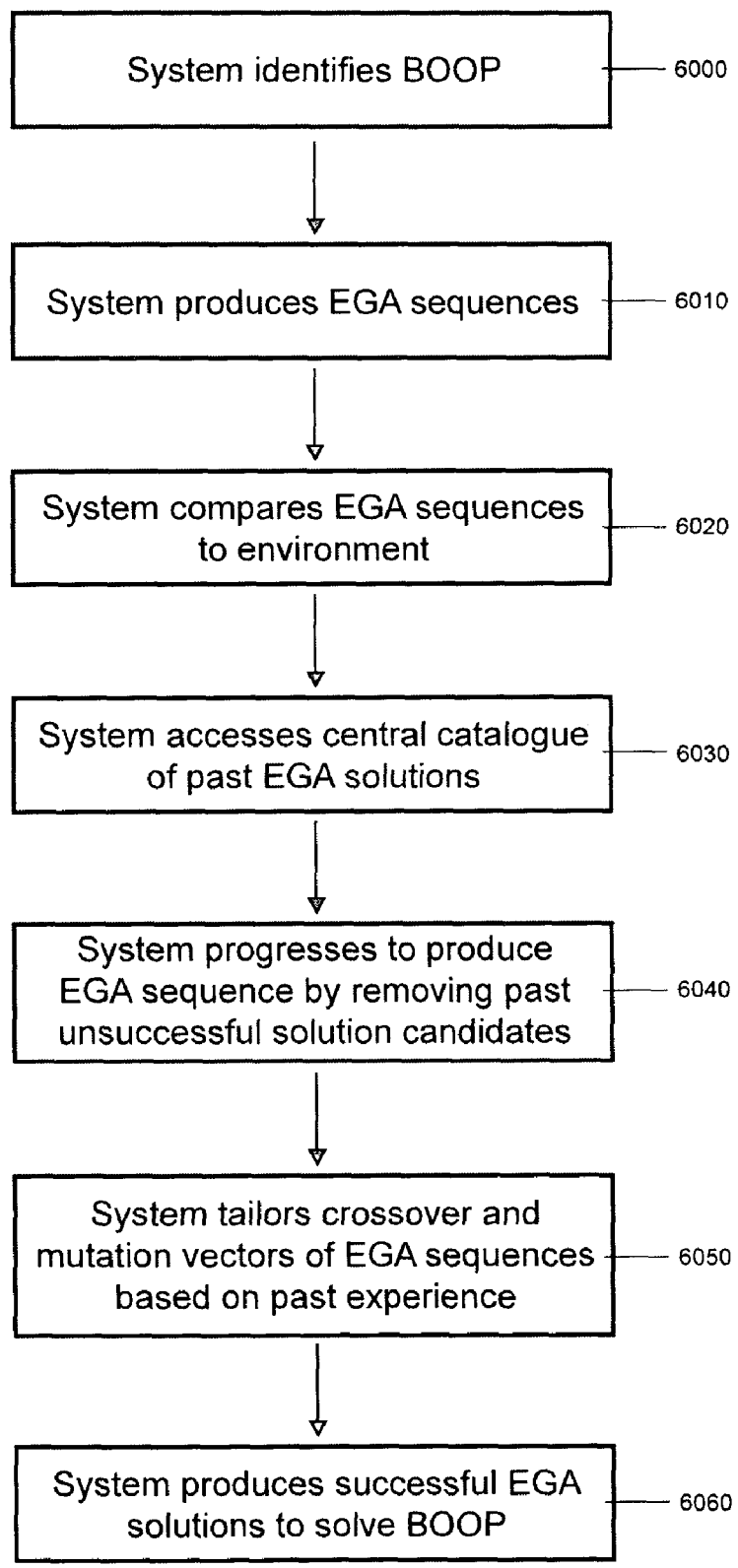
FIG. 60 is a flow chart showing the process of using a central catalogue to store and access EGA sequences to solve a BOOP.

FIG. 60 shows the process of using a central catalogue to store and access EGA sequences to solve a BOOP. After the system identifies a BOOP (6000), it produces EGA sequences (6010). The system then compares EGA sequences to the environment (6020) and accesses the central catalogue to obtain data on past EGA solutions (6030). The system progresses to produce an EGA sequence by removing past unsuccessful solution candidates (6040) and tailors crossover and mutation vectors of EGA sequences based on past experience (6050). The system produces successful EGA solutions to solve a BOOP (6060).

Figure 61:
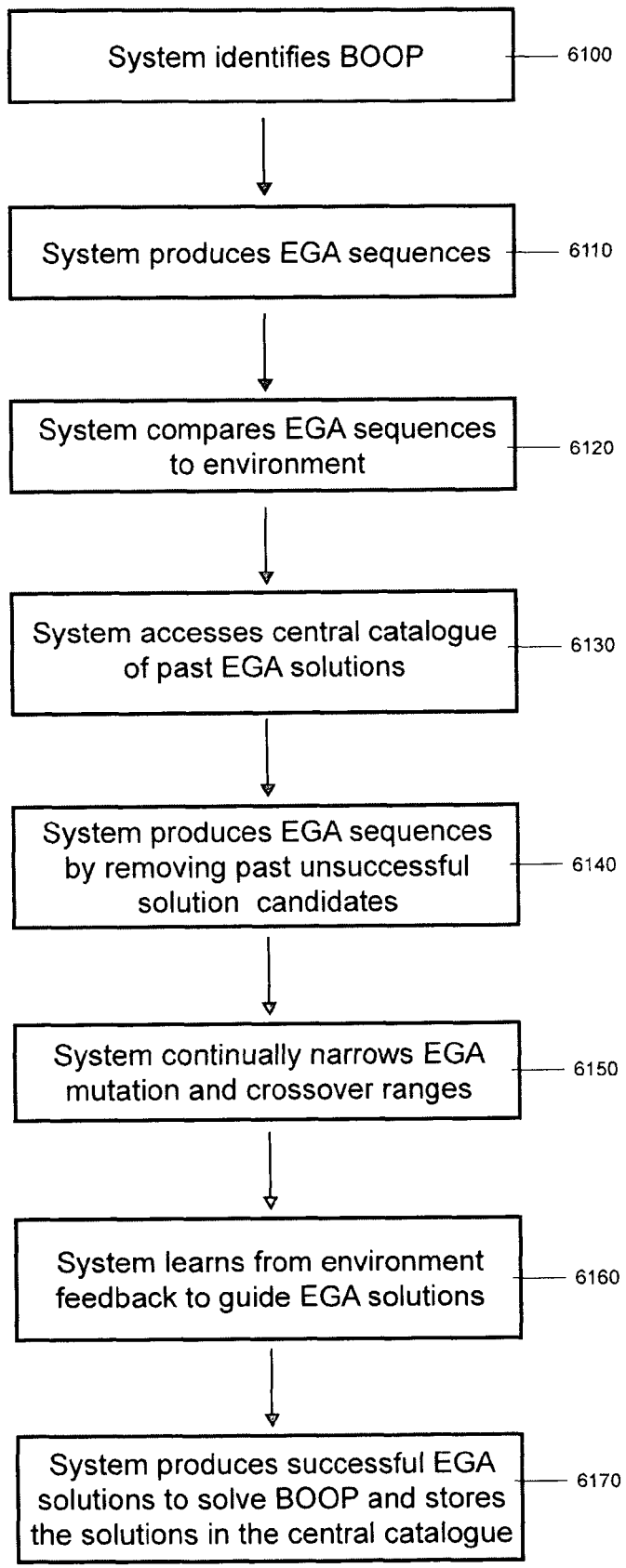
FIG. 61 is a flow chart showing the process of using a central catalogue to store, access and refine EGA sequences in response to environmental feedback to solve a BOOP.

FIG. 61 shows the process of using a central catalogue to store, access and refine EGA sequences in response to environmental feedback to solve a BOOP. Once the system identifies a BOOP (6100), the system produces EGA sequences (6110) and compares EGA sequences to the environment (6120). The system then accesses a central catalogue of past EGA solutions (6130) and produces EGA sequences by removing past unsuccessful solution candidates (6140). Once unsuccessful sequences are pruned, the system compares EGA sequences to the environment (6120). The system continually narrows EGA mutation and crossover ranges (6150) and learns from environmental feedback to guide EGA solutions (6160). The system produces successful EGA solutions to solve a BOOP and stores the solution in the central catalogue (6170)

Figure 62:
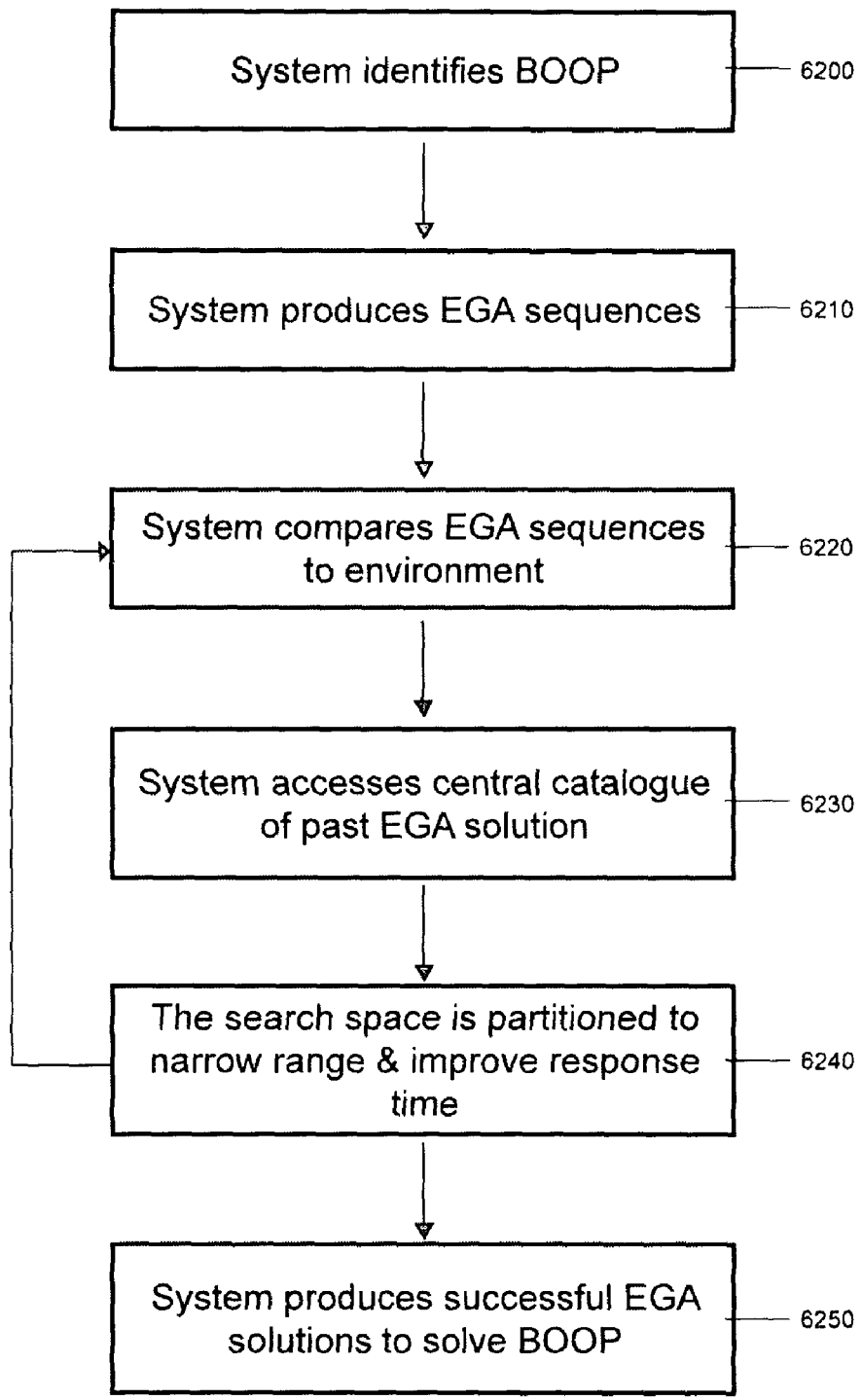
FIG. 62 is a flow chart showing the process of comparing EGA sequences to the environment for fitness and narrowing the search space to improve the response time to solve a BOOP.

FIG. 62 shows the process of comparing EGA sequences to the environment for fitness and narrowing the search space to improve response time to solve a BOOP. The system identifies a BOOP (6200) and produces an EGA sequence (6210). The system then compares EGA sequences to the environment (6220) and accesses a central catalogue of past EGA solutions (6230) before narrowing the search range by partitioning the search space to improve response time (6240). This process repeats with the system comparing the EGA sequences to the environment and comparing EGA sequences with data in the central catalogue so as to continually narrow the search space until the system produces successful EGA solutions to solve a BOOP (6250).

Figure 63:
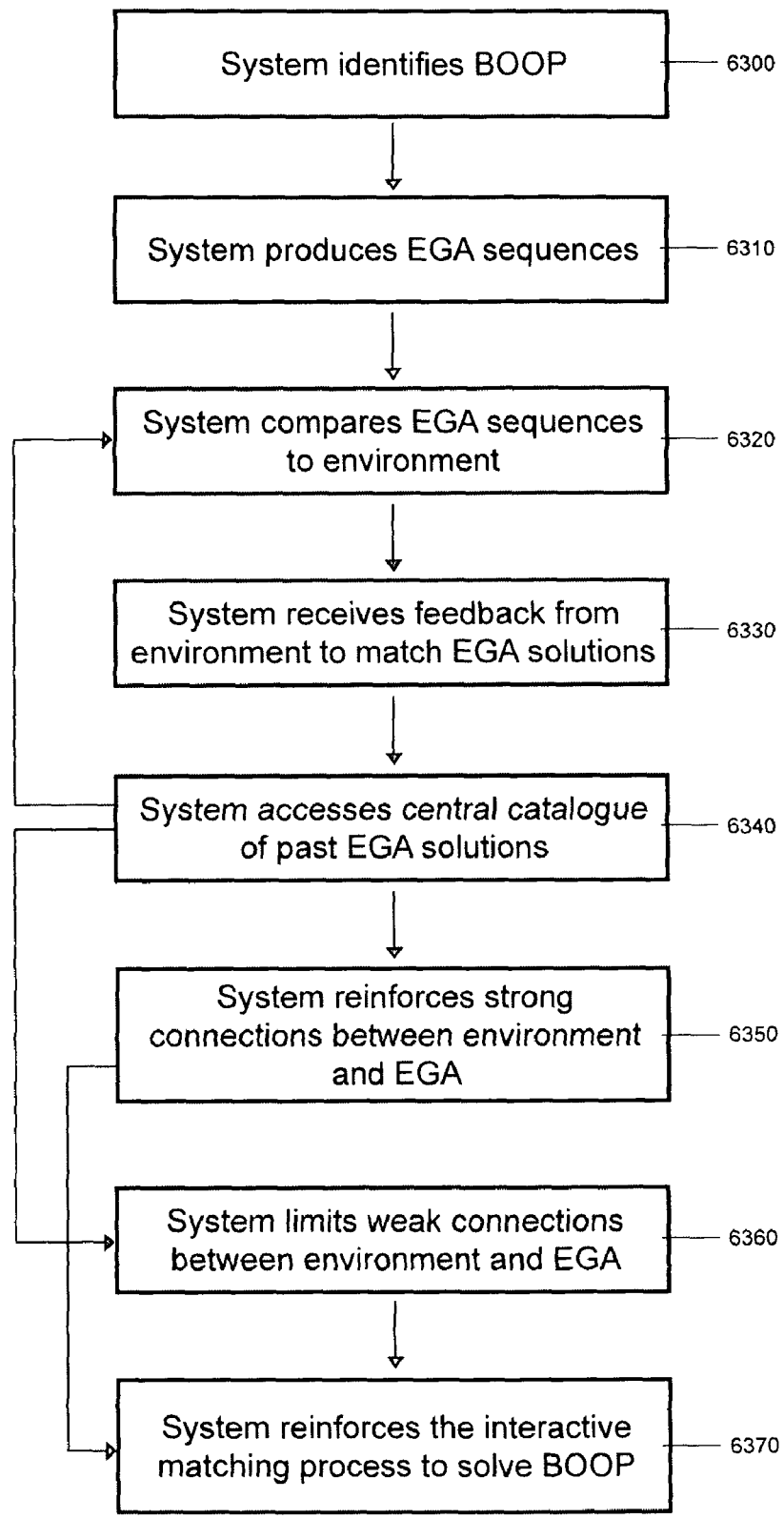
FIG. 63 is a flow chart showing the process of using a central catalogue to reinforce strong connections between the environment and EGAs.

FIG. 63 shows the process of using a central catalogue to reinforce strong connections between the environment and EGAs. After the system identifies a BOOP (6300), the system produces EGA sequences (6310) and compares EGA sequences to the environment (6320). The system receives feedback from the environment to match EGA solutions (6330) and accesses a central catalogue of past EGA solutions (6340). This sequence is repeated by continually comparing EGA sequences to the environment. Then, either the system reinforces strong connections between the environment and the EGA (6350) or the system limits the weak connections between the environment and the EGA (6360). In either event, the system reinforces the interactive matching process to solve the BOOP (6370). This process of EGA solution generation affects the plasticity process of the adaptation of solutions to the environment.

Figure 64:
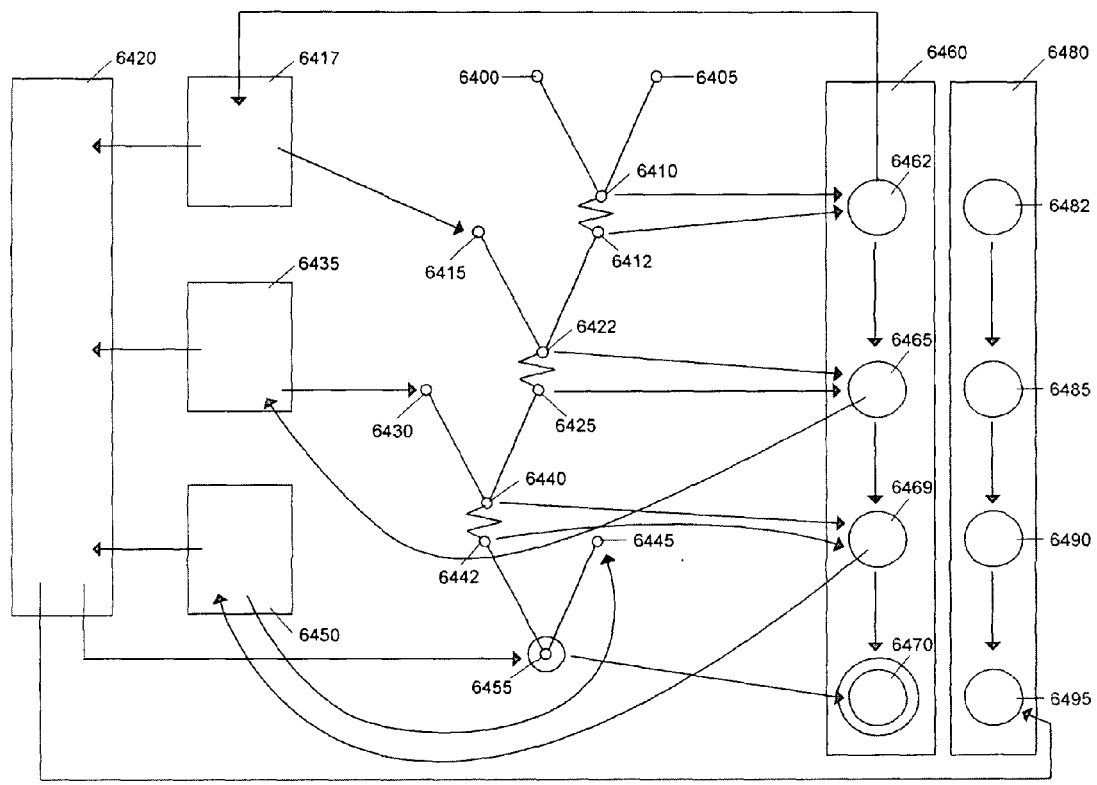
FIG. 64 is a schematic diagram showing the process of combining EGA with the adaptive memory programming metaheuristic using multiple catalogues to feed a central catalogue to compare solutions with an evolving environment.

FIG. 64 shows the process of combining EGA with the adaptive memory programming metaheuristic using multiple catalogues to feed a central catalogue to compare solution candidates with an evolving environment. Once the individuals at 6400 and 6405 are combined to produce the individual candidate solution at 6410, this outcome is mutated to produce the candidate solution at 6412. Both the initial solution and the mutated solution are compared to a phase of the environment (6460) at 762. This fitness matching comparison process results in storing the outcome of the comparison in a catalogue (6417). Data from this catalogue (or database) is then used to inform the generation of an individual (6415) and data is also input into a central catalogue (6420). The new individual at 6415 is combined with the individual at 6412 which resulted from the mutation of the combination of 6400 and 6405. This combination produces 6422 and its mutation at 6425.

As FIG. 64 continues, the individuals at 6422 and 6425 are then compared to the second phase (6465) of the environment (6460). This fitness matching comparison process results in storing the outcome of the comparison in another catalogue (6435). Data from this new catalogue is then used to inform the generation of a new individual (6430) and data is also input into the central catalogue (6420). This process continues until a final phase produces the successful solution candidate (6455) which is created with information from the central catalogue. This final phase of solution is compared to the evolutionary phase at 6470. However, the solution candidate is also successful at matching the second parallel environment (6480) at its later phase (6495) thereby allowing multiple applications.

Figure 65:
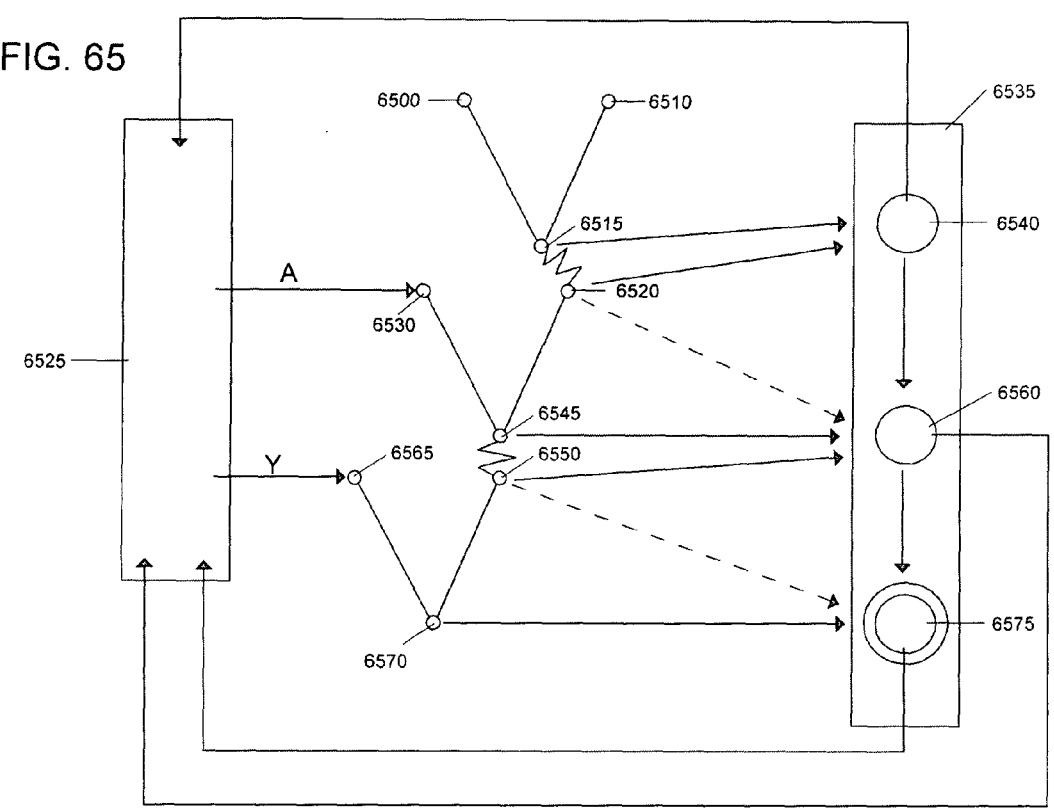
FIG. 65 is a schematic diagram showing the process of combining EGA with the particle swarm optimization metaheuristic using a multiple catalogues to compare and anticipate solutions to BOOPs with an evolving environment.

FIG. 65 shows the process of combining EGA with the particle swarm optimization metaheuristic using multiple catalogues to compare and anticipate solutions to BOOPs with an evolving environment. Once the initial individuals (6500 and 6510) are combined to produce the progeny (6515), it is mutated (6520). Both 815 and 820 are compared to a phase (6540) of the environment (6535) for fitness matching, the results of which are stored in a central database (6525). In addition, 6520 anticipates the next environmental phase, to which it is compared (6560). The central catalogue (database) informs the EGA sequence by generating an individual at 6530 to combine with 6520. This combination results in production of progeny at 6545, which mutates to form 6550. Both of these are compared to the second phase (6560) of the environment, while 6550 also anticipates the third phase (6575), to which it is compared. The results of this fitness matching comparison are input into the central catalogue. This process continues until the solution to a BOOP is found (6575).

Figure 66:
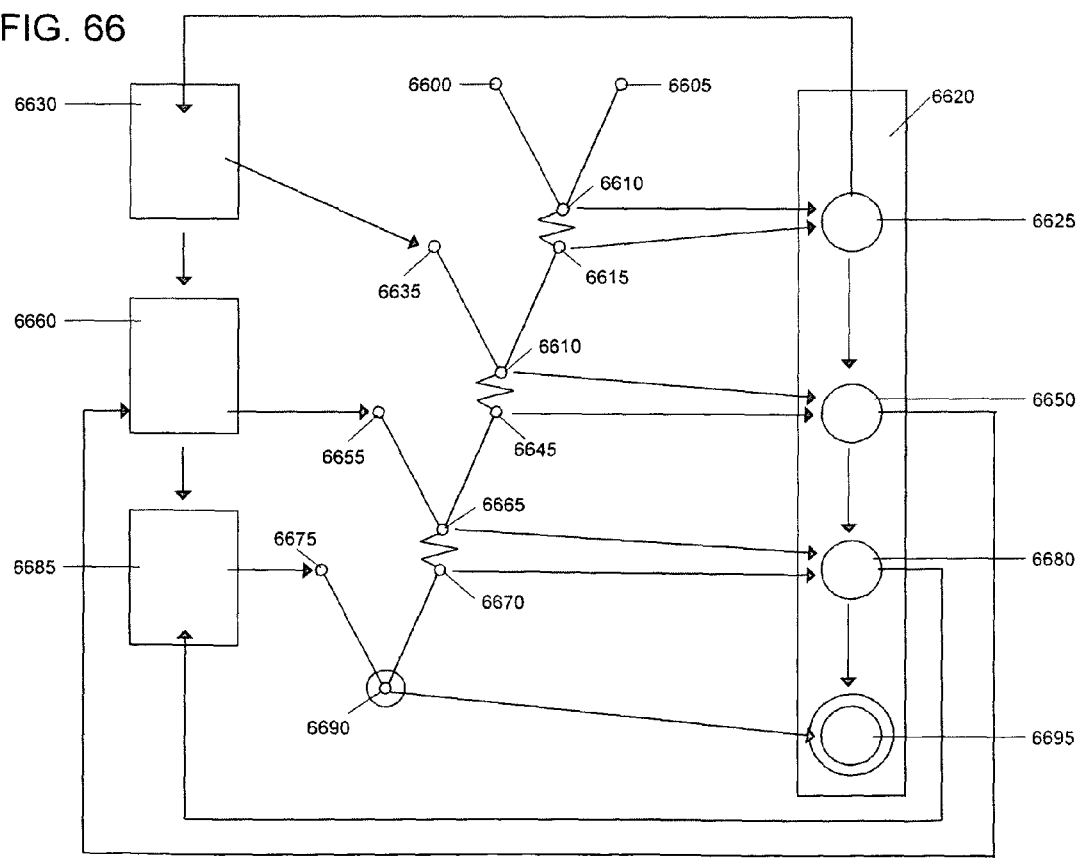
FIG. 66 is a schematic diagram showing the process of combining EGA with the stochastic diffusion search metaheuristic using multiple catalogues to compare solutions to BOOPs with an evolving environment.

FIG. 66 shows the process of combining EGA with the stochastic diffusion search metaheuristic using multiple catalogues to compare solutions to BOOPs with an evolving environment. The individuals at 6600 and 6605 are combined to produce the individual solution candidate at 6610, which is mutated into the individual at 6615. Both 6610 and 6615 are compared to the environment (6620) at phase 6625, the results of the fitness matching of which are entered into a decentralized catalogue (6630). The data from this initial catalogue is used to create a candidate solution (6635) which is combined with 6615 to create 6610, which is mutated into 6645. Both 6610 and 6645 are compared to the second phase (6650) of the environment, with data from the fitness matching being entered into a second distinct decentralized catalogue (6660). Information from this second catalogue is then used to construct an individual at 6655. This process continues until a successful EGA generated solution candidate is created at 6690 to solve the BOOP at 6695.

Figure 67:
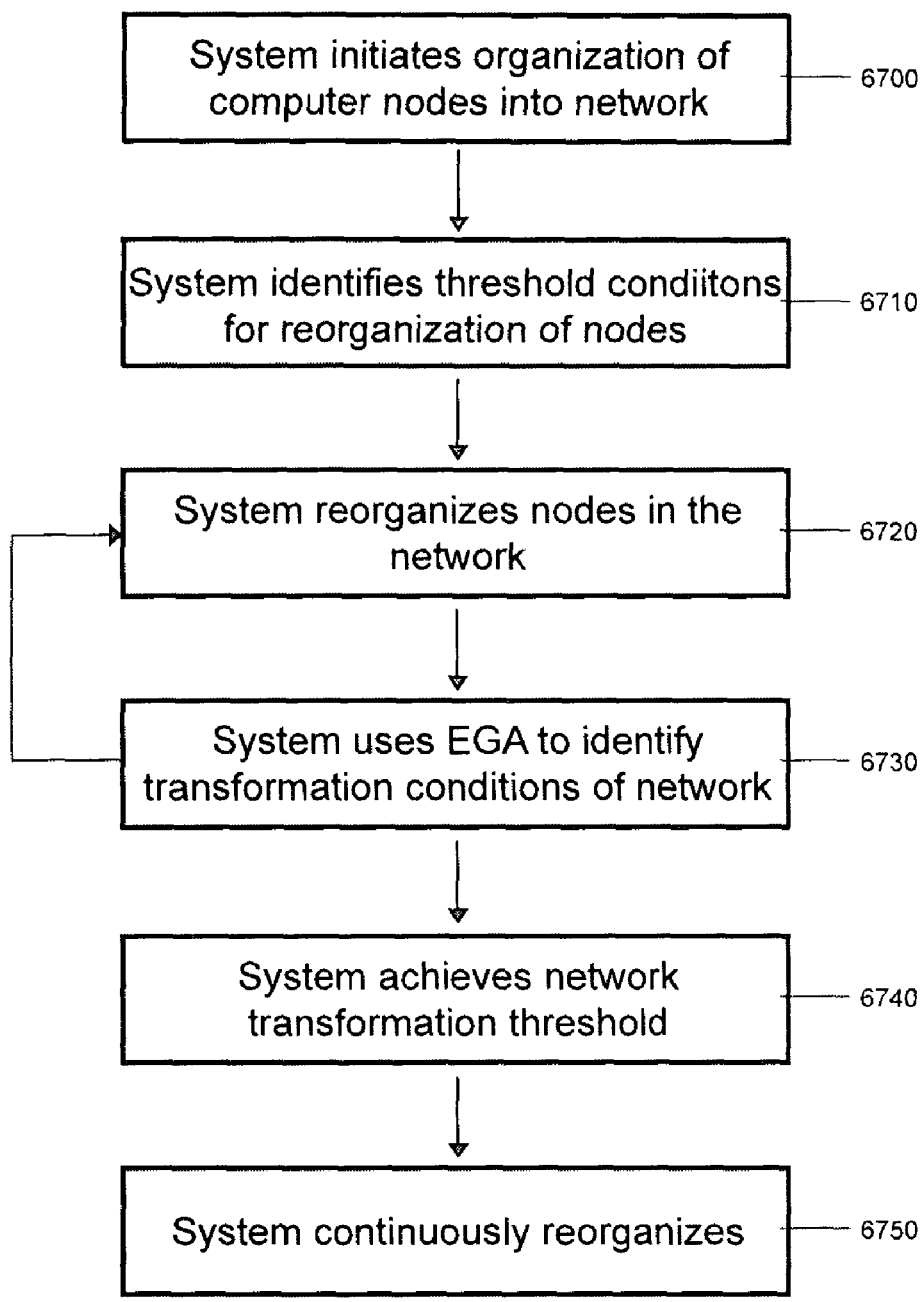
FIG. 67 is a flow chart showing the use of EGA sequences to solve BOOPs in a network computing environment.

FIG. 67 shows the use of EGA sequences to solve BOOPs in a network computing environment. After the system initiates the organization of computer nodes into a network (6700), the system identifies the threshold of conditions for reorganization of nodes (6710). The system then organizes nodes in the network (6720) and uses EGA to identify the transformation conditions of the network (6730). The system enters a feedback loop in which it continues to reorganize nodes in the network. The system achieves a network transformation threshold (6740) and continuously reorganizes (6750).

Figure 68:
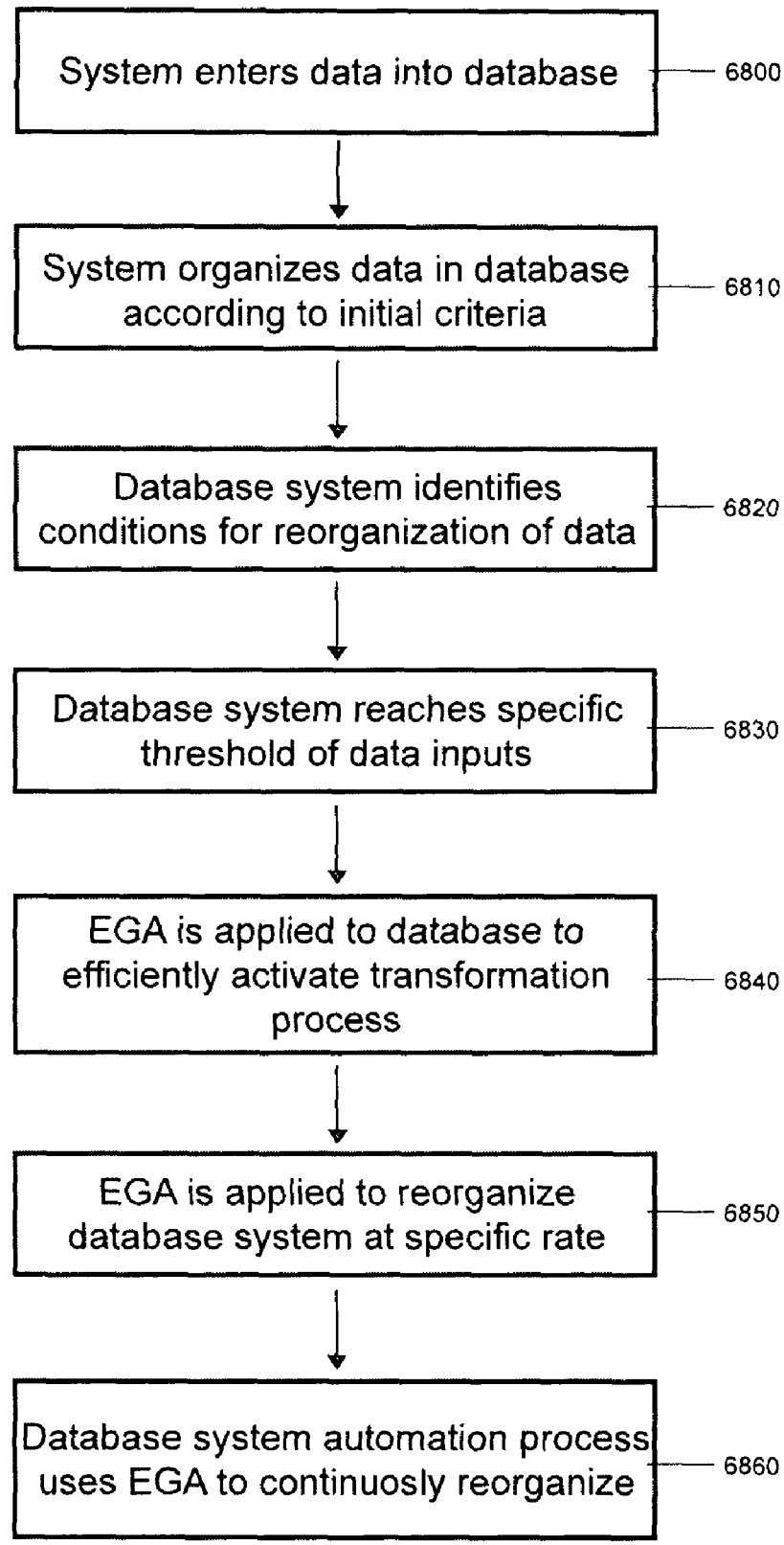
FIG. 68 is a flow chart showing the use of EGA sequences to solve BOOPs in a transformative database system.

FIG. 68 illustrates the use of EGA sequences to solve BOOPs in a transformative database system. Once the system enters data into the database (6800), it organizes data in the database according to initial criteria (6810). The database management system identifies conditions for reorganization of data (6820) and reaches a specific threshold of data inputs (6830). EGA is applied to the database to efficiently activate the transformation process (6840) and to regulate the reorganization of the database system at a specific (variable) velocity (6850). The database system automation process then uses EGA to continually reorganize data flows automatically (6860).

Figure 69:
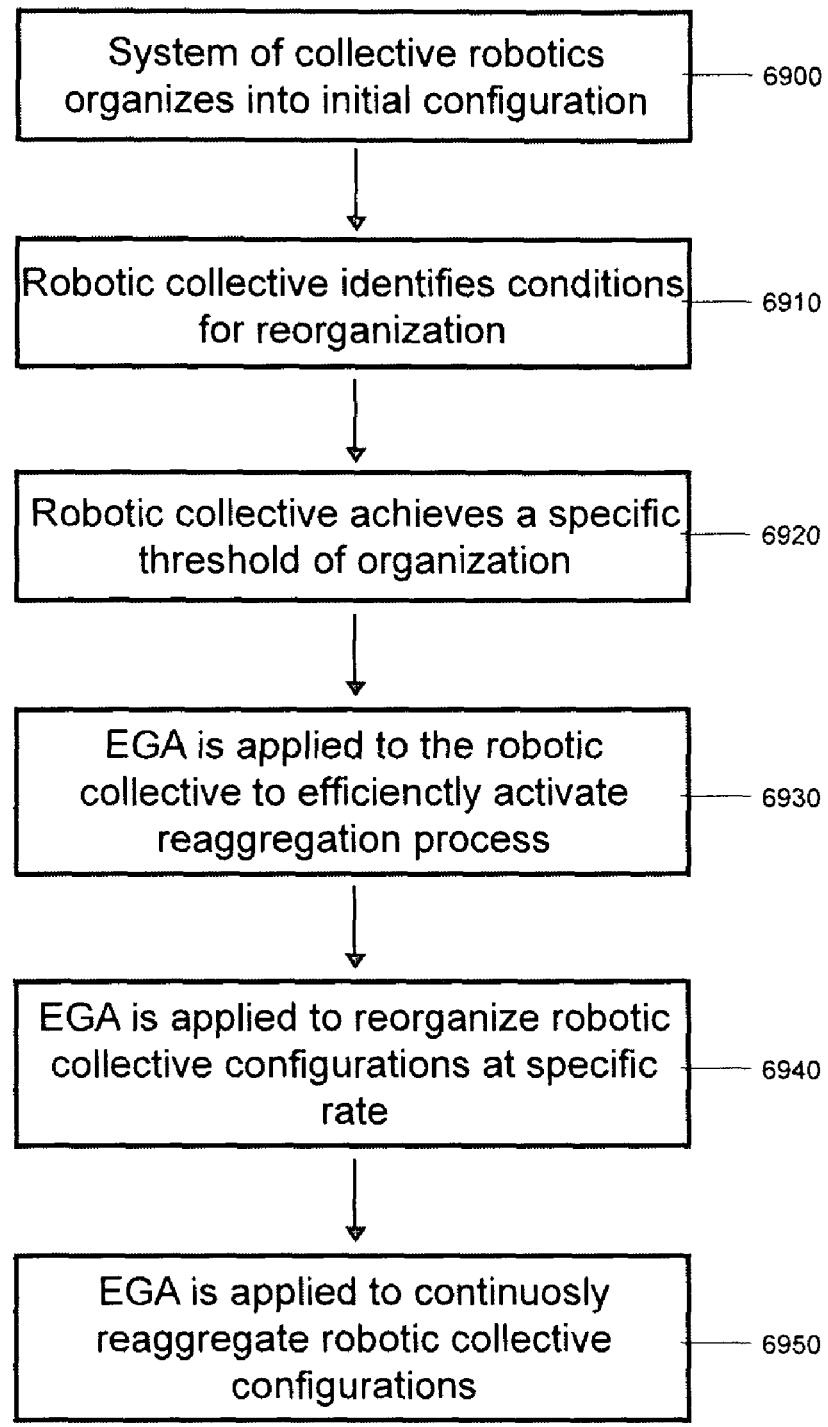
FIG. 69 is a flow chart showing the use of EGA sequences to solve BOOPs in a robotic collective system.

FIG. 69 describes the use of EGA sequences to solve BOOPs in a robotic collective system. After the system of collective robotics organizes into an initial configuration (6900), the collective identifies the conditions for reorganization (6910). The robotic collective achieves a specific threshold of organization (6920) and EGA is applied to the robotic collective to efficiently activate reaggregation process (6930). EGA is applied to regulate the reorganization of the robotic collective configurations at a specific velocity (6940) in each phase. EGA is applied to continuously reaggregate the robotic collective configurations (6950).

FIG. 70 shows three phases of the process of transformation of a network using EGA to solve BOOPs at each phase. In phase one, the nodes (7000, 7005, 7010, 7012, 7015 and 7020) in a network are connected. The nodes between 7010, 7012 and 7015 experience a decline in activity. In phase two, the nodes between 7025 and 7030 become disconnected. In addition, the nodes between 7027, 7030, 7035 and 7040 experience a decline in activity. At phase three, the nodes connecting 7012, 7052, 7055 and 7060 become disconnected. However, a new set of nodes is added to the network at 7045, 7047, 7050 and 7065. EGA is used to identify the fall off in activity at each phase and to guide the restructuring process of the network. EGA techniques allow the network to automatically and continuously reorganize.

I claim:

1. A system for generating efficient genetic algorithms (EGAs) to solve optimization problems, comprising:
   a computer hardware system;
   a computer operating system;
   a computer database management system (dbms);
   wherein genetic algorithms are produced by the computer operating system on the computer hardware system by accessing the dbms to retrieve data to intentionally crossover individuals at specific phases in the breeding process;
   wherein the crossover of individuals into successive generations occurs in a narrow specified band;
   wherein the crossover of individuals occurs by accelerating specific phases;
   wherein the crossover of individuals occurs by limiting the range of random mutations;
   wherein the mutation ranges are adjusted every generation;
   wherein the vectors of the randomness range of mutations are periodically narrowed;
   wherein the historical record of past generations is accessed in the dbms and the most likely mutation vector introduced to guide subsequent generations;
   wherein the probabilistic ranges of mutations are periodically modulated each generation;
   wherein the individual genes are activated on demand; and
   when the EGAs use a combination of techniques, they efficiently solve the optimization problems.

2. A system of claim 1, wherein:
   wherein the computer operating system constructs computer models using the hardware;
   wherein models are generated using EGAs by accessing data sets in the dbms;
   wherein the models are used to construct scenarios to match the fitness to a specific phase of the environment;
   wherein interaction occurs between the models and the genetic evolution process of generating EGAs in matching the evolving environment;

wherein the changing environment provides feedback to the evolving EGAs;

wherein the system produces co-evolutionary behaviors of transforming the models with evolving EGAs and transforming the environment with behaviors applied from the models in real time;

wherein the reaction to the environment by the EGAs creates an experimentation component of the modeling process which constantly re-calibrates the models;

wherein the database is constantly updated with successful solutions to environmental problems identified in the fitness matching process;

wherein the database is used by the EGAs to access data of past successful environmental problem solving; and wherein the modeling system presents solutions to solve the optimization problem.

3. A system of claim 1, wherein:

as the environment constantly changes, the fitness testing process is active;

the modeling system constantly probes the environment to assess for fitness matching;

access to information about prior fitness assessments, available by accessing the database, allows the EGA sequences to update mutation vector pathways; and the use of past fitness matches allows subsequent matching of environmental constraints.

4. A system of claim 1, wherein:

As the environment configuration changes, EGAs generate different criteria for selection;

The evolving environmental criteria require the EGA sequences to adapt;

There is a window of opportunity in matching a transforming environment;

Feedback from the environment provides for fitness testing;

Genes are pulled in the EGA process in order to adapt to the environmental constraints;

The database is accessed to assess the use of past mutations used in EGAs to fit past environmental constraints;

The model applies the EGA sequences that were successful to satisfy past constraints to the new environmental problem;

The model prunes out unsuccessful matches by narrowing the crossover selection criteria and mutation vectors of the EGA sequences; and The model matches the evolving EGA to the evolving environment to solve the optimization problem.

5. A system of claim 1, wherein:

the model seeks to satisfy the constraints of an evolutionary environment;

the model identifies a range of options for the satisfaction of constraints;

the model accesses the database to assess past matches that are no longer valid in the current environment yet may be useful in matching future situations;

the system resolves temporal lags in the EGA sequences by matching subsequent populations to the environment to create short-term solutions; and the model solves an optimization problem by matching the EGA to a specific phase of the evolution of the environment.

6. A system of claim 1, wherein:

the model co-evolves without equilibrium to the indeterminate evolutionary environment;

the model identifies brief windows of constraint satisfaction in which optimal ranges are reached between the EGA evolutionary process and the changing environment;

a synchronization process occurs linking the EGA process and the evolutionary environment in which inputs to one affect the other;

during the inflexion points of changed EGA and environment processes, mutation and crossover variability increase;

the model constructs EGA to adapt to the changing environment and maintain a stable equilibrium; and the model solves an optimization problem by matching the fitness of the EGA with a phase of the environment.

7. A system of claim 1, wherein:

EGAs are used to solve network computing optimization problems;

the network adapts as instructions are received by EGAs to perform a function;

the network performs plasticity functions by continuously reorganizing using EGA sequences; and the distributed computer network self-regulates its functioning by stimulating changes in its configuration using EGA sequences at specific thresholds as it receives inputs.

8. A system of claim 7, wherein:

the distributed computer network is a communications system;

the communications functions of the separate nodes are modulated by using EGA sequences to solve optimization problems; and the topological configuration of the communications network is continuously rerouted.

9. A system of claim 7, wherein:

the distributed computer network is a collective robotic network;

the evolving relative spatial configurations of the individual robots are calculated using the EGAs;

collective robotic optimization problems are solved within computational constraints;

the robotic collective uses global information from the distributed database to solve local search optimization problems;

the system creates models that generate cellular automata simulations using EGA sequences to modulate with the changing environment;

the system adapts the robotic collective to the constraints of the evolving environment to perform a specific goal.

10. A system of claim 7, wherein:

the system is applied to a field programmable gate array (FPGA) as it evolves its physical structure to configure to adapt to an indeterministic environment;

the system uses EGA sequences as a limiter to restrict the guidance of the range of operations in a continuously programmable FPGA to closely mirror the present environment;

the system solves optimization problems in real time.

11. A system of claim 7, wherein:

the distributed computer network is a collective nano-robotic network;

the evolving relative spatial configurations of the individual nano-robots are calculated using the EGAs;

collective nano-robotic optimization problems are solved within computational constraints;

the nano-robotic collective uses global information from the distributed database to solve local search optimization problems;

the nano-robotic collective aggregates its collective configuration into a specific shape; and the nano-robotic collective reaggregates its collective configuration into another shape in reaction to receiving instructions from the model that is informed by the EGA sequences and that interacts with an indeterminate evolving environment.

12. A system of claim 7, wherein:

the distributed computer network employ intelligent mobile software agents (IMSAs);

the IMSAs use software code that uses EGAs to solve optimization problems; and the IMSAs are used to configure a computer model that uses game theory to create competitive behaviors to accelerate optimization problem solving.

* * * * *